(12) United States Patent
Yamazaki et al.

(10) Patent No.: US 8,391,474 B2
(45) Date of Patent: *Mar. 5, 2013

(54) ELECTRONIC DEVICE

(75) Inventors: Shunpei Yamazaki, Tokyo (JP); Jun Koyama, Tokyo (JP); Yu Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/432,101

(22) Filed: Mar. 28, 2012

(65) Prior Publication Data

US 2012/0182246 A1   Jul. 19, 2012

Related U.S. Application Data

(63) Continuation of application No. 12/367,918, filed on Feb. 9, 2009, now Pat. No. 8,155,305, which is a continuation of application No. 11/465,567, filed on Aug. 18, 2006, now Pat. No. 7,489,777, which is a continuation of application No. 09/811,837, filed on Mar. 20, 2001, now Pat. No. 7,194,085.

(30) Foreign Application Priority Data

Mar. 22, 2000   (JP) .................................. 2000-080973

(51) Int. Cl.
H04M 1/00 (2006.01)
G09G 3/32 (2006.01)
G09G 3/36 (2006.01)
G09G 5/00 (2006.01)
H05B 33/14 (2006.01)

(52) U.S. Cl. ...................... 379/433.07; 313/506; 345/82; 345/87; 345/92; 345/169; 455/566; 455/575.3

(58) Field of Classification Search ..................... 345/81, 345/82, 87, 92; 379/433.01, 433.04, 433.07; 455/566, 575.3; 313/506
See application file for complete search history.

(56) References Cited

U.S. PATENT DOCUMENTS

| | | | |
|---|---|---|---|
| 4,022,993 A | 5/1977 | Shattuck | |
| 5,515,045 A | 5/1996 | Tak | |
| 5,616,936 A | 4/1997 | Misawa et al. | |
| 5,867,149 A | 2/1999 | Jaeger | |
| 6,040,810 A | 3/2000 | Nishimura | |
| 6,232,937 B1 | 5/2001 | Jacobsen et al. | |
| 6,246,388 B1 | 6/2001 | Motegi et al. | |
| 6,774,872 B1 | 8/2004 | Kawada et al. | |
| 6,784,874 B1 | 8/2004 | Shimizu | |
| 7,113,154 B1 | 9/2006 | Inukai | |
| 7,194,085 B2 | 3/2007 | Yamazaki et al. | |
| 7,489,777 B2 | 2/2009 | Yamazaki et al. | |
| 8,155,305 B2 * | 4/2012 | Yamazaki et al. | 379/433.07 |

FOREIGN PATENT DOCUMENTS

| | | |
|---|---|---|
| EP | 1126709 A1 | 8/2001 |
| JP | 9214146 A | 8/1997 |

(Continued)

OTHER PUBLICATIONS

Baldo et al.; "Highly efficient phosphorescent emission from organic electroluminescent devices"; Nature, vol. 395; pp. 151-154; Sep. 10, 1998.

(Continued)

*Primary Examiner* — Harry Hong
(74) *Attorney, Agent, or Firm* — Fish & Richardson P.C.

(57) ABSTRACT

An easy to use electronic device is provided. The electronic device functions as a telephone and has a display portion, an audio input portion, an audio output portion, and operation keys. The display portion has a passive element, and the operation keys have LEDs. The direction of an image displayed by the LEDs is switchable.

47 Claims, 28 Drawing Sheets

FOREIGN PATENT DOCUMENTS

| | | |
|---|---|---|
| JP | 10-013288 A | 1/1998 |
| JP | 10-070594 A | 3/1998 |
| JP | 11-065763 A | 3/1999 |
| JP | 11-284700 A | 10/1999 |
| WO | WO9419736 A1 | 9/1994 |

OTHER PUBLICATIONS

Baldo et al.; "Very high-efficiency green organic light-emitting devices based on electrophosphorescence" Applied Physics Letters, vol. 75, No. 1; pp. 4-6; Jul. 5, 1999.

Tsutsui et al.; "Electroluminescence in Organic Thin Films"; Photochemical Processes in Organized Molecular Systems, pp. 437-450; 1991.

Tsutsui et al.; "High Quantum Efficiency in Organic Light-Emitting Devices with Iridium-Complex as a Triplet Emissive Center"; Japan Journal of Applied Physics, vol. 38; pp. L1502-L1504; Dec. 15, 1999.

* cited by examiner

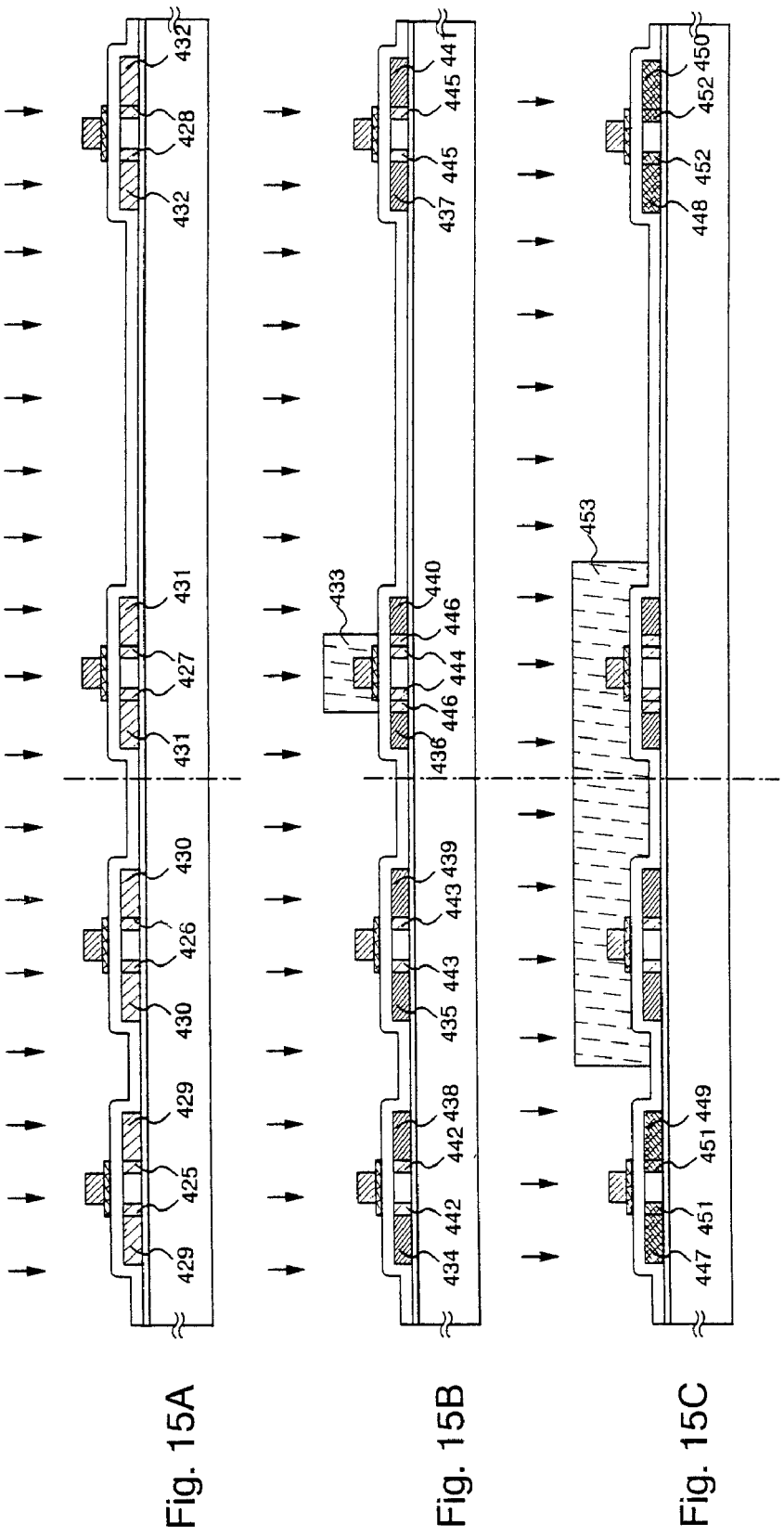

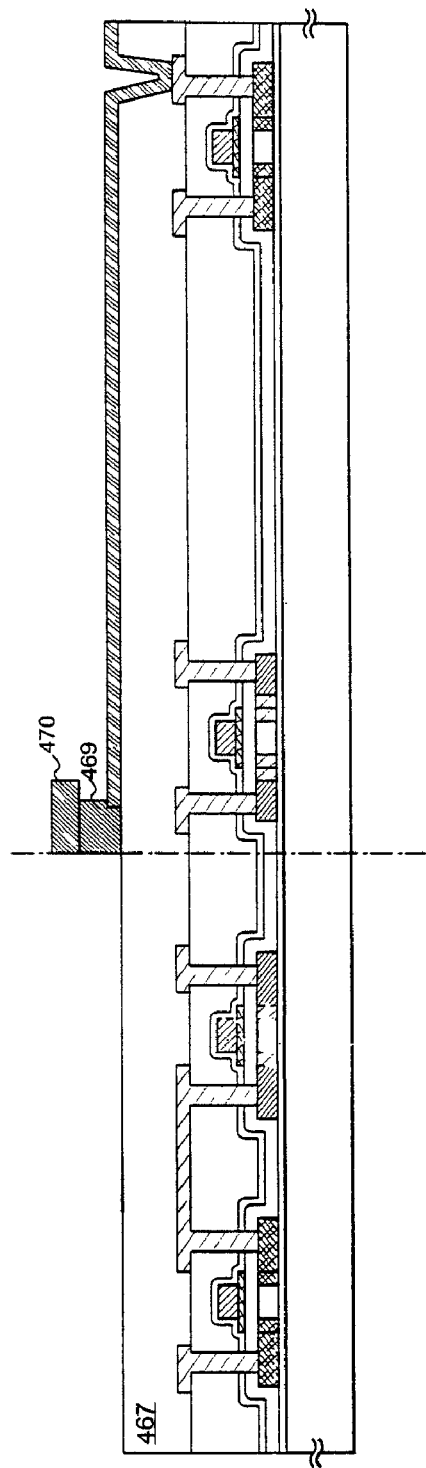
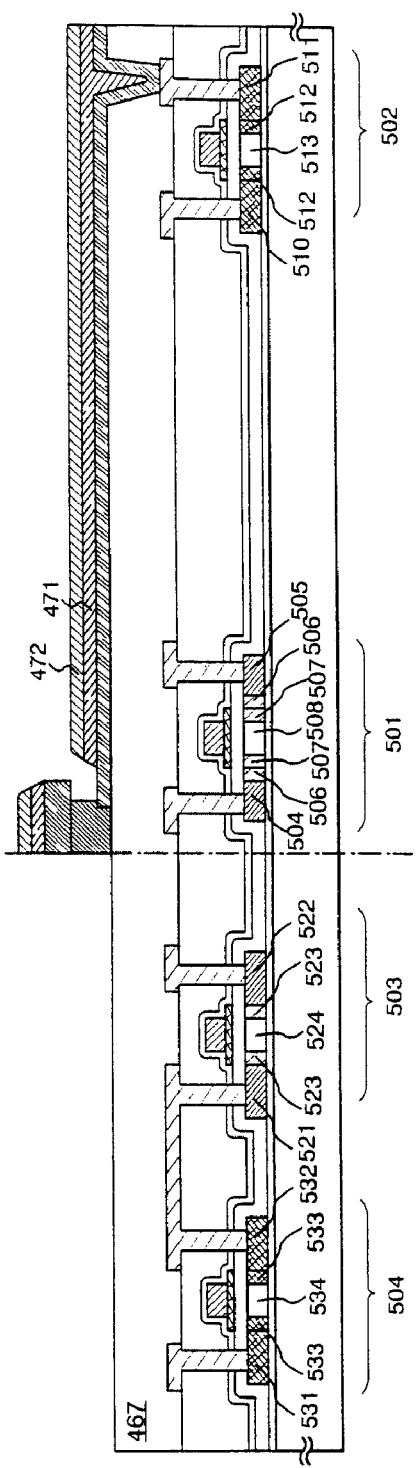
Fig. 17A
Fig. 17B

θ = 0°

θ = 30°

θ = 120°

ELECTRONIC DEVICE

CROSS-REFERENCE TO RELATED APPLICATIONS

This application is a continuation of U.S. application Ser. No. 12/367,918, filed Feb. 9, 2009, which is a continuation of U.S. application Ser. No. 11/465,567, filed Aug. 18, 2006, now U.S. Pat. No. 7,489,777, which is a continuation of U.S. application Ser. No. 09/811,837, filed Mar. 20, 2001, now U.S. Pat. No. 7,194,085, which claims the benefit of a foreign priority application filed in Japan as Serial No. 2000-080973 on Mar. 22, 2000, all of which are incorporated by reference.

BACKGROUND OF THE INVENTION

1. Field of the Invention

The present invention relates to an electronic device functioning as a telephone machine (telephone), and particularly to a portable information terminal. The present invention relates in particular to a portable information terminal having EL elements in a display portion. Note that, in this specification, a portable information terminal denotes a communication device capable of being carried by a user and which possesses both a function of being able to exchange data with another individual while in motion, and a function as a telephone.

2. Description of the Related Art

Technology relating to flat panel displays has been developing rapidly in recent years under the background of increasing needs for lighter, thinner, and smaller displays. Flat panel displays are capable of displaying an image which is high quality, full color, and has high resolution. One type of flat panel display, liquid crystal display devices, are used in display portions of portable information terminals (such as a mobile computer, a portable telephone, a portable type game machine, and an electronic book).

FIG. 25 shows a portable telephone, which is one type of portable information terminal having a liquid crystal display device. The portable telephone shown in FIG. 25 includes a main body 2801, an audio output portion 2802, an audio input portion 2803, a display portion 2804, operation keys 2805, and an antenna 2806.

The portable telephone shown in FIG. 25 has a function as a telephone, namely it converts audio input to the audio input portion 2803 into electric waves and then outputs the electric waves, and it takes in electric waves having audio information to convert it to audio, then plays the audio in the audio output portion.

A liquid crystal display device is used in the display portion 2804, and is capable of displaying necessary information.

With the conventional portable information terminal shown in FIG. 25, images such as characters, numerals, or symbols are listed on or displayed on the operation keys so that the operator can recognize what type of information is input to the portable information terminal when which operation key is pressed. However, the direction of the characters, numerals, or symbols displayed on the operation keys is always fixed with a conventional portable information terminal. The operator therefore must use the portable information terminal by always aligning with the direction of the characters, numerals, or symbols displayed on the operation key, and the portable information terminal itself is not user friendly.

SUMMARY OF THE INVENTION

In view of the above problem, an object of the present invention is to provide a portable information terminal which is easy to use.

A portable information terminal of the present invention has operation keys for inputting information, each with an LED (light emitting diode), EL display device, or liquid crystal display device, and by displaying characters, symbols, and numerals in the operation keys in accordance with the LEDs, EL display devices, or liquid crystal display devices, an operator can differentiate between the operation keys. The operator can even discern the operation keys in a dark environment in accordance with the above structure.

The operator can appropriately change the direction of the images displayed in the display portion, and can appropriately change the direction of the images such as characters, symbols, and numerals displayed in the operation keys, in accordance with the portable information terminal usage. The ease of use of the portable information terminal can be improved with the above structure.

Further, the portable information terminal of the present invention may also use a structure having a CCD camera. By using the CCD camera, the operator can send image information, taken in as electronic data to the portable image terminal by the CCD camera, to other persons on the spot.

Structures of the present invention are shown below.

According to the present invention, there is provided an electronic device functioning as a telephone, comprising: a display portion; an audio input portion; an audio output portion; and operation keys;
  characterized in that:
  the display portion has active elements;
  the operation keys have LEDs; and
  the direction of an image displayed by the LEDs is switchable.

An electronic device may be characterized in that the active element has EL or liquid crystals.

According to the present invention, there is provided an electronic device functioning as a telephone, comprising: a display portion; an audio input portion; an audio output portion; and operation keys;
  characterized in that:
  the display portion has EL elements;
  the operation keys have liquid crystals; and
  the direction of an image displayed by the liquid crystals is switchable.

According to the present invention, there is provided an electronic device functioning as a telephone, comprising:
  a first panel having: one of an audio input portion and an audio output portion; and a display portion;
  a second panel having: one of an audio input portion and an audio output portion; and operation keys;
  characterized in that:
  the first panel and the second panel are connected;
  the angle between the first panel and the second panel can be arbitrarily changed;
  the display portion has EL elements;
  the operation keys have LEDs; and
  the direction of an image displayed by the LEDs is switchable.

According to the present invention, there is provided an electronic device functioning as a telephone, comprising:
  a first panel having: one of an audio input portion and an audio output portion; and a display portion;
  a second panel having: one of an audio input portion and an audio output portion; and operation keys;
  characterized in that:
  the first panel and the second panel are connected;
  the angle between the first panel and the second panel can be arbitrarily changed;
  the display portion has EL elements;

the operation keys have liquid crystals; and the direction of an image displayed by the liquid crystals is switchable.

According to the present invention, there is provided an electronic device functioning as a telephone, comprising:

a first panel having: one of an audio input portion and an audio output portion; and a display portion;

a second panel having: one of an audio input portion and an audio output portion; and operation keys;

characterized in that:

the display portion has EL elements;

the operation keys have LEDs;

the first panel and the second panel are connected;

the angle between the first panel and the second panel can be arbitrarily changed;

the direction of an image displayed by the LEDs is switchable in accordance with the angle between the first panel and the second panel.

According to the present invention, there is provided an electronic device functioning as a telephone, comprising:

a first panel having: one of an audio input portion and an audio output portion; and a display portion;

a second panel having: one of an audio input portion and an audio output portion; and operation keys;

characterized in that:

the display portion has EL elements;

the operation keys have liquid crystals;

the first panel and the second panel are connected;

the angle between the first panel and the second panel can be arbitrarily changed;

the direction of an image displayed by the liquid crystals is switchable in accordance with the angle between the first panel and the second panel.

According to the present invention, there is provided an electronic device functioning as a telephone, comprising:

a first panel having: one of an audio input portion and an audio output portion; and a display portion;

a second panel having: one of an audio input portion and an audio output portion; and operation keys;

characterized in that:

the first panel and the second panel are connected;

the angle between the first panel and the second panel can be arbitrarily changed;

the display portion has a plurality of pixels;

the plurality of pixels each have: a photodiode; an EL element; a switching TFT; an EL driver TFT; a reset TFT; a buffer TFT; and a selection TFT;

the switching TFT and the EL driver TFT control light emission from the EL element;

light emitted from the EL elements is reflected upon a subject and irradiated onto the photodiodes;

the photodiodes, the reset TFTs, the buffer TFTs, and the selection TFTs generate an image signal from the light irradiated onto the photodiodes;

the operation keys have LEDs; and the direction of an image displayed by the LEDs is switchable.

According to the present invention, there is provided an electronic device functioning as a telephone, comprising:

a first panel having: one of an audio input portion and an audio output portion; and a display portion;

a second panel having: one of an audio input portion and an audio output portion; and operation keys;

characterized in that:

the first panel and the second panel are connected;

the angle between the first panel and the second panel can be arbitrarily changed;

the display portion has a plurality of pixels;

the plurality of pixels each have: a photodiode; an EL element; a switching TFT; an EL driver TFT; a reset TFT; a buffer TFT; and a selection TFT;

the switching TFT and the EL driver TFT control light emission from the EL element;

light emitted from the EL elements is reflected upon a subject and irradiated onto the photodiodes;

the photodiodes, the reset TFTs, the buffer TFTs, and the selection TFTs generate an image signal from the light irradiated onto the photodiodes;

the operation keys have liquid crystals; and the direction of an image displayed by the liquid crystals is switchable.

According to the present invention, there is provided an electronic device functioning as a telephone, comprising: a display portion; an audio input portion; an audio output portion; and operation keys;

characterized in that:

the display portion have first EL elements;

the operation keys have second EL element; and the direction of an image displayed by the second EL elements is switchable.

According to the present invention, there is provided an electronic device functioning as a telephone, comprising:

a first panel having: one of an audio input portion and an audio output portion; and a display portion;

a second panel having: one of an audio input portion and an audio output portion; and operation keys;

characterized in that:

the first panel and the second panel are connected;

the angle between the first panel and the second panel can be arbitrarily changed;

the display portion has first EL elements;

the operation keys have second EL elements; and the direction of an image displayed by second EL elements is switchable.

According to the present invention, there is provided an electronic device functioning as a telephone, comprising:

a first panel having: one of an audio input portion and an audio output portion; and a display portion;

a second panel having: one of an audio input portion and an audio output portion; and operation keys;

characterized in that:

the display portion has first EL elements;

the operation keys have second EL elements;

the first panel and the second panel are connected;

the angle between the first panel and the second panel can be arbitrarily changed; and the direction of an image displayed by second EL elements is switchable in accordance with the angle between the first panel and the second panel.

According to the present invention, there is provided an electronic device functioning as a telephone, comprising:

a first panel having: one of an audio input portion and an audio output portion; and a display portion;

a second panel having: one of an audio input portion and an audio output portion; and operation keys;

characterized in that:

the first panel and the second panel are connected;

the angle between the first panel and the second panel can be arbitrarily changed;

the display portion has a plurality of pixels;

the plurality of pixels each have: a photodiode; a first EL element; a switching TFT; an EL driver TFT; a reset TFT; a buffer TFT; and a selection TFT;

the switching TFT and the EL driver TFT control light emission from the first EL element;

light emitted from the first EL elements is reflected upon a subject and irradiated onto the photodiodes;

the photodiodes, the reset TFTs, the buffer TFTs, and the selection TFTs generate an image signal from the light irradiated onto the photodiodes;

the operation keys have second EL elements; and the direction of an image displayed by the second EL elements is switchable.

An electronic device may be characterized in that the first EL elements each have an anode, a cathode, and an EL layer formed between the anode and the cathode; and the external quantum efficiency of the EL layer is equal to or greater than 10%.

An electronic device may be characterized in that the maximum value of the strength of light emitted by the first EL elements is equal to or greater than 251 m/W.

An electronic device may be characterized in that the second EL elements each have an anode, a cathode, and an EL layer formed between the anode and the cathode; and the external quantum efficiency of the EL layer is equal to or greater than 10%.

An electronic device may be characterized in that the maximum value of the strength of light emitted by the second EL elements is equal to or greater than 251 m/W.

An electronic device may be characterized by having a CCD light receiving portion.

An electronic device may be characterized in that an image is taken in as electronic date in the CCD light receiving portion.

An electronic device may be characterized in that:

the display portion has a touch panel; and an image written into the touch panel is read in as electronic data.

BRIEF DESCRIPTION OF THE DRAWINGS

In the accompanying drawings:

FIGS. 15A to 15C are diagrams showing the method of manufacturing the EL display device used in the display portion of the portable information terminal of the present invention;

FIGS. 17A and 17B are diagrams showing the method of manufacturing the EL display device used in the display portion of the portable information terminal of the present invention;

DETAILED DESCRIPTION OF THE PREFERRED EMBODIMENTS

Embodiment Mode

Figure 1A:
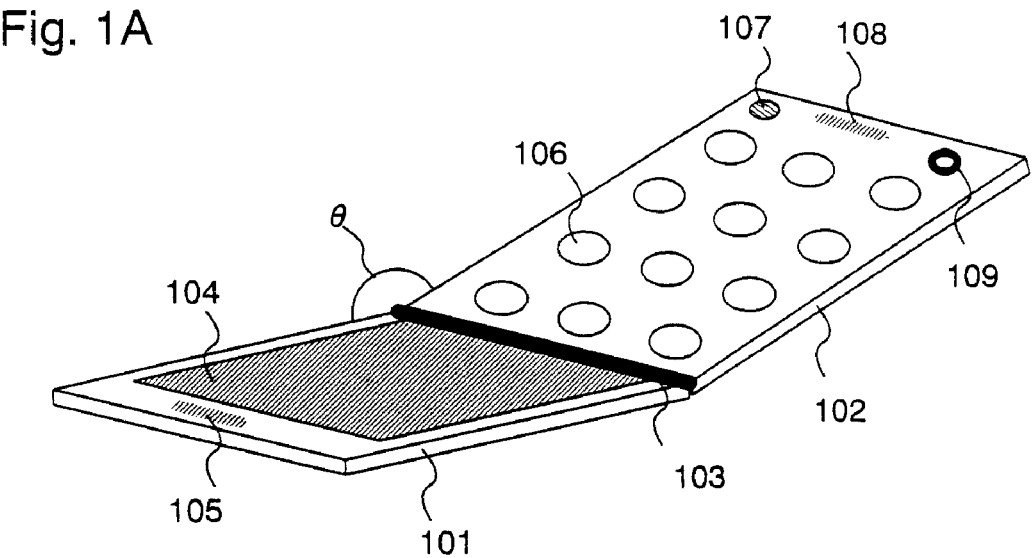
FIGS. 1A and 1B are external views of a portable information terminal of the present invention.

An example of a structure of a portable information terminal of the present invention is shown in FIG. 1A. Reference numeral 101 denotes a display panel, and reference numeral 102 denotes an operation panel. The display panel 101 and the operation panel 102 are connected in a connection portion 103. An angle θ between a plane in which a display portion 104 of the display panel 101 is formed, and a plane in which operation keys 106 of the operation panel 102 are formed, can then be arbitrarily changed.

Figure 1B:
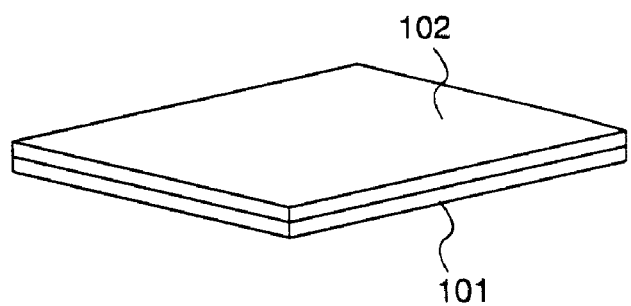

A structure of the portable information terminal in a state in which the display panel 101 and the operation panel 102 overlap is shown in FIG. 1B. In this case, the angle θ becomes 0°.

The display panel 101 has the display portion 104. Further, the display portion 101 has an audio output portion 105, and audio is output from the audio output portion 105. The display portion 104 of the portable information terminal of the present invention is structured by: an EL display device using an active element (EL element) having a layer containing an organic compound (hereafter referred to as organic compound layer) in which luminescence is generated by application of an electric field; or a liquid crystal display device using an active element having liquid crystals.

The EL display device is also referred to as an organic EL display (OLED) and an organic light emitting diode (OLED). The EL display device, differing from the liquid crystal display device, is a self light emitting type. EL elements have a structure in which a layer containing an organic compound which generated luminescence by applying an electric field (hereafter referred to as organic substance layer) is sandwiched between a pair of electrodes (an anode and a cathode), and the organic compound layer usually has a lamination structure. A lamination structure of a hole transporting layer, a light emitting layer, and an electron transporting layer developed by Tang, et al., of Eastman Kodak Company can be given as a typical lamination structure. This structure has extremely high light emitting efficiency, and most of the EL display devices currently being researched and developed employ this structure.

Electroluminescence generated by the application of an electric field is obtained in the EL element, which has an anode layer, an organic compound layer, and a cathode layer. There is emission of light in the luminescence of the organic compound when returning to a ground state from a singlet excitation state (fluorescence), and when returning to a ground state from a triplet excitation state (phosphorescence), and the light emitting device of the present invention may use both types of light emission.

Further, a structure in which a hole injecting layer, a hole transporting layer, a light emitting layer, and an electron transporting layer are laminated in order on an electrode; and a structure in which a hole injecting layer, a hole transporting layer, a light emitting layer, an electron transporting layer, and an electron injecting layer are laminated in order on an electrode may also be used. Doping of a material such as a fluorescent pigment into the light emitting layer may also be performed.

All layers formed between one pair of electrodes are referred to generically as organic compound layers within this specification. The above stated hole injecting layer, hole transporting layer, light emitting layer, electron transporting layer, electron injecting layer, and the like are therefore all contained within the organic compound layer.

Elements formed by an anode, an organic compound layer, and a cathode are referred to as EL elements in this specification.

The operation panel 102 has the operation keys 106, a power source switch 107, an audio input portion 108, and a CCD light receiving portion 109. Note that, although the operation keys 106 and the power source switch 107 are formed separately in this embodiment mode, a structure in which the power source switch 107 is contained within the operation keys 106 may also be used.

Audio is input in the audio input portion 107. An image input in the CCD light receiving portion 109 is taken in as electronic data by the portable information terminal.

Note that, although the display panel 101 has the audio output portion 105 in FIGS. 1A and 1B, and the operation panel has the audio input portion 108, the present invention is not limited to this structure. The display panel 101 may have the audio input portion 108, and the operation panel may have the audio output portion 105. Further, both the audio output portion 105 and the audio input portion 108 may be formed together in the display panel 101, and both the audio output portion 105 and the audio input portion 108 may be formed together in the operation panel 102.

Furthermore, the portable information terminal of the present invention has the operation keys 106 each having a means of display such as an LED, a liquid crystal display device, or an EL display device. Characters, symbols, numerals, and the like are displayed in the respective operation keys 106 by the LEDs, liquid crystal display devices, or EL display devices of each operation key 106.

Note that the portable information terminal does not have an antenna in this embodiment mode, but an antenna may also be formed when necessary.

Figure 2A:
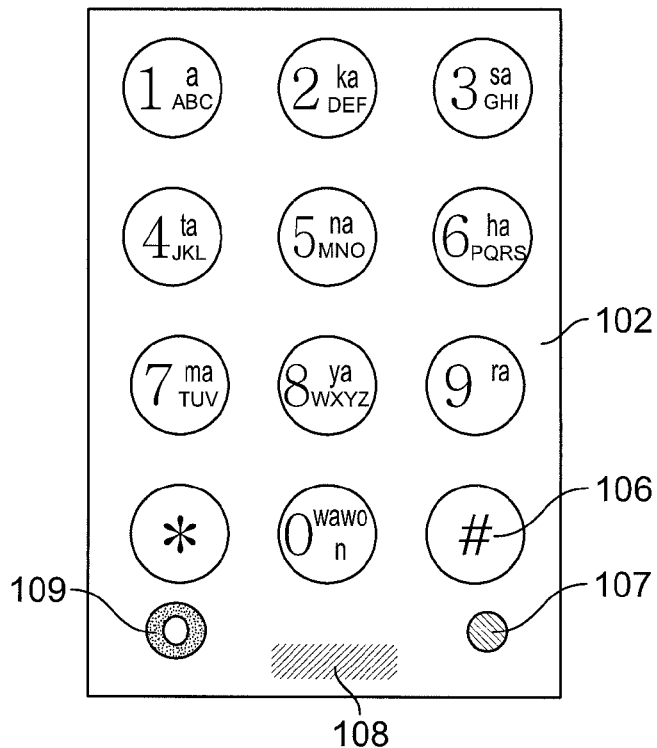
FIGS. 2A and 2B are blow up diagrams of an operation panel of a portable information terminal of the present invention.
Figure 2B:
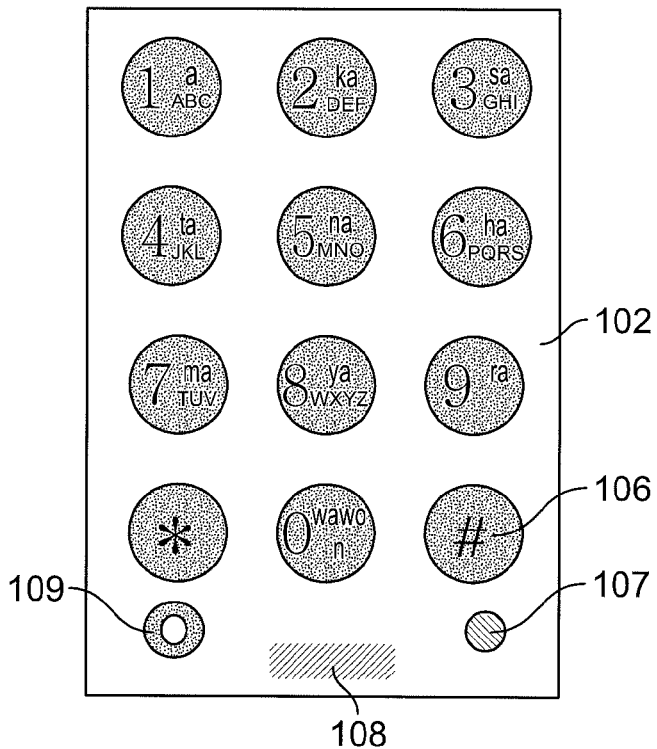

FIGS. 2A and 2B show an enlarged diagram of the operation panel 102. Portions which are the same as those shown in FIGS. 1A and 1B use the same reference symbols.

The operation keys 106 shown in FIG. 2A display a single number, or a plurality of, characters, symbols, numerals, and the like in a black color on a white color background. The operation keys 106 shown in FIG. 2B display a single number, or a plurality of, characters, symbols, numerals, and the like in a white color on a black color background.

Note that, although the operation keys performing display by black or white colors is explained with FIG. 2A and FIG. 2B, the present invention is not limited to this. The operation keys may also perform display of a color other than white. For example, yellow color display on a black color background, green color display on a white color background, and black color display on a blue color background may also be performed.

Figure 3A:
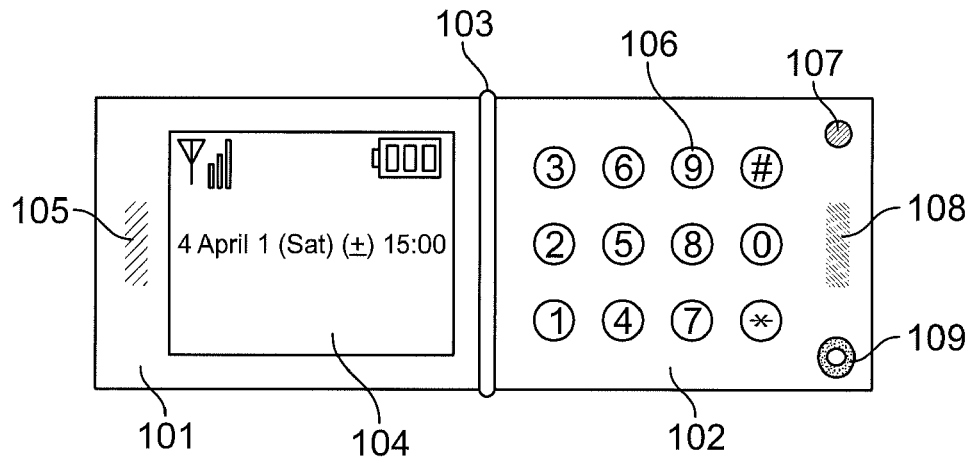
FIGS. 3A and 3B are top surface diagrams of a portable information terminal of the present invention.
Figure 3B:
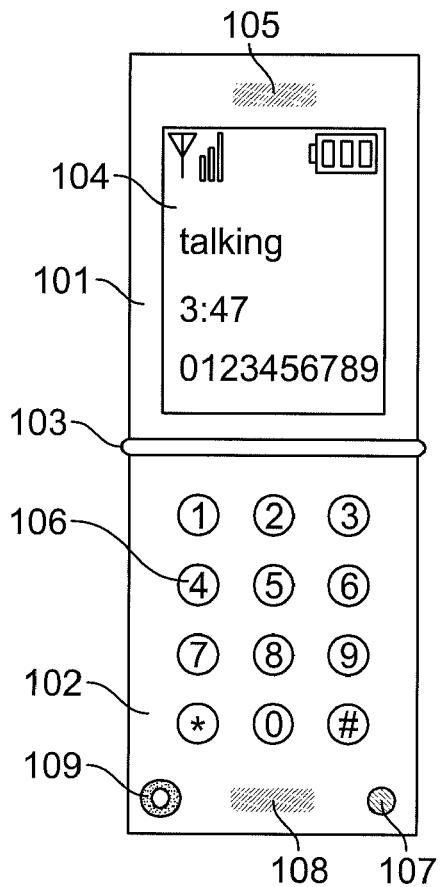

Further, with the portable information terminal of the present invention, it is possible for an operator to suitably change the direction of an image displayed in the display portion 104, and the direction of images such as characters, numerals, and symbols displayed in the operation keys 106. FIGS. 3A and 3B show top surface views of a portable information terminal.

FIG. 3A shows a case of original directions seen from the operator, for the direction of the image displayed in the display portion 104 and the direction of the images such as characters, numerals, and symbols displayed in the operation keys 106, when the display panel 101 and the operation panel 102 are placed next to each other horizontally.

FIG. 3B shows a case of original directions seen from the operator, for the direction of the image displayed in the display portion 104 and the direction of the images such as characters, numerals, and symbols displayed in the operation keys 106, when the display panel 101 and the operation panel 102 are placed next to each other vertically.

With the portable information terminal of the present invention, it is possible to switch between the direction shown in FIG. 3A and the direction shown in FIG. 3B, in accordance with the preference of the operator regarding ease of use, for the direction of the image displayed in the display portion 104 and the direction of the images such as characters, numerals, and symbols displayed in the operation keys 106.

Note that, although a case in which the direction of the image displayed in the display portion 104, and the direction of the images such as characters, numerals, and symbols displayed in the operation keys 106, are always the same is explained with FIGS. 2A and 2B, the present invention is not limited to this. The directions of the image displayed in the display portion 104 and the direction of the images such as characters, numerals, and symbols displayed in the operation keys 106 may also differ.

Note that one example of images such as characters, numerals, and symbols displayed in the operation keys is shown in FIGS. 2A and 2B, and that the portable information terminal of the present invention is not limited to those characters, numerals, and symbols.

Further, a structure in which the direction of the images displayed in the display portion 104 and the direction of the images such as characters, numerals, and symbols displayed in the operation keys 106 can be automatically changed in accordance with an angle θ between a plane having the display portion 104 of the display panel 101, and a plane having the operation keys 106 of the operation panel 102, in the connection portion 103.

Figure 4A:
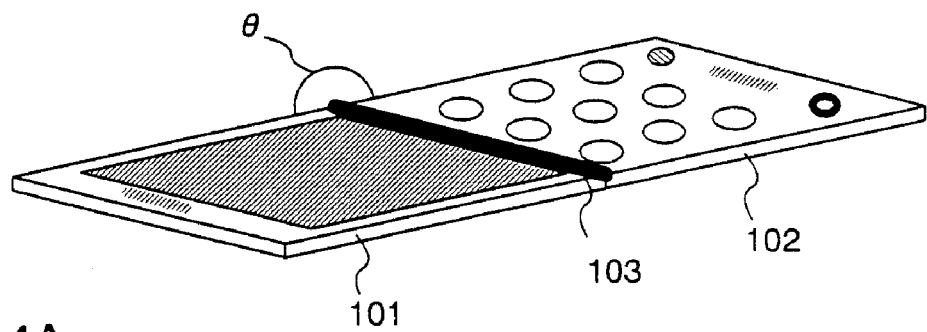
FIGS. 4A and 4B are external views of a portable information terminal of the present invention.
Figure 4B:
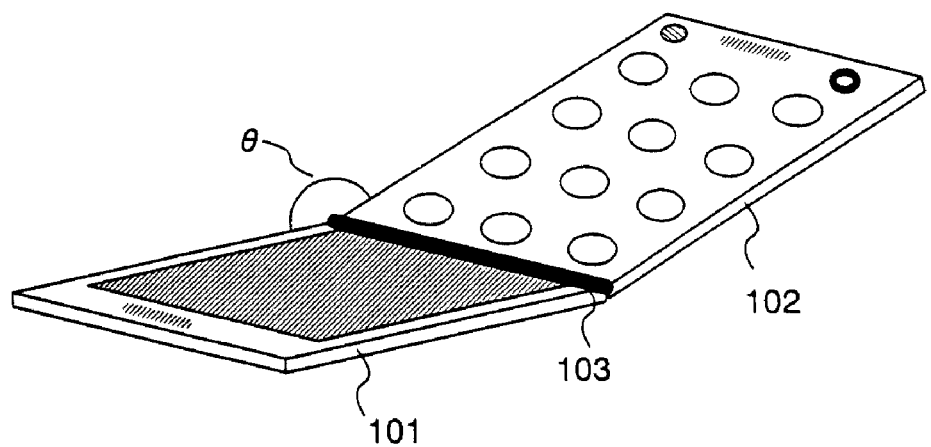

For example, for a case in which the angle θ is equal to or greater than 180°, as shown in FIG. 4A, the direction of the image displayed in the display portion 104 and the direction of the images such as characters, numerals, and symbols displayed in the operation keys 106 switches to the direction shown in FIG. 3A. Then, for a case in which the angle θ is greater than or equal to 0° and less than or equal to 180°, the direction of the image displayed in the display portion 104 and the direction of the images such as characters, numerals, and symbols displayed in the operation keys 106 switch to the direction shown in FIG. 3B.

The portable information terminal of the present invention can thus be made into a device which is easy to use for the operator in accordance with the above structure.

EMBODIMENTS

Embodiments of the present invention are explained below.

Embodiment 1

A structure of operation keys of a portable information terminal of the present invention is explained in detail in Embodiment 1.

Figure 5A:
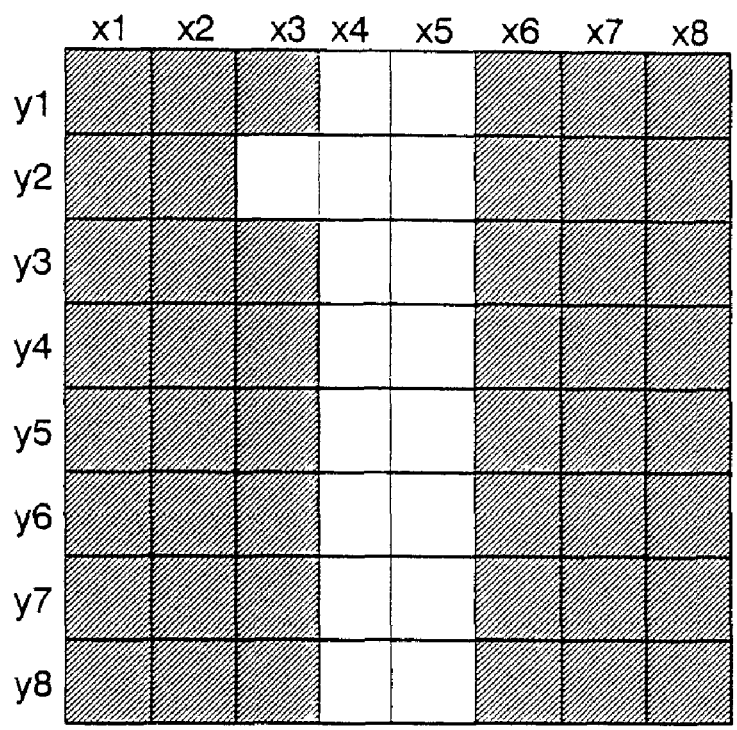
FIGS. 5A and 5B are a blow up diagram of operation keys and a driver circuit, respectively, of a portable information terminal of the present invention.

A blow up diagram of the operation keys of the portable information terminal of the present embodiment is shown in FIG. 5A. The operation keys of Embodiment 1 have a total of 8×8 pixels in which eight columns x1 to x8 and eight rows y1 to y8 are arranged in a matrix shape. Note that, although a structure having a total of 8×8 pixels is shown in Embodiment 1, the present invention is not limited to this. The number of pixels of the operation keys can be suitably determined by a user implementing the present invention.

Figure 5B:
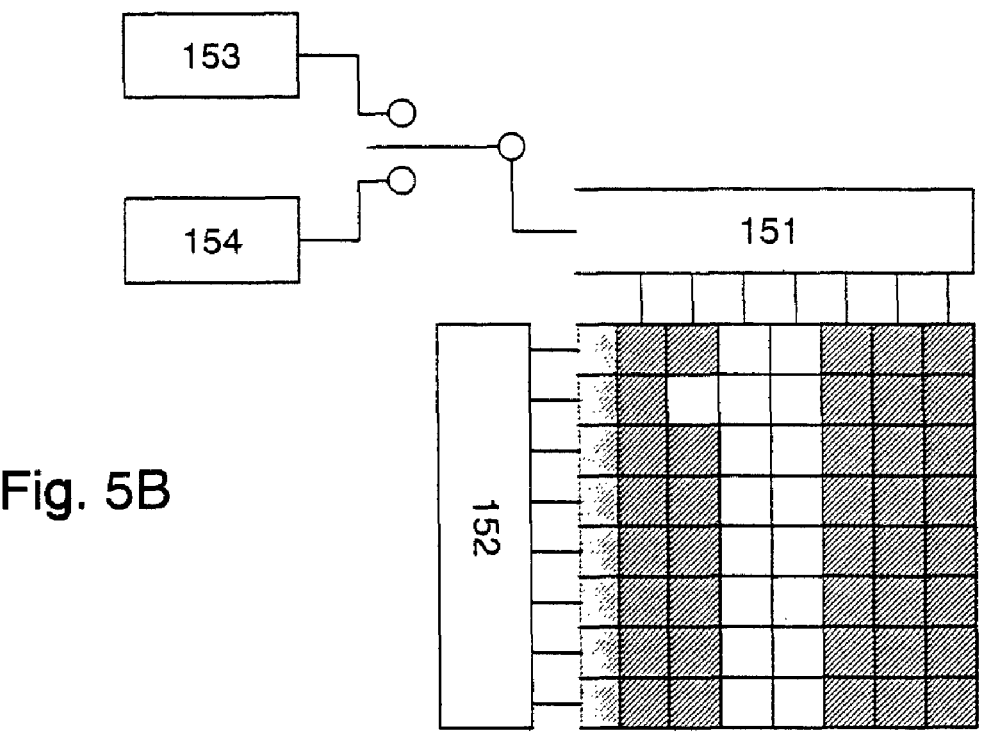

FIG. 5B shows a driver circuit group of the operation keys of the portable information terminal shown in FIG. 5A. Reference numeral 151 denotes a column driver circuit, and the column driver circuit inputs display data to each of the eight columns of pixels x1 to x8. Reference numeral 152 denotes a row driver circuit, and the row driver circuit selects the eight rows y1 to y8 in order so that the display data input to the eight columns x1 to x8 is input to designated pixels.

Each pixel of the operation keys has an LED, an EL display device, or a liquid crystal display device.

The display data is stored in a first memory 153 and a second memory 154, respectively. By selecting one of the first memory 153 and the second memory 154, the display data stored in the selected memory is input to the column driver circuit 151.

The images such as characters, numerals, and symbols displayed in the operation keys in accordance with the display data stored in the first memory 153, and the images such as characters, numerals, and symbols displayed in the operation keys in accordance with the display data stored in the second memory 154 have mutually differing directions.

Note that, although an example having two memories for storing the display data is shown in Embodiment 1, the present invention is not limited to this structure. The portable information terminal of the present invention may have two, or more than two, memories for storing the display data.

Further, the operation key memories or the operation key driver circuit group may also be contained within a component such as a microchip or an LSI within the portable information terminal. In addition, a dedicated LSI may also be formed for the operation key memories or the operation key driver circuit group.

Further, it is not necessary for the operation keys to always perform display, and a structure in which light is emitted and display is performed only when required may also be used. For example, when the portable information terminal is utilized as a portable telephone, display may be performed in all of the operation keys only within a fixed period when any one of the operation keys is pressed. If the portable information terminal is used as a mobile computer, display may be always performed in the operation keys even when there is no input to the operation keys because it is necessary for the operator to always be able to differentiate between the operation keys. Electric power consumption can be suppressed in accordance with the above structure.

Embodiment 2

A structure of an EL display device used in a display portion of a portable information terminal of the present invention is explained in detail in Embodiment 2.

The portable information terminal of Embodiment 2 uses an EL display device in a display portion, and therefore it is not necessary to use a backlight, differing from a portable information terminal using a liquid crystal display device. The portable information terminal can consequently be made smaller, lighter, and thinner. The EL display device is a self light emitting type display device, and therefore has a wider angle of view compared with the liquid crystal display device.

Figure 6:
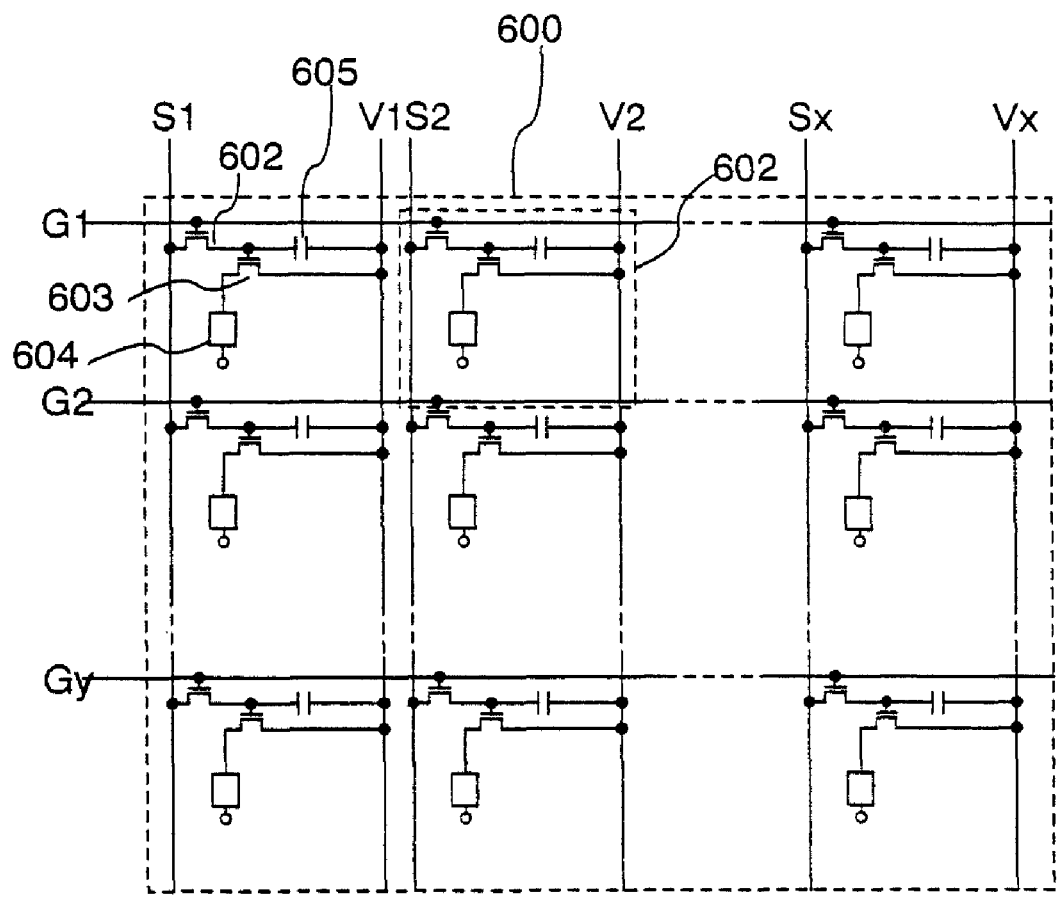
FIG. 6 is a circuit diagram of an EL display device used in a display portion of a portable information terminal of the present invention.

FIG. 6 shows a structure of the pixel portion of the EL display device of Embodiment 2. Reference numeral 600 denotes a display portion, and the display portion has source signal lines S1 to Sx, electric power source supply lines V1 to Vx, and gate signal lines G1 to Gy. A region containing one of the source signal lines S1 to Sx, one of the electric power source supply lines V1 to Vx, and one of the gate signal lines G1 to Gy is a pixel 602.

The pixel 602 has a switching TFT 602, an EL driver TFT 603, an EL element 604, and a storage capacitor 605. Note that, although a structure having the storage capacitor 605 is shown in Embodiment 2, the present invention is not limited to this structure, and a structure in which the storage capacitor 605 is not formed may also be used.

A gate electrode of the switching TFT 602 is connected to any one of the gate signal lines G1 to Gy. Further, one of a source region and a drain region of the switching TFT 602 is connected to one of the source signal lines S1 to Sx, while the other is connected to a gate electrode of the EL driver TFT 603 and to the storage capacitor 605, respectively.

A source region of the EL driver TFT 603 is connected to any one of the electric power source supply lines V1 to Vx.

Further, a drain region of the EL driver TFT 603 is connected to one of an anode and a cathode of the EL element 604.

Note that n-channel TFTs and p-channel TFTs may be used for the switching TFT 602 and for the EL driver TFT 603. However, in a case the drain region of the EL driver TFT 603 is connected to the anode of the EL element 604, it is preferable that the EL driver TFT 603 be a p-channel TFT. Conversely, in a case the drain region of the EL driver TFT 603 is connected to the cathode of the EL element 604, it is preferable that the EL driver TFT 603 be an n-channel TFT.

Embodiment 3

An example of a driver circuit of the EL display device shown by Embodiment 2 is explained in Embodiment 3.

Figure 7:
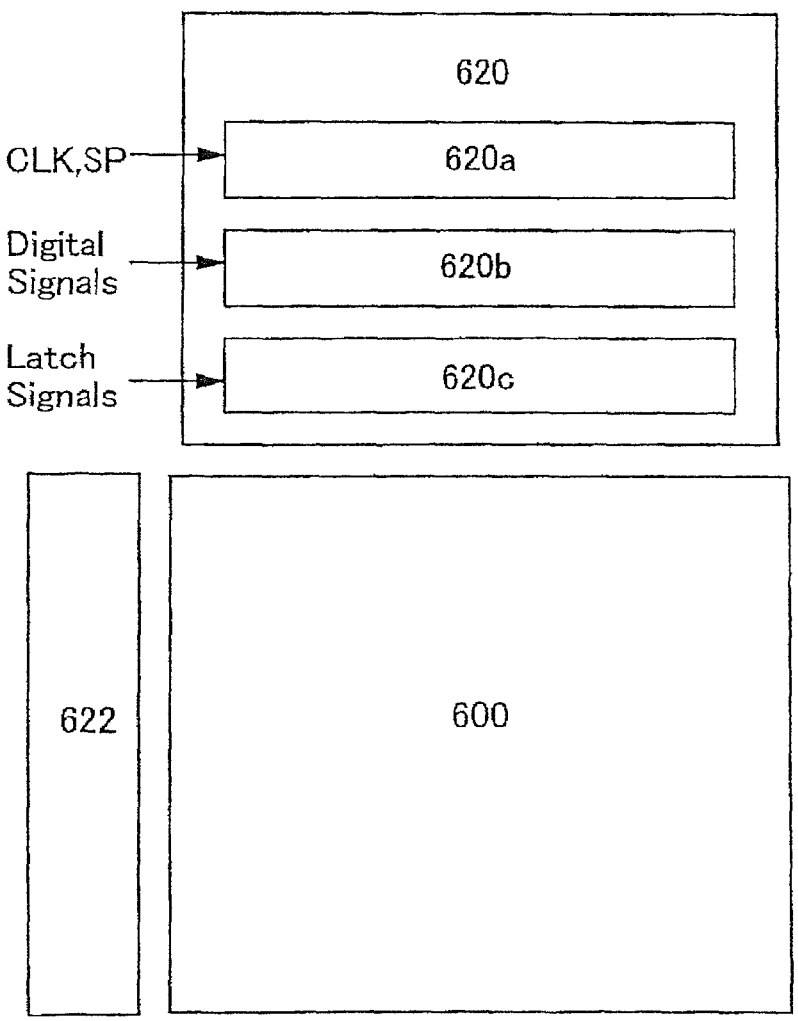
FIG. 7 is a top surface diagram of an EL display device used in a display portion of a portable information terminal of the present invention.

FIG. 7 shows a block diagram of the EL display device of Embodiment 3. Reference numeral 620 denotes a source signal line driver circuit, and reference numeral 622 denotes a gate signal line driver circuit, and both of the driver circuits control the driving of the switching TFT 602 and the EL driver TFT 603.

The source signal line driver circuit 620 has a shift register 620a, a latch (A) 620b, and a latch (B) 620c. A clock signal CLK and a start pulse SP are input to the shift register 620a in the source signal line driver circuit 620. The shift register 620a generates timing signals in order based upon the clock signal CLK and the start pulse SP, and supplies the timing signals one after another to downstream circuits.

Note that the timing signals from the shift register circuit 620a may be buffer amplified by a circuit such as a buffer (not shown in the figure) and then supplied one after another to the downstream circuits as buffer amplified timing signals. The load capacitance (parasitic capacitance) of a wiring which supplies the timing signals is large because many of the circuits and elements are connected to the wiring. The buffer is formed in order to prevent bluntness in the rise and fall of the timing signal, generated due to the large load capacitance.

The timing signals from the shift register 620a are supplied to the latch (A) 620b. The latch (A) 620b has a plurality of latch stages for processing digital data signals containing image information. The latch (A) 620b writes in and maintains a digital signal simultaneously with the input of the timing signal.

Note that the digital data signal may also be input in order to the plurality of latch stages of the latch (A) 620b when writing in the digital data signal to the latch (A) 620b. However, the present invention is not limited to this structure. The plurality of latch stages of the latch (A) 620b may be divided into a number of groups, and the digital data signal may be input to the respective groups at the same time in parallel, performing partitioned driving. Note that, at this time the number of groups is referred to as partitioned number. For example, this is referred to as partitioned drive with 4 divisions when the latches are divided into groups every four stages.

The period until the digital data signal is completely written into all of the latch stages of the latch (A) 620b is referred to as a line period. Namely, the line period begins at the point when the digital data signal is written into the leftmost stage latch within the latch (A) 620b, and is completed when the digital data signal is written into the rightmost stage latch. In practice, there are times when the line period includes the addition of a horizontal return period to the above line period.

A latch signal is supplied to the latch (B) 620c when one line period is complete. The digital data signal written into and stored in the latch (A) 620b is sent all at once at this instant to the latch (B) 620c, and is written into all of the stage latches of the latch (B) 620c, and stored.

Write in of the digital data signal is again performed, in order, to the latch (A) 620b after it has completed sending the digital data signal to the latch (B) 620c, based on the timing signal from the shift register 620a.

The digital data signal written into and stored in the latch (B) 620b is input to source signal lines S1 to Sx during the second one line period.

On the other hand, the gate signal line driver circuit 622 has a shift register and a buffer, respectively (both not shown in the figure). Further, the gate signal line driver circuit 622 may also have a level shifter in addition to the shift register and the buffer, depending upon the circumstances.

A gate signal from the shift register (not shown in the figure) supplied to the buffer (not shown in the figure), and is supplied to the corresponding gate signal line in the gate signal line driver circuit 622. The gate electrodes of the switching TFTs 602 for one line portion of pixels are connected to the gate signal lines G1 to Gy, and the switching TFTs 602 of all of the one line portion of pixels must be placed in an ON state simultaneously. A circuit in which a large electric current is capable of flowing is therefore used in the buffer.

Note that the number, structure, and operation of the source signal line driver circuits and the gate signal line driver circuits is not limited to the structure shown by Embodiment 3. It is also possible to use known source signal line driver circuits and known gate signal line driver circuits for the EL display device of Embodiment 3.

Figure 8:
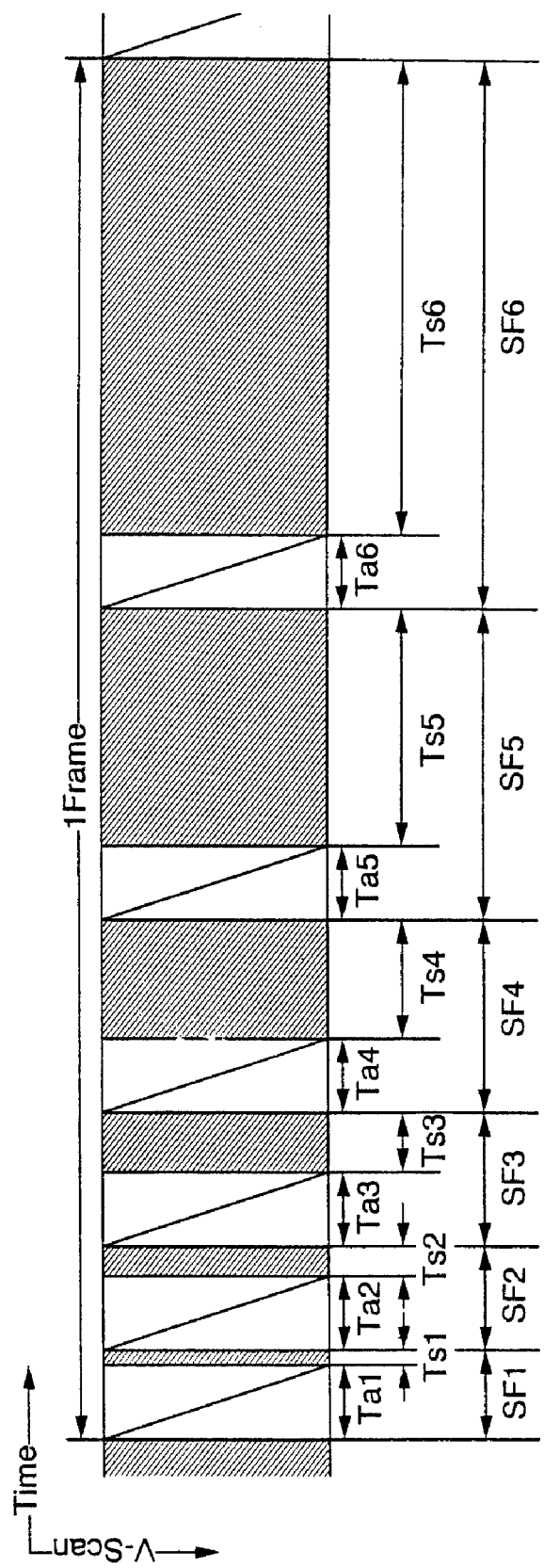
FIG. 8 is a timing chart showing a method of driving an EL display device used in a display portion of a portable information terminal of the present invention.

A timing chart for a case of performing $2^6$ gray scale display by the EL display device of Embodiment 3 and in accordance with a display period separated driving method, one type of time partitioned driving, is shown in FIG. 8. Note that, although an example of performing $2^6$ gray scale display is shown by Embodiment 3, Embodiment 3 is not limited to $2^6$ gray scales, and it is possible for the implementor to suitably determine the number of digital signal bits.

Time is shown in the horizontal axis in the timing chart of FIG. 8, while the position of the gate signal lines is shown in the vertical axis.

One frame period is divided into six subframe periods SF1 to SF6. Note that a period during which one image is displayed in all of the pixels of the display portion is referred to as one frame period F. A normal EL display device operates with an oscillation frequency equal to or greater than 60 Hz; namely, 60 or more frame periods are formed in one second, and 60 or more images are displayed in one second. If the number of images displayed during one second becomes fewer than 60, image flicker or the like begins to become visually conspicuous. Note that the plurality of periods into which one frame period is divided are referred to as subframe periods. The number of divisions of one frame period increases along with greater numbers of gray scales, and the driver circuit must be driven at high frequency.

One subframe period is divided into a write in period Ta and a display period Ts. The write in period is a period within one subframe period during which a digital signal is input to all of the pixels. The display period (also referred to as turn on period) is a period during which the EL elements are selected to be in a light emitting state or a non-light emitting state, and display is performed.

The length of the write in periods Ta1 to Ta6 of the n subframe periods SF1 to SF6, respectively, are all fixed. The display periods Ts of the subframe periods SF1 to SF6 become display periods Ts1 to Ts6, respectively.

The length of the display periods is set so as to become Ts1::Ts2::Ts3:: . . . ::Ts6=$2^0$::$2^1$::$2^2$:: . . . ::$2^5$. Note that the subframe periods SF1 to SF6 may be appear in any order. By combining the display periods, a desired gray scale display can be performed from among $2^6$ gray scales.

First, in the write in period, the electric potential (electric power source electric potential) of the electric power source supply lines V1 to Vx is maintained at the same height as the electric potential of an opposing electrode (opposing electric potential). The height of the electric power source electric potential may be set to the same height as the opposing electric potential within a range in which the EL elements do not emit light. Note that the electric power source electric potential is always maintained at a fixed level. Further, the electric potential difference between the opposing electric potential and the electric power source electric potential is referred to as an EL driver voltage. It is preferable that the EL driver voltage be 0 V during the write in period, but it may have any size such that the EL elements do not emit light.

All of the switching TFTs 602 connected to the gate signal line G1 are placed into an ON state by the gate signal input to the gate signal line G1. A digital data signal is input into the source signal lines (S1 to Sx) at the same time. The digital data signal contains "0" and "1" information, and one of the digital data signals "0" and "1" has HI electric voltage, while the other has LO voltage.

The digital signal input into the source signal lines (S1 to Sx) is then input to the gate electrodes of the EL driver TFTs 603 through the switching TFTs 602, which are in the ON state.

Next, by the gate signal input to the gate signal line G2, all of the switching TFTs 602 connected to the gate signal line G2 are placed in the ON state. The digital signal is then input to the source signal lines (S1 to Sx).

The digital data signal input to the source signal lines (S1 to Sx) is input to the gate electrodes of the EL driver TFTs 603 through the switching TFTs 602 in the ON state.

By repeating the above operations for the gate signal lines G3 to Gy, the digital data signal is input to the gate electrodes of the EL driver TFTs of all of the pixels. The period up until the digital data signal is input to the gate electrode of the EL driver TFT 603 of all of the pixels is the write in period.

The display period commences at same time as when the write in period is complete. All of the switching TFTs 602 are set into the OFF state in the display period. The electric power source electric potential is then set so as to have an electric potential difference with the opposing electric potential on an order such that the EL elements 604 emit light.

When the digital signal input to the gate electrode of the EL driver TFTs 603 has "0" information, the EL driver TFTs 603 are set into the OFF state in Embodiment 3. The pixel electrodes of the EL elements 604 are therefore maintained at an electric potential which has the same height as the opposing electric potential. As a result, the EL elements 604 having pixels to which the digital signal containing "0" information is applied do not emit light.

Conversely, in this embodiment, the EL driver TFTs 603 are placed into the ON state in a case the digital signal has "1" information. The electric potential of the pixel electrodes of the EL elements 604 are therefore maintained at the electric power source electric potential. Further, the opposing electric potential has an electric potential difference with the electric power source electric potential on an order such that the EL elements 604 emit light. As a result, the EL elements 604 having pixels to which the digital signal containing "1" information is applied emit light.

Note that, although the EL driver TFTs 603 are in the OFF state in a case the digital signal has "0" information, and although the EL driver TFTs 603 are in the ON state when the digital signal has "1" information in Embodiment 3, the present invention is not limited to this structure. A structure in which the EL driver TFTs 603 are placed in the ON state when the digital signal has "0" information, and in which the EL driver TFTs 603 are placed in the OFF state when the digital signal has "1" information may also be used.

Whether the EL elements are placed in a state of emitting light or not emitting light is thus selected in accordance with the information in the digital signal, and display is performed in all of the pixels at once. An image is formed by performing display in all of the pixels. The period during which the pixels perform display is referred to as the display period.

The display period is any of the display periods Ts1 to Ts6. Predetermined pixels are turned on in the display period Ts1 here.

Next, the write in period is entered again, and the display period begins once the digital signal is input to all of the pixels. At this point the display period becomes any of the display periods Ts2 to Ts6. Predetermined pixels are turned on in the display period Ts2 here.

Similar operations are subsequently repeated in the four remaining subframe periods, and predetermined pixels are turned on in the display periods within the respective subframe periods.

One frame period ends when the six subframe periods appear. The gray scale of each pixel is determined by adding the lengths of the display periods in which each pixels is turned on.

Note that the EL display device controls the emission of light from the EL elements in Embodiment 3 by always maintaining the opposing electric potential at a fixed electric potential, changing the write in periods and the display periods, and changing the size of the EL driver voltage. However, the present invention is not limited to this structure. The EL display device of the present invention may also control the light emission of the EL elements by always maintaining a fixed electric power source electric potential and changing the opposing electric potential.

The source signal line driver circuit 620 and the gate signal line driver circuit 622 may also be mounted on the substrate on which the display portion 600 is formed in Embodiment 3 by using a component such as an IC chip. In this case, the structure becomes one in which the source signal line driver circuit 620 and the gate signal line driver circuit 622 on the IC chip are connected to the display portion 600 through a connector such as an FPC or TAB. The EL display device contains the source signal line driver circuit 620 and the gate signal line driver circuit 622 on the IC chip in this case.

Note that it is possible to implement Embodiment 3 by freely combining it with Embodiment 1 or Embodiment 2.

Embodiment 4

An example of a driver circuit of the EL display device shown by Embodiment 2 is explained in Embodiment 4.

Figure 9:
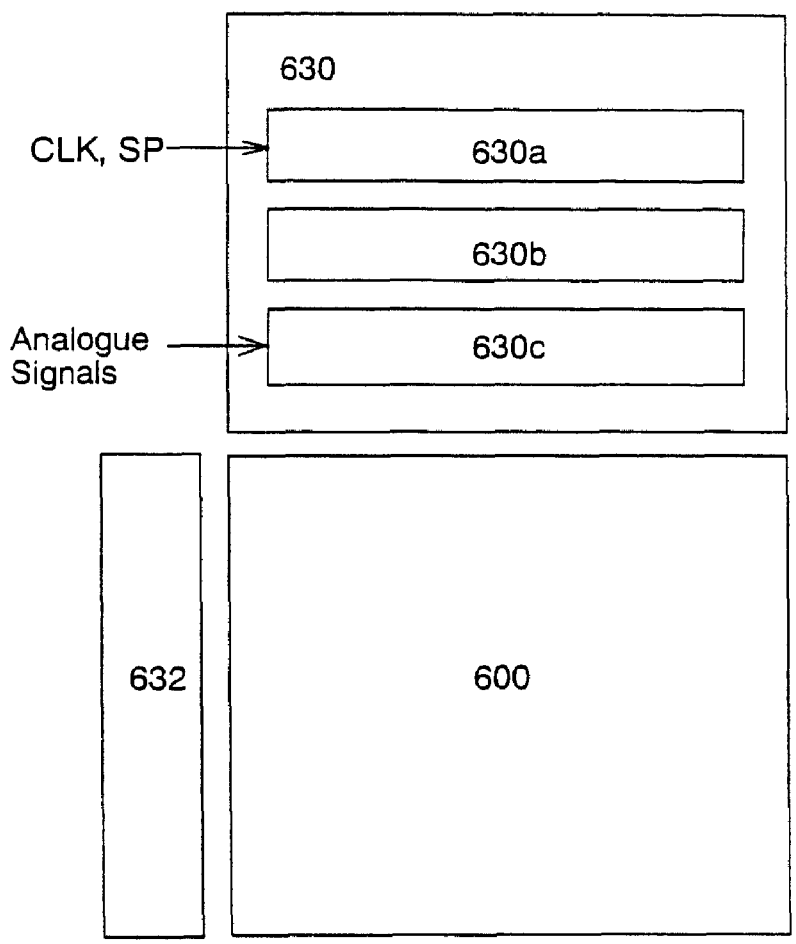
FIG. 9 is a top surface diagram of an EL display device used in a display portion of a portable information terminal of the present invention.

FIG. 9 shows a top surface view of an EL display device of Embodiment 4. Reference numeral 630 denotes a source signal line driver circuit, reference numeral 632 denotes a gate signal line driver circuit, and reference numeral 600 denotes the display portion. One each of the source signal line driver circuit and the gate signal line driver circuit are formed in Embodiment 4, but the present invention is not limited to this structure. Two source signal line driver circuits may be formed, and two gate signal line driver circuits may also be formed.

The source signal line driver circuit 630 has a shift register 630a, a level shift 630b, and a sampling circuit 630c. Note that the level shift 630b may be used when necessary, and need not always be used. Further, the structure in Embodiment 4 has the level shift 630b formed between the shift register 630a and the sampling circuit 630c, but Embodiment 4 is not limited to this structure. A structure in which the level shift 630b is incorporated within the shift register 630a may also be used.

Electric power source supply lines V1 to Vx are maintained at a fixed electric potential (electric power supply electric potential) by being connected to an electric power source.

Further, the gate signal line driver circuit 632 has a shift register and a buffer (both not shown in the figure). The gate signal line driver circuit 632 may also have a level shift.

A clock signal CLK, which is a panel control signal, and a start pulse signal SP are input to the shift register 630a. A sampling signal for sampling an analog signal having image information is output from the shift register 630a. The output sampling signal is input to the level shift 630b, the amplitude of its electric potential is made larger, and then the sampling signal is output.

The sampling signal output from the level shift 630b is input to the sampling circuit 630c. The analog signal is simultaneously input to the sampling circuit 630c through an analog signal line.

The input analog signal is sampled in accordance with the sampling signal in the sampling circuit 630c, and is input to each source signal lines S1 to Sx.

Figure 10:
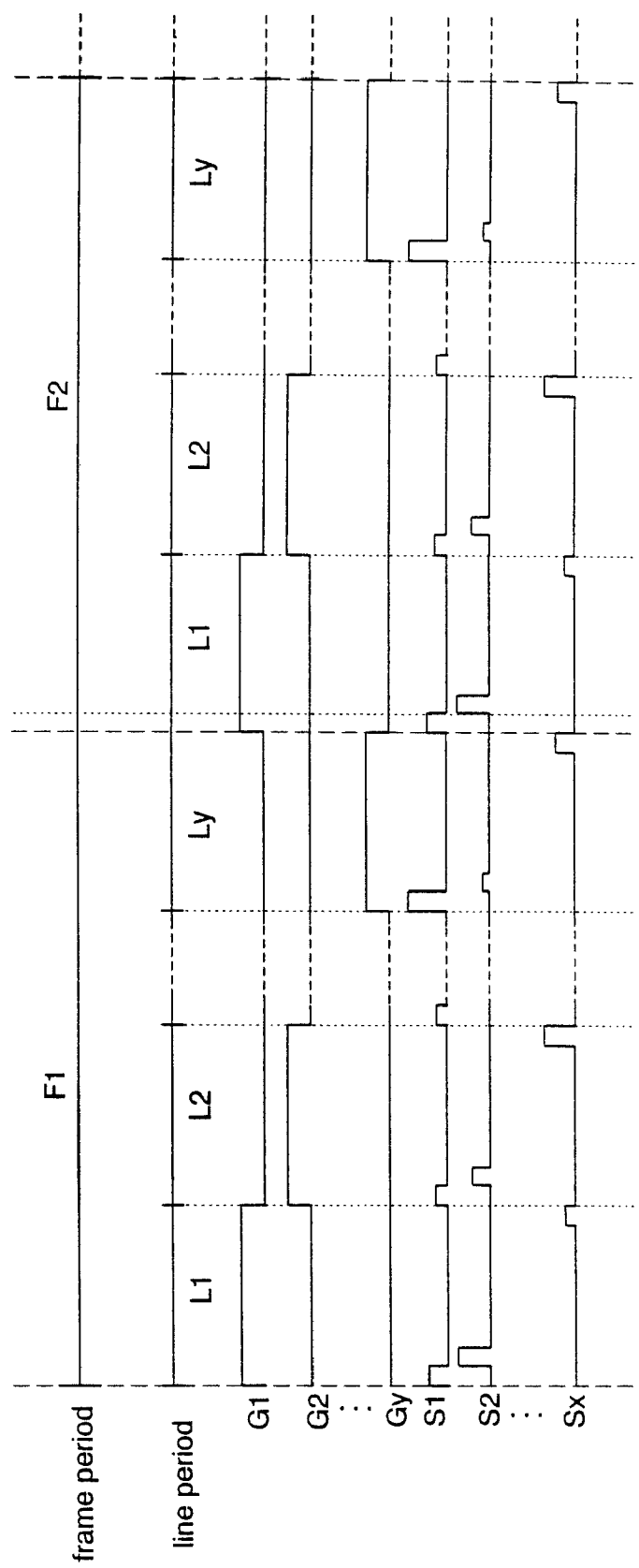
FIG. 10 is a timing chart of a method of driving an EL display device used in a display portion of a portable information terminal of the present invention.

A timing chart for a case of driving the EL display device of Embodiment 4 by an analog method is shown in FIG. 10. A period from the selection of one gate signal line until the selection of the next, different gate signal line is referred to as one line period L. Note that in this specification the selection of the gate signal line denotes a gate signal, having an electric potential such that a switching TFT becomes placed in the ON state, being input to a gate signal line.

Further, a period from when one image is displayed until the next image is displayed corresponds to one frame period F. There are y gate signal lines in the case of the EL display device of Embodiment 4, and therefore y line periods L1 to Ly are formed within one frame period.

First, the electric power source electric potential of the electric power source supply lines V1 to Vx is always maintained at a fixed value in Embodiment 4. The electric potential of opposing electrodes is also maintained at a fixed value. The electric potential of the opposing electrodes has an electric potential difference with the electric power source electric potential of an order at which the EL elements emit light when the electric power source electric potential is imparted to pixel electrodes of the EL elements 604.

The gate signal line G1 is selected in the first line period L1 in accordance with the gate signal input from the gate signal line driver circuit 632 through the gate signal line G1, and all of the switching TFTs connected to the gate signal line G1 are placed in the ON state. The analog signal is then input from the source signal line driver circuit 630 to the source signal lines S1 to Sx in order. The analog signal input to the source signal lines S1 to Sx is input to the gate electrodes of the EL driver TFTs 603 through the switching TFTs 602.

The amount of electric current flowing in channel forming regions of the EL driver TFTs 603 is controlled in accordance with a gate voltage Vgs, which is the electric potential difference between gate electrodes and source regions of the EL driver TFTs 603. The electric potential imparted to the pixel electrodes of the EL elements 604 is therefore determined by the electric potential of the analog signal input to the gate electrodes of the EL driver TFTs 603. The EL elements 604 are therefore controlled by the electric potential of the analog signal and performs light emission.

When the above operations are repeated and input of the analog signal to the source signal lines S1 to Sx is completed, the first line period L1 is complete. Note that a period until the completion of the analog signal input to the source signal lines S1 to Sx may also be combined with a horizontal return period and taken as one line period. The second line period L2 begins next, the gate signal line G2 is selected by the gate signal, and the analog signal is input in order to the source signal lines S1 to Sx, similar to the first line period L1.

All of the line periods L1 to Ly are complete when all of the gate signal lines G1 to Gy are selected. One frame period is then complete when all of the line periods L1 to Ly are completed. One image is formed within one frame period by performing display in all of the pixels. Note that all of the line periods L1 to Ly and a horizontal return period may also be combined and taken as one frame period.

The amount of light emitted by the EL elements is thus controlled in accordance with the electric potential of the analog signal, and gray scale display is performed in accordance with the control of the amount of light emitted.

The source signal line driver circuit 630 and the gate signal line driver circuit 632 may also be mounted on the substrate on which the display portion 600 is formed in Embodiment 4 by using a component such as an IC chip. In this case, the structure becomes one in which the source signal line driver circuit 630 and the gate signal line driver circuit 632 on the IC chip are connected to the display portion 600 through a connector such as an FPC or TAB. The EL display device contains the source signal line driver circuit 630 and the gate signal line driver circuit 632 on the IC chip in this case.

Note that it is possible to implement Embodiment 4 by freely combining it with Embodiment 1 or Embodiment 2.

Embodiment 5

An EL display device having a structure which differs from that of Embodiments 2 to 4 is explained in Embodiment 5.

Figure 11:
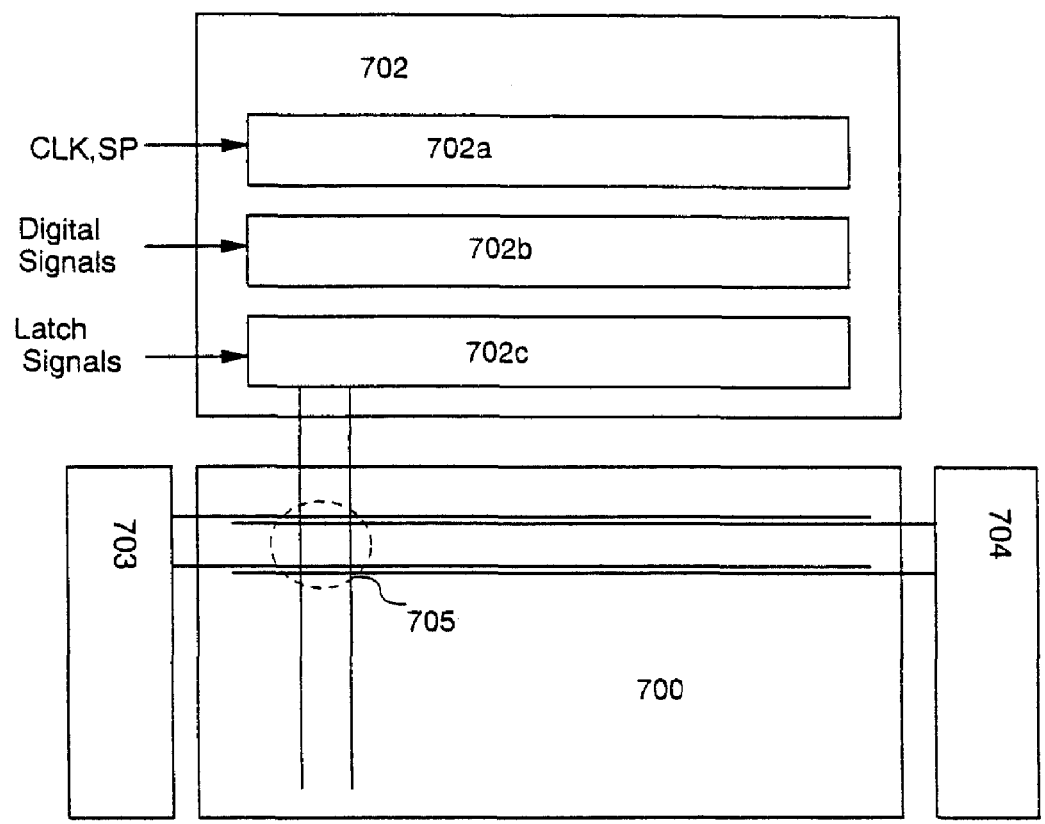
FIG. 11 is a top surface diagram of an EL display device used in a display portion of a portable information terminal of the present invention.

An example of a block diagram of an EL display device of the present invention is shown in FIG. 11. The EL display device of FIG. 11 has a display portion 700 formed on a substrate by TFTs, a source signal line driver circuit 702 arranged in the periphery of the display portion 700, a write in gate signal line driver circuit (a first gate signal line driver circuit) 703, and an erasure gate signal line driver circuit (a second gate signal line driver circuit) 704. Note that, although the EL display device has one source signal line side driver circuit in Embodiment 5, two source signal line side driver circuits may also be used.

The source signal line driver circuit 702 has at least a shift register 702a, a latch (A) 702b, and a latch (B) 702c.

A clock signal CLK and a start pulse SP are input to the shift register 702a in the source signal line driver circuit 702. The shift register 702a generates timing signals in order based upon the clock signal CLK and the start pulse SP, and supplies the timing signals one after another to downstream circuits through a circuit such as a buffer (not shown in the figure).

The timing signals from the shift register circuit 702a may also be buffer amplified by such as the buffer (not shown in the figure). The load capacitance (parasitic capacitance) of a wiring which supplies the timing signals is large because many of the circuits and elements are connected to the wiring.

The buffer is formed in order to prevent bluntness in the rise and fall of the timing signal, generated due to the large load capacitance.

The timing signals from the shift register 702a are supplied to the latch (A) 702b. The latch (A) 702b has a plurality of latch stages for processing n-bit digital data signals containing image information. The latch (A) 702b writes in and maintains an n-bit digital signal supplied from external of the EL display device and simultaneously with the input of the timing signal.

Note that the digital signal may also be input in order to the plurality of latch stages of the latch (A) 702b when writing in the n-bit digital signal to the latch (A) 702b. However, the present invention is not limited to this structure. The plurality of latch stages of the latch (A) 702b may be divided into a number of groups, and the digital signal may be input to the respective groups at the same time in parallel, performing namely partitioned driving. Note that, the number of groups is called the partitioned number. For example, this is referred to as gray scale drive with 4 divisions when the latches are divided into groups every four stages.

The period until the digital signal is completely written into all of the latch stages of the latch (A) 702b is referred to as a line period. Namely, the line period begins at the point when the digital signal is written into the leftmost stage latch within the latch (A) 702b, and is completed when the digital signal is written into the rightmost stage latch. In practice, there are times when the line period includes the addition of a horizontal return period to the above line period.

A latch signal is supplied to the latch (B) 702c when one line period is finished. The digital signal written into and stored in the latch (A) 702b is sent all at once at this instant to the latch (B) 702c, and is written into all of the stage latches of the latch (B) 702c, and stored.

Write in of the digital signal supplied external from the EL display device is again performed, in order, to the latch (A) 702b after it has completed sending the digital signal to the latch (B) 702c, based on the timing signal from the shift register 702a.

The digital signal written into and stored in the latch (B) 702b is input to source signal lines S1 to Sx during the second one line period.

On the other hand, the write in gate signal line driver circuit 703 and the erasure gate signal line driver circuit 704 each have a shift register and a buffer (both not shown in the figure). Further, the write in gate signal line driver circuit 703 and the erasure gate signal line driver circuit 704 may also have a level shifter in addition to the shift register and the buffer, depending upon the circumstances.

A timing signal is supplied from the shift registers (not shown in the figure) to the buffers (not shown in the figure) in the write-in gate signal line driver circuit 703 and the erasure gate signal line driver circuit 704, and then is supplied to the corresponding gate signal lines (also referred to as scanning lines). The gate electrodes of one line portion of pixel TFTs are connected to the gate signal line, and the one line portion of pixel TFTs must all be placed in an ON state simultaneously. A circuit in which a large electric current is capable of flowing is therefore used in the buffer.

The source signal line driver circuit 702, the write in gate signal line driver circuit 703, and the erasure gate signal line driver circuit 704 may also be formed in the substrate on which the display portion 700 is formed in Embodiment 5 or by using a component such as an IC chip to mount on a substrate with a display portion 700. In this case, the structure becomes one in which the source signal line driver circuit 702, the write in gate signal line driver circuit 703, and the erasure gate signal line driver circuit 704 on the IC chip are connected to the display portion 700 through a connector such as an FPC or TAB. The EL display device contains the source signal line driver circuit 702, the write in gate signal line driver circuit 703, and the erasure gate signal line driver circuit 704 on the IC chip in this case.

Figure 12:
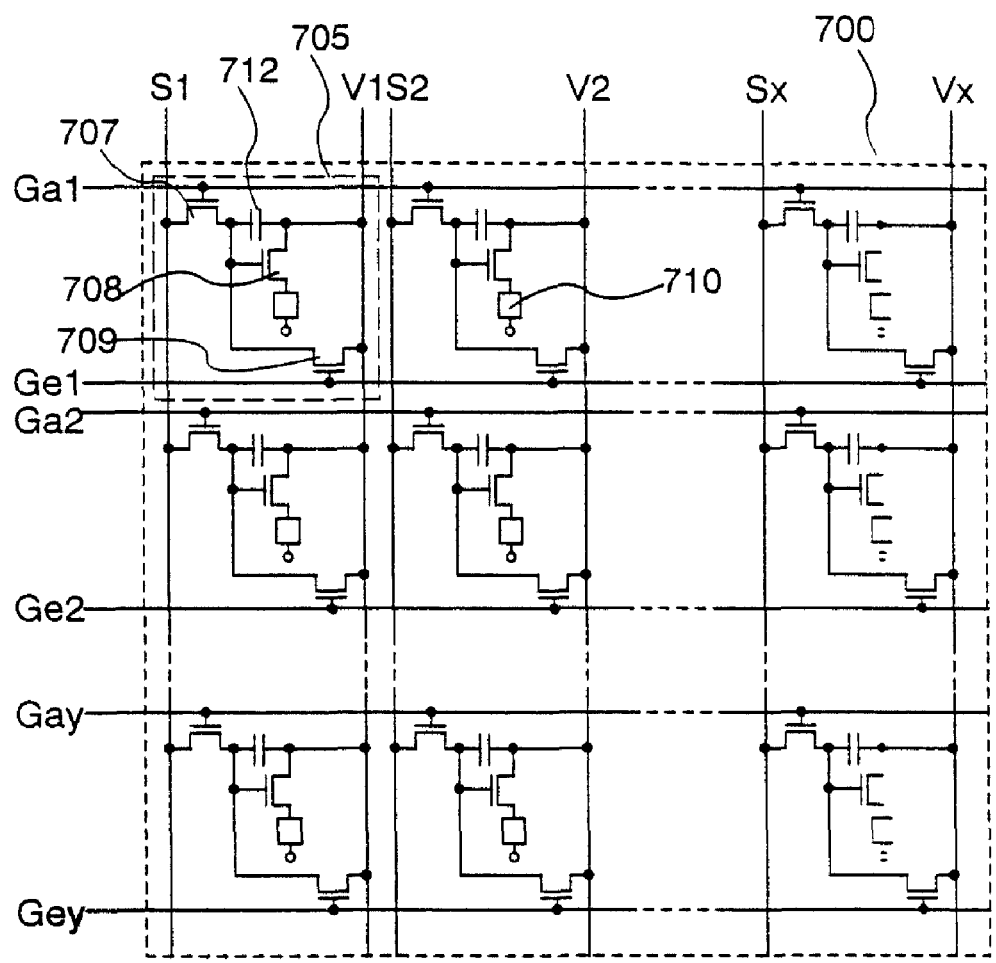
FIG. 12 is a circuit diagram of an EL display device used in a display portion of a portable information terminal of the present invention.

FIG. 12 shows a blow up of the display portion 700. The source signal lines S1 to Sx connected to the latch (B) 702c of the source signal line driver circuit 702; electric power source supply lines V1 to Vx connected to an electric power source external to the EL display device; write in gate signal lines (first gate signal lines) Ga1 to Gay connected to the write in gate signal line driver circuit 703; and erasure gate signal lines (second gate signal lines) Ge1 to Gey connected to the erasure gate signal line driver circuit 704 are formed in the display portion 700.

A region containing one each of: the source signal lines S1 to Sx; the electric power source supply lines V1 to Vx; the write in gate signal lines Ga1 to Gay; and the erasure gate signal lines Ge1 to Gey is a pixel 705. A plurality of the pixels 705 are arranged in a matrix shape in the display portion 700.

Reference numeral 707 within the pixel 705 denotes a switching TFT. A gate electrode of the switching TFT 707 is connected to one of the write in gate signal lines Ga1 to Gay. One of a source region and a drain region of the switching TFT 707 is connected to one of the source signal lines S1 to Sx, and the other is connected to a gate electrode of an EL driver TFT 708 and to a storage capacitor 712. Further, the storage capacitor 712 is connected to one of the electric power source supply lines V1 to Vx.

The storage capacitor 712 is formed in order to maintain the gate voltage of the EL driver TFT 708 when the switching TFT 707 is in a non-selected state (OFF state). Note that, although a structure in which the storage capacitor 712 is formed is shown in Embodiment 5, the present invention is not limited to this structure, and a structure in which the storage capacitor 712 is not formed may also be used.

Further, a source region of the EL driver TFT 708 is connected to one of the electric power source supply lines V1 to Vx, and a drain region is connected to an anode or a cathode of an EL element 710.

One of a source region and a drain region of the erasure TFT 709 is connected to a gate electrode of the EL driver TFT 708, and the other is connected to one of the electric power source supply lines V1 to Vx. A gate electrode of the erasure TFT 709 is connected to one of the erasure gate signal lines Ge1 to Gey.

The EL element 710 is composed of an anode, a cathode, and an EL layer formed between the anode and the cathode. When the anode is connected to the drain region of the EL driver TFT 708, the anode becomes a pixel electrode and the cathode becomes an opposing electrode. Conversely, if the cathode is connected to the drain region of the EL driver TFT 708, then the cathode becomes the pixel electrode and the anode becomes the opposing electrode.

An opposing electric potential is imparted to the opposing electrode of the EL element 710. The electric potential difference between the opposing electric potential and the electric power source electric potential is always maintained in Embodiment 5 at an electric potential difference on an order at which the EL element emits light when the electric power source electric potential is imparted to the pixel electrode. The electric power source electric potential and the opposing electric potential are imparted to the EL display device of the present invention in accordance with an electric power source formed in a component such as an external IC.

In typical EL display devices at present, the necessary amount of electric current per surface area of the display portion is on the order of several mA/cm² when the amount of light emitted per surface area of the pixel has a luminescence of 200 cd/m². In particular, therefore, if the size of the screen area becomes large, the height of the electric potential imparted from the electric power source formed in the IC becomes difficult to control by a switch. The electric power source electric potential and the opposing electric potential are always maintained as fixed in Embodiment 5, and the height of the electric potential imparted from the electric power source formed in the IC need not be controlled by a switch. Embodiment 5 is therefore useful in achieving a panel having a larger screen size.

The switching TFT 707, the EL driver TFT 708, and the erasure TFT 709 can either use n-channel TFTs or p-channel TFTs. Further, the switching TFT 707, the EL driver TFT 708, and the erasure TFT 709 may have, in addition to a single gate structure, a multi-gate structure such as a double gate structure of a triple gate structure.

Note that it is preferable that the EL driver TFT 708 be a p-channel TFT for cases in which the drain region of the EL driver TFT 708 is connected to the anode of the EL element 710. On the other hand, it is preferable that the EL driver TFT 708 be an n-channel TFT for cases in which the drain region of the EL driver TFT 708 is connected to the cathode of the EL element 710.

Figure 13:
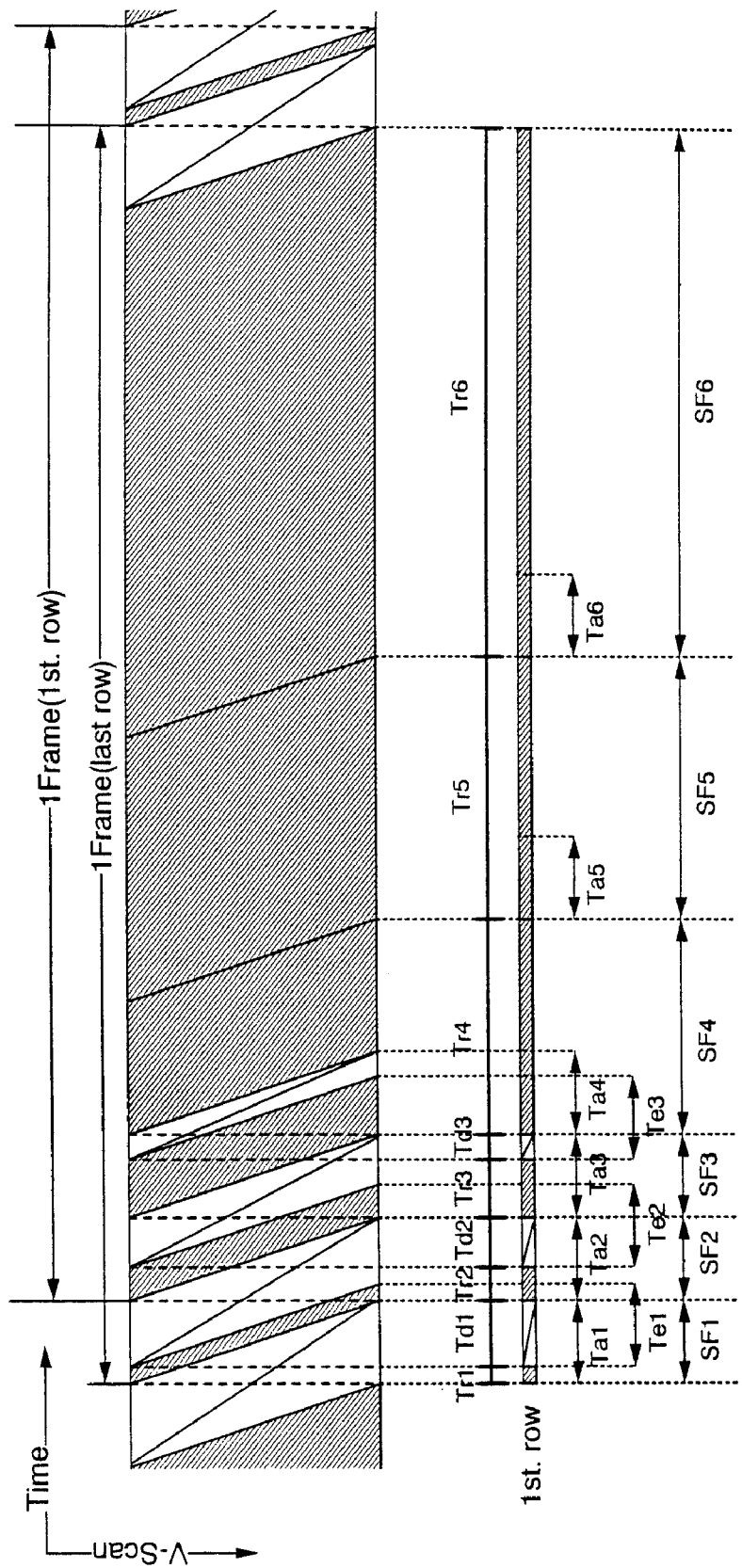
FIG. 13 is a timing chart showing a method of driving an EL display device used in a display portion of a portable information terminal of the present invention.

Next, a timing chart for a case of performing $2^6$ gray scale display with the EL display device of Embodiment 5 in accordance with simultaneous erasing scan driving, one method of time partitioned drive, is shown in FIG. 13. Note that, although an example of performing $2^6$ gray scale display is explained by Embodiment 5, the present embodiment is not limited to $2^6$ gray scales, and it is possible for an operator to suitably determine the number of digital signal bits.

The horizontal axis shows time and the vertical axis shows gate signal lines in the timing chart of FIG. 13.

First, the switching TFTs 707 of all pixels connected to the write in gate signal line Ga1 (a first line of pixels) are placed in the ON state in accordance with a write in gate signal input to the write in gate signal line Ga1 from the write in gate signal line driver circuit 703.

The first bit of the digital signal is then input simultaneously to the source signal lines S1 to Sx from the latch (B) 702c of the source signal line driver circuit 702. The digital signal is input to the gate electrodes of the EL driver TFTs 708 through the switching TFTs 707. The digital signal has "0" or "1" information, and one of the "0" and "1" digital signals is a signal having HI voltage, while the other is a signal having LO voltage.

In a case the digital signal has "0" information, the EL driver TFTs 708 are placed in the OFF state in Embodiment 5. The electric power source electric potential is therefore not imparted to the pixel electrode of the EL elements 710. As a result, the EL elements 710 of pixels into which the digital signals having "0" information are input do not emit light.

Conversely, the EL driver TFTs 708 are placed in the ON state when a digital signal having "1" information is input. The electric power source electric potential is therefore imparted to the pixel electrodes of the EL elements 710. As a result, the EL elements 710 of pixels into which the digital signals having "1" information are input emit light.

Note that, although the EL driver TFTs 708 are in the OFF state when the digital signal has "0" information, and although the EL driver TFTs 708 are in the ON state when the digital signal has "1" information in Embodiment 5, the present invention is not limited to this structure. A structure in which the EL driver TFTs 708 are placed in the ON state when the digital signal has "0" information, and in which the EL driver TFTs 708 are placed in the OFF state when the digital signal has 1 information may also be used.

The EL elements 710 are placed in a state of emitting light or not emitting light at the same time that the digital signal is input to the first line of pixels, and the first line of pixels perform display. A period during which the pixels perform display is referred to as a display period Tr. In particular, the display period which begins by input of the first bit of the digital signal to the pixels is referred to as a display period Tr1. The timing at which the display periods of each line begin have time differences.

Next, the switching TFTs 707 of all pixels connected to the write in gate signal line Ga2 are placed in the ON state in accordance with the write in gate signal input to the write in gates signal line Ga2 at the same time as the selection of the next gate signal line Ga1 is completed. The first bit of the digital signal is then input to the second line pixels from the source signal lines S1 to Sx.

Note that the input of the signal to the pixels denotes the input of the signal to the gate electrode of the EL driver TFT through the switching TFT of the pixel in Embodiment 5.

All of the write in gate signal lines Ga1 to Gax are then selected in order in accordance with the write in gate signal input to all of the write in gate signal lines Ga1 to Gax. The first bit of the digital signal is then input to all of the lines of pixels. A period until the first bit of the digital signal is input to the pixels of all lines denotes a write in period Ta1.

On the other hand, before the first bit of the digital signal is input to all of the lines of pixels, namely before the write in period Ta1 is complete, the erasure gate signal line Ge1 is selected in accordance with an erasure gate signal input from the erasure gate signal line driver circuit 704 in parallel with the input of the first bit of the digital signal to the pixels.

The erasure TFTs 709 of all the pixels (the first line of pixels) connected to the erasure gate line Ge1 are then placed in an ON state in accordance with the erasure gate signal input to the erasure gate signal line Ge1. The electric power source electric potentials of the electric power source supply lines V1 to Vx are then imparted to the gate electrodes of the EL driver TFTs 708 through the erasure TFT 709.

The gate electrode and the source region of the EL driver TFT 708 are maintained at the same electric potential height when the electric power source electric potential is imparted to the gate electrode of the EL driver TFT 708, and therefore the EL driver TFTs 708 are place in the OFF state. The electric power source electric potential consequently is not imparted to the pixel electrodes of the EL elements 710, and all of the EL elements of the first line of pixels then become placed in the non-light emitting state so that the first line of pixels do not perform display. In other words, the digital signals stored by the gate electrodes of the EL driver TFTs 708 from the point at which the write in gate signal line Ga1 is selected in accordance with the write in gate signal are thus erased by imparting the electric power source electric potential to the gate electrodes of the EL driver TFTs 708. The first line of pixels therefore do not perform display.

A period during which the pixels do not perform display is referred to as a non-display period Td. For the first line of pixels, the display period Tr1 is completed at the same time as the erasure gate signal is input to the erasure gate signal line Ge1, and the non-display period Td1 thus begins. Then, similar to the display period Tr, the timing at which the non-display period Td begins in each line has a time differences for each line.

The erasure TFTs 709 of all the pixels (the second line of pixels) connected to the erasure gate signal line Ge2 are then placed in an ON state in accordance with the erasure gate signal input to the erasure gate signal line Ge2 at the same time as when the selection of Ge1 is complete. The electric power source electric potentials of the electric power source supply lines V1 to Vx are then imparted to the gate electrodes of the EL driver TFTs 708 through the erasure TFT 709. The EL driver TFTs 708 are placed in the OFF state when the electric power source electric potential is imparted to the gate electrodes of the EL driver TFTs 708. The electric power source electric potential is therefore not imparted to the pixel electrodes of the EL elements 710. As a result, the EL elements of the second line of pixels are all placed in a non-light emitting state, and display is no longer performed in the second line of pixels, becoming a non-display state.

The erasure gate signal is the input to all of the erasure gate signal lines in order. A period until all of the erasure gate signal lines (Ga1 to Gax) are selected and the first bit of the digital signal stored in all the lines of pixels is erased is referred to as an erasure period Te1.

On the other hand, before the first bit of the digital signal stored in all the lines of pixels is erased, namely before the erasure period Te1 is complete, the write in gate signal line Ga1 is selected in accordance with the write in gate signal input from the write in gate signal line driver circuit 704. This occurs in parallel with the erasure of the first bit of the digital signal in the pixels. Display again is performed in the first line of pixels as a result, the non-display period Td1 finished, and a display period Tr2 begins.

All of the write in gate signal lines are similarly selected in order, and the second bit of the digital signal is input to all of the pixels. A period until the input of the second bit of the digital signal is finished to all the lines of pixels is referred to as the write in period Ta2.

On the other hand, before the second bit of the digital signal input to all the lines of pixels is erased, namely before the write in period Ta2 is complete, the erasure gate signal line Ge2 is selected in accordance with the erasure gate signal input from the erasure gate signal line driver circuit 704. This occurs in parallel with the write in of the second bit of the digital signal in the pixels. The EL elements of the first line of pixels are thus all placed in a non-light emitting state, and the first line of pixels no longer performs display. The display period Tr2 therefore finishes in the first line of pixels, and a non-display period Td2 begins.

The erasure gate signal is then input in order to all of the erasure gate signal lines. A period until all of the erasure gate signal lines Ga1 to Gax are selected and the second bit of the digital signal stored in all the lines of pixels is erased is an erasure period Te2.

The above operations are repeatedly performed until the fourth bit of the digital signal is input to the pixels, and the display periods Tr and the non-display periods Td repeatedly appear. The display period Tr1 is the period from when the write in period Ta1 begins until the erasure period Te1 begins. Further, the non-display period Td1 is the period from when the erasure period Te1 begins until the display period Tr2 begins. Display periods Tr2 and Tr3, and non-display periods Td2 and Td3 each then have their periods determined by the write in periods Ta1, Ta2, Ta3, and Ta4, and the erasure periods Te1, Te2, and Te3, respectively, similar to the display period Tr1 and the non-display period Td1.

After an m-th-bit of the digital signal is input to the first line of pixels, the erasure gate signal lines Ge1 to Gey become unselected in accordance with the erasure gate signal. For simplicity of explanation, an example of a case in which the erasure gate signal lines Ge1 to Gey are unselected when the fourth bit of the digital signal is input is explained in Embodiment 5, but the present invention is not limited to this. Whether the erasure gate signal lines Ge1 to Gey are selected or unselected when a certain bit of the digital signal is input can be arbitrarily selected with the present invention.

A display period Tr4 begins and the first line of pixels perform display when the fourth bit of the digital signal is input to the first line of pixels. The fourth bit of the digital signal is then stored in the pixels until the next bit of the digital signal is input.

The fourth bit of the digital signal stored in the pixels is replaced by the fifth bit of the digital signal when the fifth bit of the digital signal is then input to the first line of pixels. A display period Tr5 thus begins in the first line of pixels, and display is performed. The fifth bit of the digital signal is stored by the pixels until the next bit of the digital signal is input.

The fifth bit of the digital signal stored in the pixels is replaced by the sixth bit of the digital signal when the sixth bit of the digital signal is then input to the first line of pixels. A display period Tr6 thus begins in the first line of pixels, and display is performed. The sixth bit of the digital signal is stored by the pixels until the first bit of the digital signal of the next frame period is input.

The display period Tr4 is the period from when the write in period Ta4 begins until the write in period Ta5 begins. The display periods Tr5 and Tr6 also have their periods determined similar to that of the display period Tr4, in accordance with the write in periods Ta5, Ta6, and the first write in period Ta1 in the next frame period.

Note that it is necessary for the sum of the lengths of all of the write in periods to be shorter than one frame period in Embodiment 5, and in addition, that the length of the display periods be set so that $Tr1::Tr2::Tr3:: \ldots ::Tr6 = 2^0::2^1::2^2:: \ldots ::2^5$. Further, it is very important that the write in periods do not overlap with each other.

One image can be displayed when the display periods Tr1 to Tr6 are complete in all of the pixels. The period during which one image is displayed is referred to as one frame period F in the driving method of the present invention.

After one frame period is complete, a write in gate signal is once again input to the write in gate signal line Ga1 from the write in gate signal line driver circuit 703. The first bit of the digital signal is input to the pixels as a result, and the display period Tr1 once again begins in the first line of pixels. The above stated operations are then repeated again.

It is preferable to form 60 or more frame periods every second with a normal EL display device. If the number of images displayed in one second becomes fewer than 60, image flicker starts to become visually conspicuous.

The gray scale displayed by a pixel during one frame period can be set by finding the total sum of the lengths of the display periods during which the EL element of the pixel emits light during the one frame period.

It is vital that the write in period Ta4, in which the fourth bit of the digital signal is written in to the pixels, be shorter than the length of the display period Tr4.

Further, the display periods Tr1 to Tr6 may appear in any order. For example, it is possible for the display periods to appear such that Tr3, Tr5, Tr2, . . . , follow after Tr1 within one frame period. However, it is preferable that the erasure periods Te1 to Te6 have an order such that they do not overlap with each other.

Non-light emitting periods during which display is not performed can be formed with Embodiment 5. If a completely white image is displayed in an EL display device when using a conventional analog driving method, then the EL elements always emit light and this becomes a cause of quickening EL layer degradation. Non-light emitting periods can be formed with the present invention, and therefore degradation of the EL layers can be suppressed to a certain extent.

Note that portions of the display periods Tr and the write in periods Ta overlap in Embodiment 5. In other words, it is possible to have pixel display even during the write in periods Ta. The ratio of the total sum of the lengths of the display periods Tr in one frame period (duty ratio) is therefore determined only by the lengths of the write in periods Ta.

Note that it is possible to implement Embodiment 5 by freely combining it with Embodiment 1.

Embodiment 6

In Embodiment 6, a method of manufacturing a display portion having an EL display device, and TFTs (n-channel TFTs and p-channel TFTs) of a driver circuit formed in the periphery of the display portion, on the same substrate simultaneously is explained in detail.

Figure 14A:
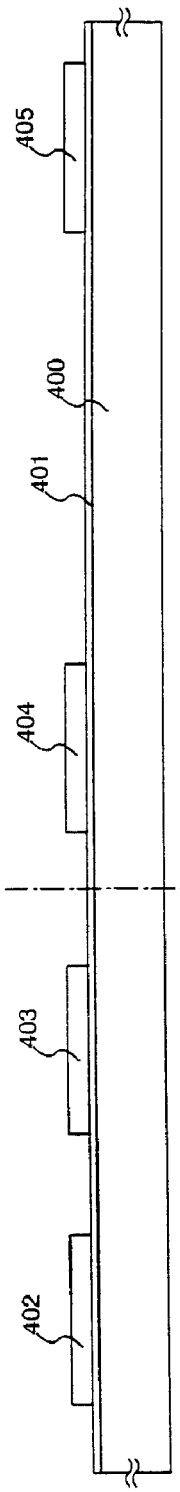
FIGS. 14A to 14D are diagrams showing a method of manufacturing an EL display device used in a display portion of a portable information terminal of the present invention.

First, as shown in FIG. 14A, a base film 401 made from an insulating film such as a silicon oxide film, a silicon nitride film, or a silicon nitride oxide film is formed on a substrate 400 made from glass such as barium borosilicate glass or aluminum borosilicate glass, typically Corning Corp. #7059 glass or #1737 glass, or made from a quartz substrate. For example, a silicon nitride oxide film made from $SiH_4$, $NH_3$, and $N_2O$ by plasma CVD is formed with a thickness of 10 to 200 nm (preferably from 50 to 100 nm), and a hydrogenized silicon nitride oxide film with a thickness of 50 to 200 nm (preferably between 100 and 150 nm), made from $SiH_4$ and $N_2O$, is similarly formed and laminated. Note that the base film is shown as one layer in FIG. 14A. The base film 401 is shown as a two layer structure in Embodiment 6, but it may also be formed as a single layer of the above insulating films, and it may also be formed having a lamination structure in which two layers or more are laminated.

Semiconductor layers 402 to 405 are formed by a crystalline semiconductor film manufactured using a laser crystallization method of a semiconductor film having an amorphous structure, or using a known thermal crystallization method. The thickness of the semiconductor layers 402 to 405 is formed to a thickness of 25 to 80 nm (preferably between 30 and 60 nm). There are no limitations in the crystalline semiconductor film material, but it is preferable to form the film from a semiconductor material such as silicon or a silicon germanium (SiGe) alloy.

As for known crystallization methods, there is a thermal crystallization method using an electric furnace, a laser annealing crystallization method using laser light, a lamp annealing crystallization method using infrared light, and a crystallization method using a catalyst metal.

A laser such as a pulse emission type or continuous emission type excimer laser, a YAG laser, and a $YVO_4$ laser can be used in the laser crystallization method to manufacture a crystalline semiconductor film. A method of condensing laser light emitted from a laser emission device into a linear shape by an optical system and then irradiating the light to the semiconductor film may be used when these types of lasers are used. The crystallization conditions may be suitably selected by the operator, but when using the excimer laser, the pulse emission frequency is set to 300 Hz, and the laser energy density is set from 100 to 400 $mJ/cm^2$ (typically between 200 and 300 $mJ/cm^2$). Further, the second harmonic is utilized when using the YAG laser, the pulse emission frequency is set from 30 to 300 KHz, and the laser energy density may be set from 300 to 600 $mJ/cm^2$ (typically between 350 and 500 $mJ/cm^2$). The laser light collected into a linear shape with a width of 100 to 1000 μm, for example 400 μm, is then irradiated over the entire surface of the substrate. This is performed with an overlap ratio of 50 to 98% for the linear shape laser light.

A gate insulating film 406 is formed covering the semiconductor layers 402 to 405. A gate insulating film 406 is formed by an insulating film containing silicon with a thickness of 40 to 150 nm by plasma CVD or sputtering. A 120 nm thick silicon nitride oxide film is formed in Embodiment 6. The gate insulating film 406 is not limited to this type of silicon nitride oxide film, of course, and other insulating films containing silicon may also be used, in a single layer or in a lamination structure. For example, when using a silicon oxide film, it can be formed by plasma CVD with a mixture of TEOS (tetraethyl orthosilicate) and $O_2$, at a reaction pressure of 40 Pa, with the substrate temperature set from 300 to 400° C., and by discharging at a high frequency (13.56 MHz) electric power density of 0.5 to 0.8 $W/cm^2$. Good characteristics as a gate insulating film can be obtained by subsequently performing thermal annealing, at between 400 and 500° C., of the silicon oxide film thus manufactured.

A first conducting film 407 and a second conducting film 408 are then formed on the gate insulating film 406 in order to form gate electrodes. The first conducting film 407 is formed from Ta (tantalum) with a thickness of 50 to 100 nm, and the second conducting film 408 is formed from W (tungsten) having a thickness of 100 to 300 nm, in Embodiment 6.

The Ta film is formed by sputtering, and sputtering of a Ta target is performed by Ar. If appropriate amounts of Xe and Kr are added to Ar at the time of sputtering, the internal stress of the Ta film is relaxed, and film peeling can be prevented. The resistivity of an α phase Ta film is on the order of 20 μΩcm, and it can be used in the gate electrode, but the resistivity of a β phase Ta film is on the order of 180 μΩcm and it is unsuitable for the gate electrode. An α phase Ta film can easily be obtained if a tantalum nitride film, which possesses a crystal structure near that of α phase Ta, is formed with a thickness of 10 to 50 nm as a base for Ta in order to form α phase Ta.

The W film is formed by sputtering with a W target, which can also be formed by thermal CVD using tungsten hexafluoride ($WF_6$). Whichever is used, it is necessary to be able to make the film become low resistance in order to use it as the gate electrode, and it is preferable that the resistivity of the W film be made equal to or less than 20 μΩcm. The resistivity can be lowered by enlarging the crystal grains of the W film, but for cases in which there are many impurity elements such as oxygen in the W film, crystallization is inhibited, and the film becomes high resistance. A W target having a purity of 99.9999% or 99.99% is thus used in sputtering. In addition, by forming the W film while taking sufficient care that no impurities from within the gas phase are introduced at the time of film formation, a resistivity of 9 to 20 μΩcm can be achieved.

Figure 14B:
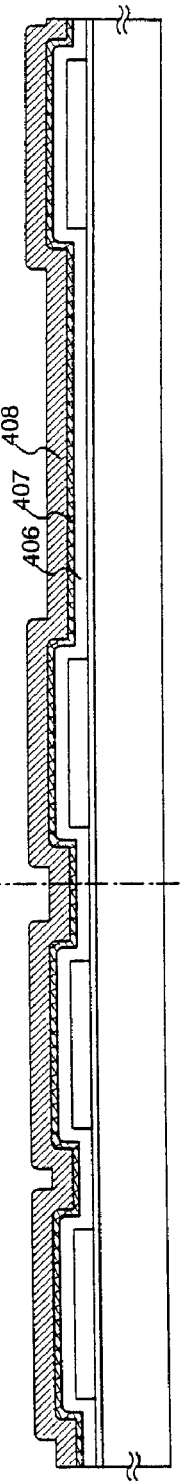

Note that, although the first conducting film 407 is Ta and the second conducting film 408 is W in Embodiment 6, the conducting films are not limited to these, and both may also be formed from an element selected from the group consisting of Ta, W, Ti, Mo, Al, and Cu, or from an alloy material having one of these elements as its main constituent, or from a chemical compound of these elements. Further, a semiconductor film, typically a polysilicon film into which an impurity element such as phosphorous is doped, may also be used. Examples of preferable combinations other than that used in Embodiment 6 include: forming the first conducting film by tantalum nitride (TaN) and combining it with the second conducting film formed from W; forming the first conducting film by tantalum nitride (TaN) and combining it with the second conducting film formed from Al; and forming the first conducting film by tantalum nitride (TaN) and combining it with the second conducting film formed from Cu. (See FIG. 14B.)

Masks 409 to 412 are formed next from resist, and a first etching process is performed in order to form electrodes and wirings. An ICP (inductively coupled plasma) etching method is used in Embodiment 6. A gas mixture of $CF_4$ and $Cl_2$ is used as an etching gas, and a plasma is generated by applying a 500 W RF electric power (13.56 MHz) to a coil shape electrode at a pressure of 1 Pa. A 100 W RF electric power (13.56 MHz) is also applied to the substrate side (test piece stage), effectively applying a negative self-bias voltage. The W film and the Ta film are both etched on the same order when $CF_4$ and $Cl_2$ are combined.

Figure 14C:
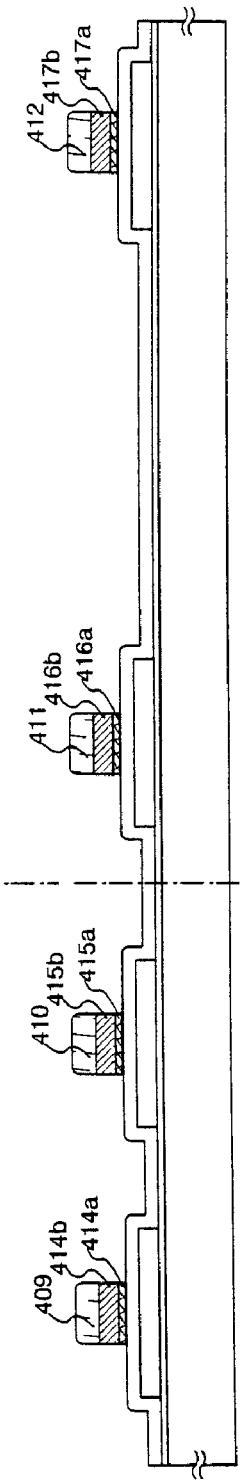

Not shown in FIG. 14C, edge portions of the first conducting layer and the second conducting layer are made into a tapered shape in accordance with the effect of the bias voltage applied to the substrate side under the above etching conditions by using a suitable resist mask shape. The angle of the tapered portions is from 15 to 45°. The etching time may be increased by approximately 10 to 20% in order to perform etching without any residue remaining on the gate insulating film. The selectivity of a silicon nitride oxide film with respect to a W film is from 2 to 4 (typically 3), and therefore approximately 20 to 50 nm of the exposed surface of the silicon nitride film is etched by this over-etching process. Further, not shown in FIG. 14C, regions of the gate insulating film 406 not covered by first shape conducting layers 414 to 417 are made thinner by 20 to 50 nm.

The first shape conducting layers 414 to 417 (first conducting layers 414a to 417a and second conducting layers 414b to 417b) are thus formed from the first conducting layer and the second conducting layer in accordance with the first etching process.

Figure 14D:
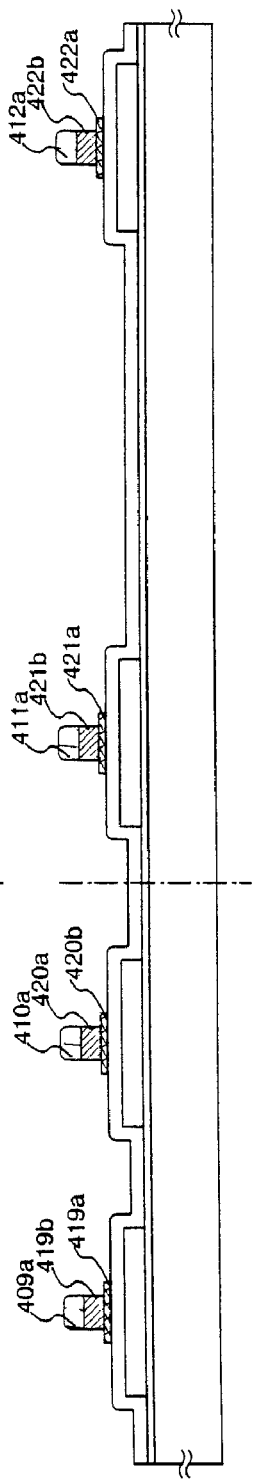

A second etching process is performed next, as shown in FIG. 14D. The ICP etching method is similarly used, a mixture of $CF_4$, $Cl_2$, and $O_2$ is used as the etching gas, and a plasma is generated by supplying a 500 W RF electric power (13.56 MHz) to a coil shape electrode at a pressure of 1 Pa. A 50 W RF (13.56 MHz) electric power is applied to the substrate side (test stage), and a self-bias voltage which is lower in comparison to that of the first etching process is applied. The W film is etched anisotropically under these etching conditions, and Ta (the first conducting layers) is anisotropically etched at a slower etching speed, forming second shape conducting layers 419 to 422 (first conducting layers 419a to 422a and second conducting layers 419b to 422b). Further, although not shown in FIG. 14D, the gate insulating film 406 is additionally etched on the order of 20 to 50 nm, becoming thinner, in regions not covered by the second shape conducting layers 419 to 422. The masks 409 to 412 are etched by the second etching process, becoming masks 409a to 412a.

The etching reaction of the W film and the Ta film in accordance with the mixed gas of $CF_4$ and $Cl_2$ can be estimated from the radicals generated, and from the ion types and vapor pressures of the reaction products. Comparing the vapor pressures of W and Ta fluorides and chlorides, the W fluoride compound $WF_6$ is extremely high, and the vapor pressures of $WCl_5$, $TaF_5$, and $TaCl_5$ are of similar order. Therefore the W film and the Ta film are both etched by the $CF_4$ and $Cl_2$ gas mixture. However, if a suitable quantity of $O_2$ is added to this gas mixture, $CF_4$ and $O_2$ react, forming CO and F, and a large amount of F radicals or F ions are generated. As a result, the etching speed of the W film having a high fluoride vapor pressure becomes fast. On the other hand, even if F increases, the etching speed of Ta does not relatively increase. Further, Ta easily oxidizes compared to W, and therefore the surface of Ta is oxidized by the addition of $O_2$. The etching speed of the Ta film is further reduced because Ta oxides do not react with fluorine and chlorine. It therefore becomes possible to have a difference in etching speeds between the W film and the Ta film, and it becomes possible to make the etching speed of the W film larger than that of the Ta film.

The masks 409a to 412a are removed, and a first doping process is performed as shown in FIG. 15A, adding an impurity element which imparts n-type conductivity. For example, doping may be performed at an acceleration voltage of 70 to 120 keV and with a dosage of $1\times10^{13}$ atoms/cm$^2$. The doping process is performed using the second shape conducting layers 419 to 422 as masks against the impurity element, and so as to also add the impurity element in regions below the second conducting layers 419a to 422a. First impurity regions 425 to 428, which overlap with the second conducting layers 419a to 422a, and second impurity regions 429 to 432, which have a higher impurity concentration than the first impurity regions, are thus formed. Note that the n-type conductivity imparting element is added after removing the masks 409a to 412a in Embodiment 6, but the present invention is not limited to this. The impurity element which imparts n-type conductivity may also be added in the step of FIG. 15A, and then the masks 409a to 412a may be removed.

A mask 433 is next formed on the semiconductor layer 404 so as to cover the second conducting layers 421a and 421b. The mask 433 partially overlaps with the second impurity region 431, sandwiching the gate insulating film 406. A second doping process is then performed, and an impurity element which imparts n-type conductivity is added. Doping of the n-type conductivity imparting impurity element is performed at conditions in which the dosage is raised higher than that of the first doping process, and at a low acceleration voltage. (See FIG. 15B.) The doping can be carried out by ion doping or ion implantation. Ion doping is performed under conditions of a dose amount from $1\times10^{13}$ to $5\times10^{14}$ atoms/cm$^2$ and an acceleration voltage of 60 to 100 keV. A periodic table group 15 element, typically phosphorous (P) or arsenic (As) is used as the impurity element which imparts n-type conductivity, and phosphorous (P) is used here. The second conducting layers 419 to 422 become masks with respect to the n-type conductivity imparting impurity element in this case, and source regions 434 to 437, drain regions 438 to 441, and Lov regions 442 to 445 are formed in a self-aligning manner. Further, Loff region 446 is formed in accordance with the mask 433. The impurity element which imparts n-type conductivity is added to the source regions 434 to 437, and to the drain regions 438 to 441 with a concentration in the range of $1\times10^{20}$ to $1\times10^{21}$ atoms/cm$^3$.

It is possible to freely set the length of the Loff region 446 by controlling the size of the mask 433 according to Embodiment 6.

Note that in the specification, the LDD region overlapping with a gate electrode through a gate insulating film is referred to as an Lov region, and the LDD region not overlapping with a gate electrode through a gate insulating film is referred to as an Loff region.

The impurity element which imparts n-type conductivity is added at a concentration of $1\times10^{17}$ to $1\times10^{19}$ atoms/cm$^3$ in the Loff region, and at a concentration of $1\times10^{16}$ to $1\times10^{18}$ atoms/cm$^3$ in the Lov region.

Note that, in FIG. 15B, either before or after doping of an impurity element which imparts n-type conductivity is performed at the above stated conditions, doping of an n-type conductivity imparting impurity element may also be performed with an acceleration voltage of 70 to 120 keV in a state in which the mask 433 is formed on the semiconductor layer 404. The concentration of the n-type conductivity imparting impurity element in a portion 446 which becomes an Loff region of the switching TFT can be suppressed in accordance with the above process, and the concentration of the n-type conductivity imparting impurity element in portions 442 and 443, which become Lov regions of the TFTs used in the driver circuit can be increased. It is possible to lower the off current of the switching TFT by suppressing the concentration of the n-type conductivity imparting impurity element in the portion 446 which becomes the Loff region of the switching TFT. Further, hot carriers generated in accordance with a high electric field in the vicinity of the drain and a cause of a degradation phenomenon due to the hot carrier effect can be prevented by increasing the concentration of the n-type conductivity imparting impurity element in the portion 443 which becomes the Lov region of the n-channel TFT used in the driver circuit.

After removing the mask 433, source regions 447 and 448, drain regions 449 and 450, and Lov regions 451 and 452, into which an impurity element having a conductivity type which is the inverse of the above one conductivity type, are then formed in the semiconductor layers 402 and 405 for forming the p-channel TFT, as shown in FIG. 15C. The second shape conducting layers 419 and 422 are used as a mask with respect to the impurity element, and the impurity regions are formed in a self-aligning manner. The semiconductor layers 403 and 404, which form n-channel TFTs, are covered over their entire surface areas by a resist masks 453 at this point. Phosphorous is added in differing concentration to the source regions 447 and 448, the drain regions 449 and 450, and the Lov regions 451 and 452, and ion doping is performed here using diborane ($B_2H_6$), so that impurity is added to each of the regions with a concentration of $2\times10^{20}$ to $2\times10^{21}$ atoms/cm$^3$.

Impurity regions (source regions, drain regions, Lov regions, and Loff regions) are formed in the respective semiconductor layers 402 to 405 by the above processes. The second conducting layers 419 to 422 overlapping the semiconductor layers function as gate electrodes.

A process of activating the impurity elements added to the respective semiconductor layers is then performed, with the aim of controlling conductivity type. Thermal annealing using an annealing furnace is performed for this process. In addition, laser annealing and rapid thermal annealing (RTA) can also be applied. Thermal annealing is performed with an oxygen concentration equal to or less than 1 ppm, preferably equal to or less than 0.1 ppm, in a nitrogen atmosphere at 400 to 700° C., typically between 500 and 600° C. Heat treatment is performed for 4 hours at 500° C. in Embodiment 6. However, for cases in which the wiring material used in the conducting layers 419 to 422 is weak with respect to heat, it is preferable to perform activation after forming an interlayer insulating film (having silicon as its main constituent) in order to protect the wirings and the like.

In addition, heat treatment is performed for 1 to 12 hours at 300 to 450° C. in an atmosphere containing between 3 and 100% hydrogen, performing hydrogenation of the semiconductor layers. This process is one of terminating dangling bonds in the semiconductor layers by hydrogen which is thermally excited. Plasma hydrogenation (using hydrogen excited by a plasma) may also be performed as another means of hydrogenation.

A first interlayer insulating film 455 is formed next from a silicon nitride oxide film having a thickness of 100 to 200 nm. (FIG. 16A) A second interlayer insulating film 458 made from an organic insulating material is then formed on the first interlayer insulating film 455.

Figures 16A, 16B, 16C:
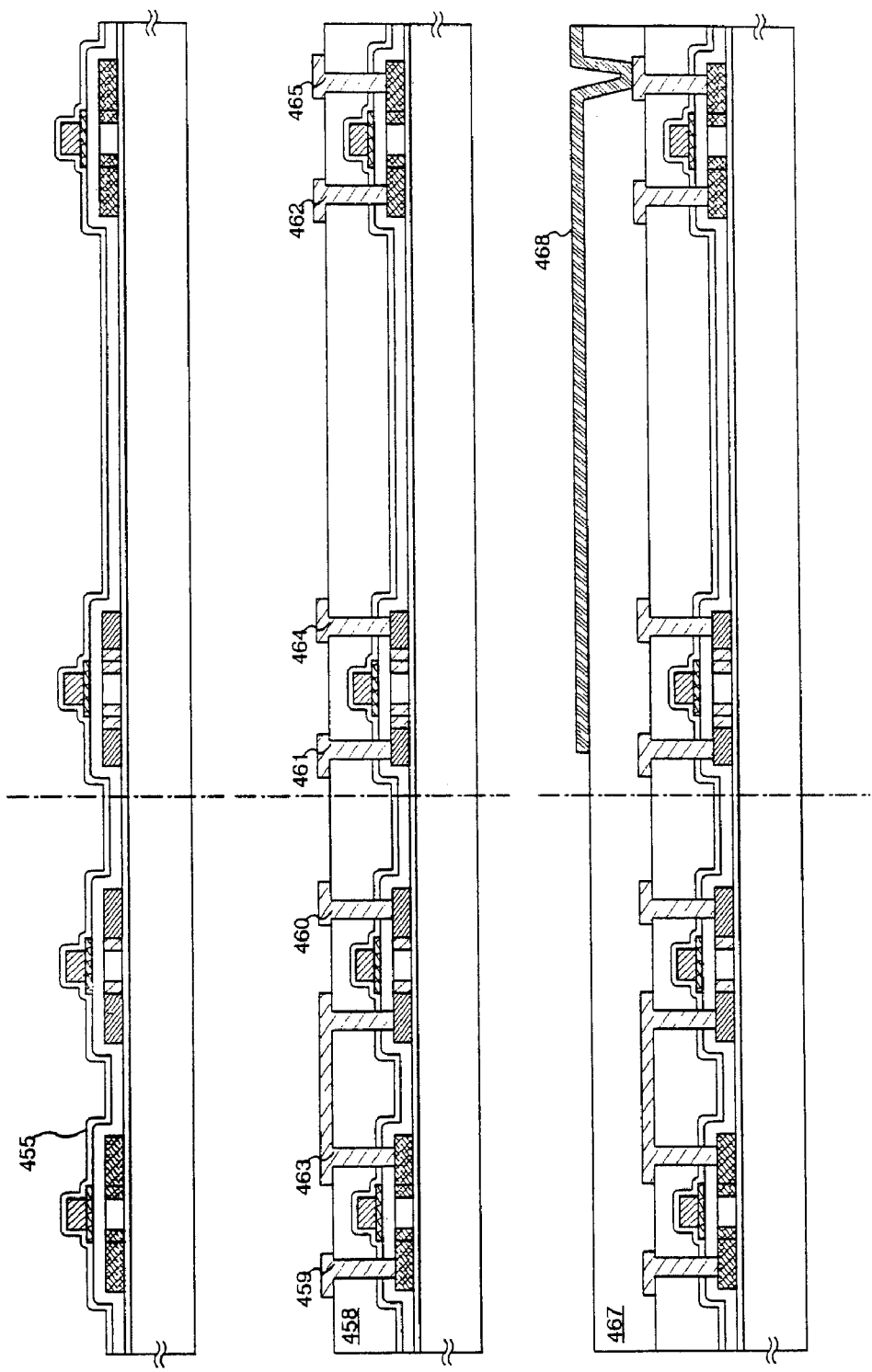
FIG. 16A to 16C are diagrams showing the method of manufacturing the EL display device used in the display portion of the portable information terminal of the present invention.

Contact holes are then formed in the gate insulating film 406, the first interlayer insulating film 455 and the second interlayer insulating film 458, and source wirings 459 to 462 are formed to contact the source regions 447, 435, 436, and 448 through the contact holes. In the same way, drain wirings 463 to 465 are further formed to contact the drain regions 449, 439, 440 and 450. (FIG. 16B)

Note that it is preferable to form the contact holes by dry etching using $CF_4$ and $O_2$ when the gate insulating film 406, the first interlayer insulating film 455, and the second interlayer insulating film 458 are $SiO_2$ films or SiON films. Further, for cases in which the gate insulating film 406, the first interlayer insulating film 455, and the second interlayer insulating film 458 are organic resin films, it is preferable to form the contact holes by dry etching using $CHF^3$ or by BHF (buffered hydrogen fluoride, $HF+NH_4F$). In addition, if the gate insulating film 406, the first interlayer insulating film 455 and the second interlayer insulating film 458 are formed by different materials, it is preferable to change the method of etching and the etchant or etching gas type for each film. The contact holes may also be formed by using the same etching method and the same etchant or etching gas.

A third interlayer insulating film 467 is formed next from an organic resin. Organic resins such as polyimide, polyamide, acrylic, and BCB (benzocyclobutene) can be used. In particular, it is preferable to use acrylic, which has superior levelness, because the third interlayer insulating film 467 is formed with a strong implication of leveling. An acrylic film is formed in Embodiment 6 at a film thickness at which steps formed by the TFTs can be sufficiently leveled. The film thickness is preferably from 1 to 5 μm (more preferably between 2 and 4 μm).

A contact hole for reaching the drain wiring 465 is formed next in the third interlayer insulating film 467, and a pixel electrode 468 is formed. An indium oxide tin oxide (ITO) film is formed with a thickness of 110 nm in Embodiment 6, and patterning is then performed, forming the pixel electrode 468. Further, a transparent conducting film in which between 2 and 20% zinc oxide (ZnO) is mixed with indium oxide may also be used. The pixel electrode 468 becomes an anode of an EL element. (See FIG. 16C.)

A first bank 469 and a second bank 470 are formed next from a resin material. The first bank 469 and the second bank 470 are formed in order to separate EL layers and cathodes, which are formed later, of adjacent pixels. It is therefore preferable that the second bank 470 stick out farther horizontally than the first bank 469. Note that it is preferable that the combined thickness of the first bank 469 and the second bank 470 be made on the order of 1 to 2 μm, but there are no limitations on this thickness provided that the EL layers and the cathodes formed later of adjacent pixels can be separated. Further, it is necessary to form the first bank 469 and the second bank 470 by an insulating film, and it is therefore possible to use materials such as an oxide or a resin, for example. The first bank 469 and the second bank 470 may both be formed by the same material, and they may also be formed by different materials. The first bank 469 and the second bank 470 are formed in stripe shapes between pixels. The first bank 469 and the second bank 470 may be formed on and along the source wirings (source signal lines), and may be formed on and along the gate wirings (gate signal lines). Note that the first bank 469 and the second bank 470 may also be formed by a material in which a pigment is mixed into a resin. (See FIG. 17A.)

An EL layer 471 and a cathode (MgAg electrode) 472 are formed next in succession without exposure to the atmosphere using vacuum evaporation. Note that the film thickness of the EL layer 471 may be from 80 to 200 nm (typically between 100 and 120 nm), and that the film thickness of the cathode 472 may be from 180 to 300 nm (typically between 200 and 250 nm). Note also that, although only one pixel is shown in Embodiment 6, an EL layer which emits red color light, an EL layer which emits green color light, and an EL layer which emits blue color light are formed at the same time at this point. Note that materials to form an EL layer and a cathode is partially laminated on the bank 470, however, in this specification, the materials are not included in the EL layer 471 and the cathode 472.

The EL layers 471 are formed in order for a pixel corresponding to the color red, a pixel corresponding to the color green, and a pixel corresponding to the color blue. However, the EL layers 471 lacks resistance with respect to solutions, and therefore each color must be formed separately without using a photolithography technique. It is preferable to use a metal mask and cover the pixels other than the desired pixel, and selectively form the EL layers 471 in only the required locations.

Namely, first a mask is set so as to cover all of the pixels except for those corresponding to the color red, and red color light-emitting EL layers are selectively formed using the mask. Next, a mask is set so as to cover all of the pixels except for those corresponding to the color green, and green color light-emitting EL layers are selectively formed using the mask. Finally, a mask is set so as to cover all of the pixels except for those corresponding to the color blue, and blue color light-emitting EL layers are selectively formed using the mask. Note that, although the use of all different masks is described here, the same mask may also be reused. Further, it is preferable to perform processing until all pixel EL layers are formed without releasing the vacuum.

Note that a single layer structure composed of only a light-emitting layer is shown in Embodiment 6 for the EL layer 471, but a structure having layers such as a hole transporting layer, a hole injecting layer, an electron transporting layer, and an electron injecting layer in addition to the light-emitting layer may also be used for the EL layer. Various examples of these types of combinations have already been reported, and all such structures may be used. A known material can be used as the EL layer 471. Considering the EL element driver voltage, it is preferable to use an organic material as the known material.

The cathode 472 is formed next. An example of using an MgAg electrode as the cathode is shown in Embodiment 6, but it is also possible to use other known materials.

The TFT substrate having the structure as shown in FIG. 17B is thus completed. Note that, after forming the first bank 469 and the second bank 470, it is effective to perform processing in succession without exposure to the atmosphere up through to the formation of the cathode 472 by using a multi-chamber method (or an in-line method) thin film formation apparatus.

In Embodiment 6, a source region 504, a drain region 505, an Loff region 506, an Lov region 507, and a channel forming region 508 are contained in a semiconductor layer of a switching TFT 501. The Loff region 506 is formed so as not to overlap with the gate electrode 421 through the gate insulating film 406. Further, the Lov region 507 is formed so as to overlap with the gate electrode 421 through the gate insulating film 406. This type of structure is extremely effective in reducing the off current.

Further, a single gate structure is used as the switching TFT 501 in Embodiment 6, but the present invention may also have a double gate structure or another type of multi-gate structure for the switching TFT. Two TFTs are substantially connected in series by using the double gate structure, giving the advantage of additionally reducing the off current.

Further, the switching TFT 501 is an n-channel TFT in Embodiment 6, but a p-channel TFT may also be used.

A semiconductor layer of an EL driving TFT 502 contains a source region 510, a drain region 511, an Lov region 512, and a channel forming region 513. The Lov region 512 is formed so as to overlap with the gate electrode 422 through the gate insulating film 406. Note that the EL driving TFT 502 does not have the Loff region in Embodiment 6, but a structure having the Loff region may also be used.

Further, the EL driving TFT 502 is a p-channel TFT in Embodiment 6, but it may also be an n-channel TFT.

Note that the active matrix substrate of Embodiment 6 shows an extremely high reliability, and its operational characteristics are also increased, by arranging optimally structured TFT in not only the pixel portion, but also in the driver circuit portion.

First, a TFT having a structure in which hot carrier injection is reduced so as not to have a very large drop in operational speed is used as an n-channel TFT 503 of a CMOS circuit forming the driver circuit portion. Note that circuits such as a shift register, a buffer, a level shifter, and a sampling circuit (sample and hold circuits) are included as the driver circuits here. Signal conversion circuits such as a D/A converter can also be included in the case of performing digital drive.

A semiconductor layer of the n-channel TFT 503 of the CMOS circuit in Embodiment 6 contains a source region 521, a drain region 522, an Lov region 523, and a channel forming region 524.

Further, it is not necessary to be concerned with the off current for the n-channel TFT 203, and importance may be placed more on the operation speed than the off current. The formation of the Lov region 223 overlapping the gate electrode 120 through the gate insulating film 106 is therefore effective in increasing the operating speed because the resistance components are reduced as much as possible.

Further, a semiconductor layer of a p-channel TFT 504 of the CMOS circuit contains a source region 531, a drain region 532, an Lov region 533, and a channel forming region 534.

Note that, in practice, it is preferable to perform packaging (sealing) by a protecting film having high airtight characteristics and little outgassing (such as a laminate film or an ultraviolet hardened resin film) or by a transparent sealing material after completing up through to the processes of FIG. 17B so as to have no exposure to the atmosphere. Further, if an inert gas is placed in the inside of the sealing material, and a drying agent (barium oxide, for example) is arranged on the inside of the sealing material, then the reliability of the EL element is increased.

Further, a connector (flexible printed circuit, FPC) is attached in order to connect the elements formed on the substrate, with terminals extended from the circuits, to external signal terminals after increasing the airtight characteristics in accordance with the packaging process or the like. A manufactured product is thus completed. This type of deliverable state is referred to as an EL display device throughout this specification.

The widths of the gate electrodes in the direction of the channel length differ as stated above in accordance with manufacturing processes of the present invention. Therefore, it is possible to make the ion implantation within the semiconductor layers arranged under the first gate electrode less than the ion concentration within the semiconductor layers not arranged under the first gate electrode by utilizing the difference in ion penetration depth, due to the difference of gate electrode thickness, when performing ion injection using the gate electrodes as masks.

Further, in order to form the Loff regions using a mask, only the width of Lov region needs to be controlled by etching. It becomes easy to control positions of the Lov regions and the Loff regions.

Note that although an example in which light emitted from the EL layer is directed toward the substrate side is explained in Embodiment 6, the present invention is not limited to this, and a structure in which light emitted from the EL layer is directed above the substrate may also be used. In this case, the cathode of the EL element becomes the pixel electrode, and it is preferable that the EL driving TFT be an n-channel TFT.

The method of manufacturing an EL display device of the present invention is not limited to the manufacturing method described in Embodiment 6, and other manufacturing methods can be utilized.

Note that it is possible to freely combine Embodiment 6 with any of Embodiments 1 to 5.

Embodiment 7

An example in which a portable information terminal of the present invention has a touch panel is explained in Embodiment 7.

Figure 18A:
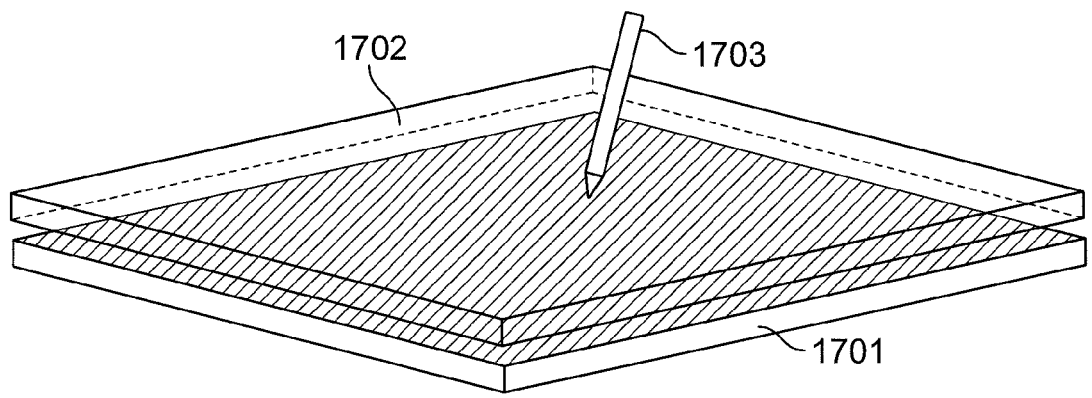
FIGS. 18A and 18B are diagrams showing a mounting position of a touch panel and a touch panel structure.

Reference numeral 1701 in FIG. 18A denotes a display portion of a portable information terminal of the present invention, reference numeral 1702 denotes a touch panel, and reference numeral 1703 denotes a touch pen. The touch panel 1702 has light transmitting characteristics, and light emitted from the display portion 1701 and light irradiated to the display portion 1701 can pass through the touch panel 1702. In a case an image is displayed on the display portion 1701 it is possible for an operator to see an image on the display portion 1701.

Figure 18B:
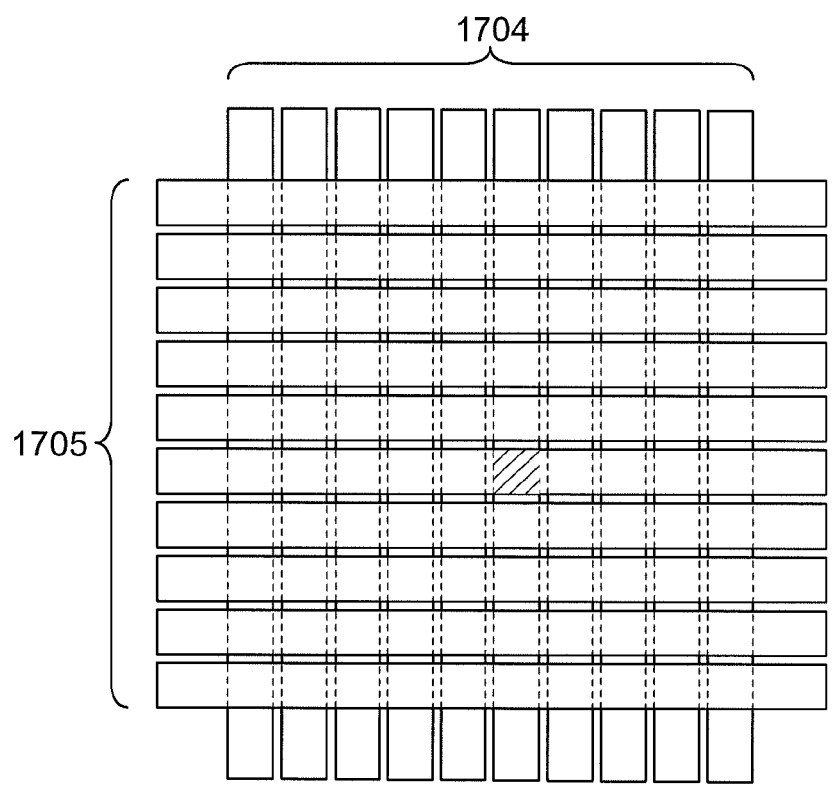

A detailed structure of the touch panel 1702 is shown in FIG. 18B. A plurality of rectangular strip shape first resistive films 1704 aligned in a column direction, and a plurality of rectangular strip shape second resistive films 1705 aligned in a row direction, are formed so as to overlap while possessing a predetermined gap in the touch panel 1702. The first resistive films 1704 and the second resistive films 1705 are formed by ITO.

Differing voltages are applied to both ends of the first resistive films 1704 aligned in the column direction, and a voltage gradient is formed in the column direction in portions within the first resistive films 1704. Differing voltages are also applied to both ends of the second resistive films 1705 aligned in the row direction, and a voltage gradient is formed in the row direction in portions within the second resistive films 1705.

By applying a pressure on the surface of the touch panel 1702 by using a means such as the touch pen, one of the first resistive films 1704 and one of the second resistive films 1705 are contacted. A voltage is generated corresponding to the position contacted, and by measuring the voltage, information on the position of the first resistive films 1704 and the second resistive films 1705 contacted can be written in to the portable information terminal as electronic data.

The portable information terminal of the present invention can display an image written in to the display portion 1701 and can write in a taken in image by the touch pen 1703 with the above structure.

Note that it is possible to freely combine Embodiment 7 with any of Embodiments 1 to 6.

Embodiment 8

Figure 19:
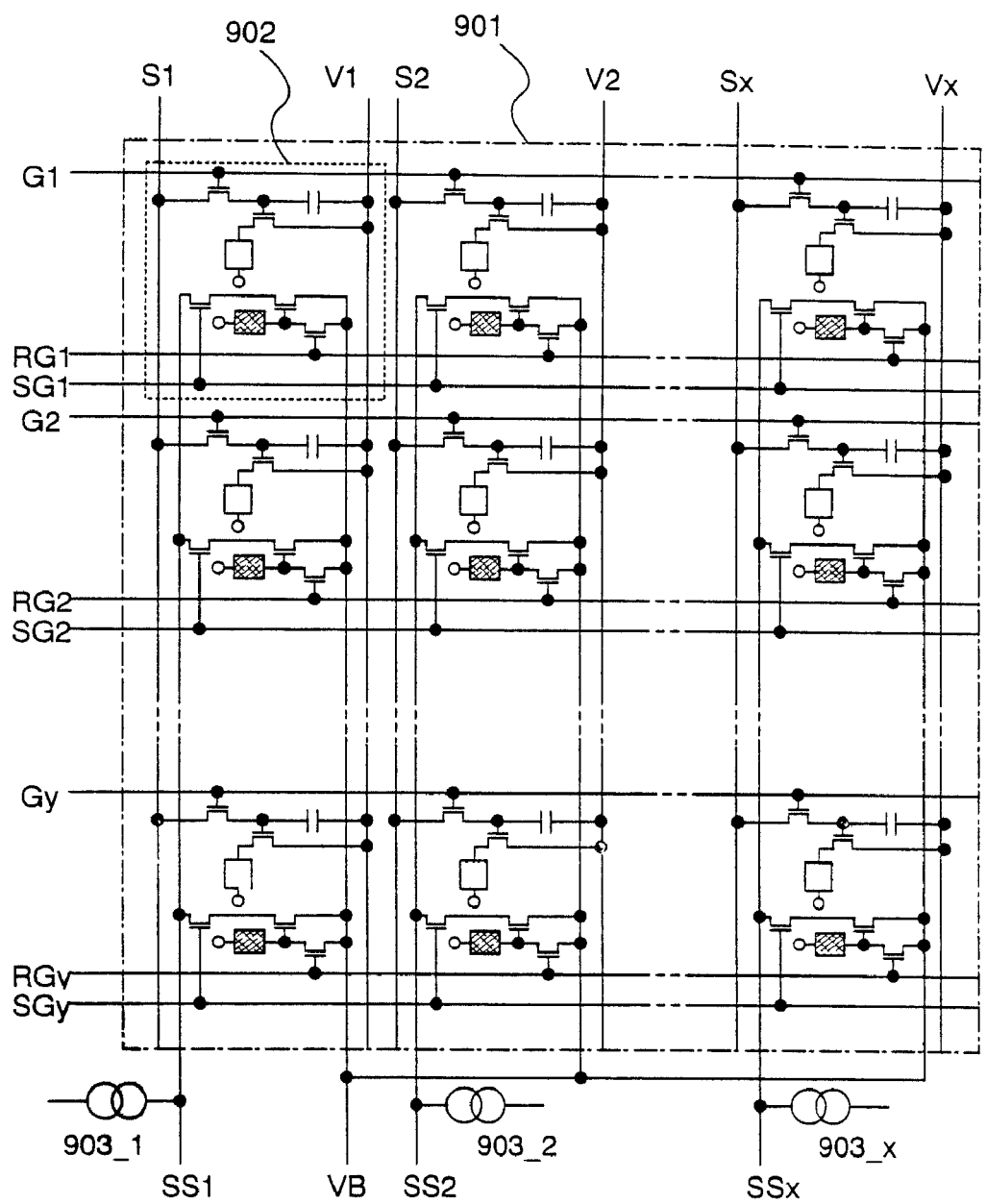
FIG. 19 is a circuit diagram of an EL display device used in a display portion of a portable information terminal of the present invention.

An example in which a display portion of a portable information terminal of the present invention functions as an area sensor is explained in Embodiment 8. A structure of the display portion of Embodiment 8 is explained in detail below. FIG. 19 shows a circuit diagram of a display portion of this embodiment.

Source signal lines S1 to Sx, electric power source supply lines V1 to Vx, gate signal lines G1 to Gy, reset gate signal lines RG1 to RGy, sensor gate signal lines SG1 to SGy, sensor output wirings SS1 to SSx, and a sensor electric power source line VB are formed in a display portion 901.

The display portion 901 has a plurality of pixels 902. The pixels 902 have one of the source signal lines S1 to Sx, one of the electric power source supply lines V1 to Vx, one of the gate signal lines G1 to Gy, one of the reset gate signal lines RG1 to RGy, one of the sensor gate signal lines SG1 to SGy, one of the sensor output wirings SS1 to SSx, and the sensor electric power source line VB.

The sensor output wirings SS1 to SSx are connected to constant electric current power supplies 903_1 to 903_x, respectively.

Figure 20:
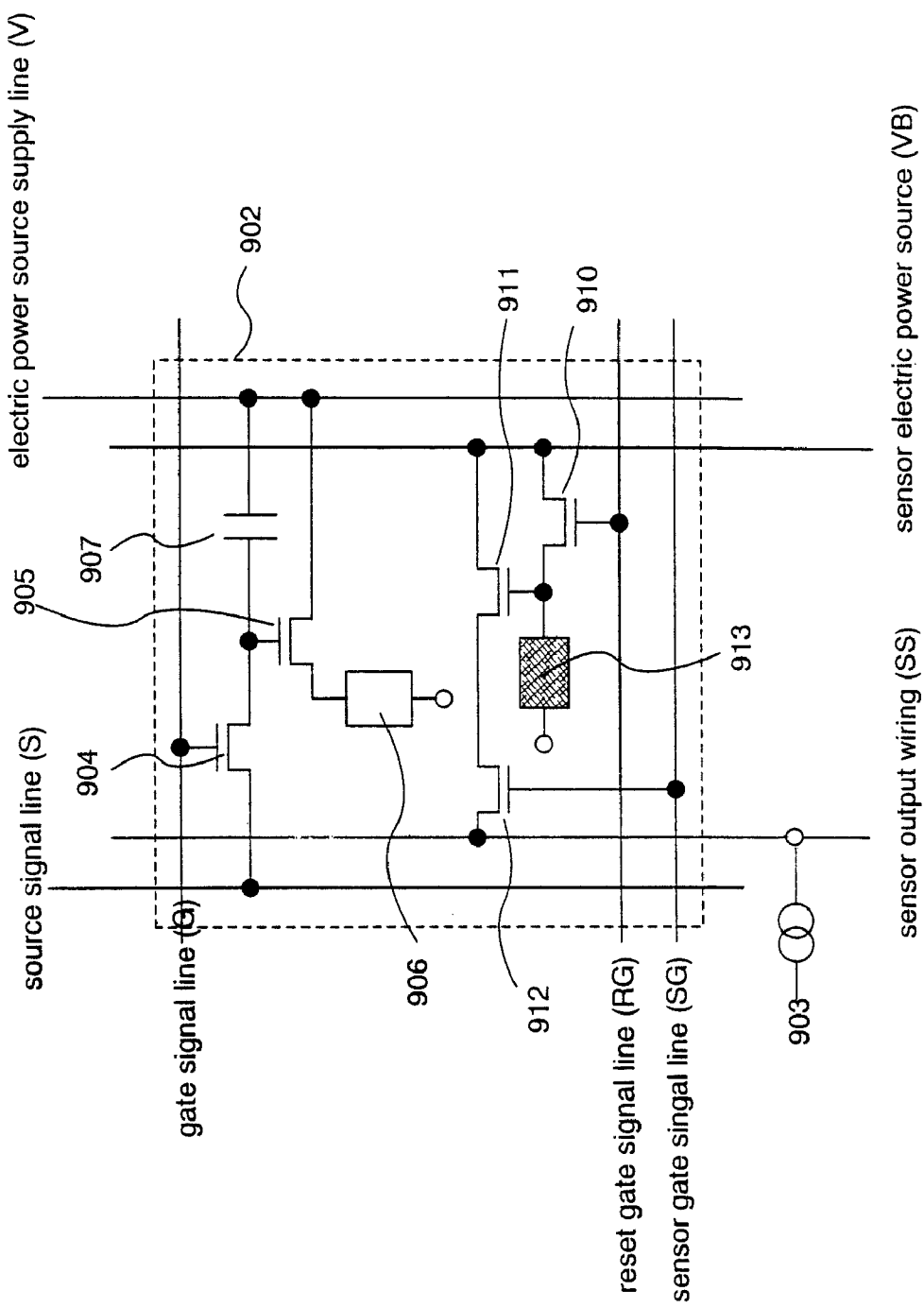
FIG. 20 is a circuit diagram of a pixel of an EL display device used in a display portion of a portable information terminal of the present invention.

A detailed structure of the pixel 902 is shown in FIG. 20. A region enclosed by a dotted line is the pixel 902. Note that a source signal line S denotes one of the source signal lines S1 to Sx. Further, an electric power source supply line V denotes one of the electric power source supply lines V1 to Vx. A gate signal line G denotes one of the gate signal lines G1 to Gy, and a reset gate signal line RG denotes one of the reset gate signal lines RG1 to RGy. In addition, a sensor gate signal line SG denotes one of the sensor gate signal lines SG1 to SGy, and a sensor output wiring SS denotes one of the sensor output wirings SS1 to SSx.

The pixel 902 has a switching TFT 904, an EL driver TFT 905, and an EL element 906. Further, in FIG. 20 a capacitor 907 is formed in the pixel 902, but the capacitor 907 need not be formed.

A gate electrode of the switching TFT 904 is connected to the gate signal line G. One of a source region and a drain region of the switching TFT 904 is connected to the source signal line S, and the other is connected to a gate electrode of the EL driver TFT 905.

The source region of the EL driver TFT 905 is connected to the electric power source supply line V, and the drain region of the EL driver TFT 905 is connected to the EL element 906. The capacitor 907 is formed connected to the gate electrode of the EL driver TFT 905 and to the electric power source supply line V.

The EL element 906 is composed of an anode, a cathode, and an EL layer formed between the anode and the cathode. When the anode is connected to a drain region of the EL driver TFT 905, the anode becomes a pixel electrode and the cathode becomes an opposing electrode. Conversely, when the cathode is connected to a drain region of the EL driver TFT 905, the anode becomes the opposing electrode and the cathode becomes the pixel electrode.

In addition, the pixel 902 has a reset TFT 910, a buffer TFT 911, a selection TFT 912, and a photodiode 913.

A gate electrode of the reset TFT 910 is connected to the reset gate signal line RG. A source region of the reset TFT 910 is connected to the sensor electric power source line VB, and the sensor electric power source line VB is always maintained at a constant electric potential (standard electric potential).

Further, a drain region of the reset TFT 910 is connected to the photodiode 913 and to a gate electrode of the buffer TFT 911.

Although not shown in the figure, the photodiode 913 has a cathode, an anode, and a photoelectric conversion layer formed between the cathode electrode and the anode electrode. The drain region of the reset TFT 910 is connected specifically to the anode electrode or the cathode electrode of the photodiode 913.

A drain region of the buffer TFT 911 is connected to the sensor electric power source line VB, and is always maintained at the standard electric potential. A source region of the buffer TFT 911 is connected to a source region or a drain region of the selection TFT 912.

A gate electrode of the selection TFT 912 is connected to the sensor gate signal line SG. One of a source region and a drain region of the selection TFT 912 is connected to the source region of the buffer TFT 911, as stated above, and the other is connected to the sensor output wiring SS. The sensor output wiring SS is connected to a constant electric current power source 903 (one of the constant electric current power sources 903_1 to 903_$x$), and a constant electric always flows.

An explanation of a method of driving the display portion of Embodiment 8 is explained next using FIGS. 19 and 20.

The EL element 906 of the pixel 902 functions as a light source of the area sensor, and the switching TFT 904 and the EL driver TFT 905 control the operation of the EL element 906 as the light source.

Light emitted from the EL element is reflected by the subject and is irradiated to the photodiode 913 of the pixel 902. The photodiode 913 converts the irradiated light to an electrical signal having image information. The electrical signal having image information which is generated by the photodiode 913 is then taken in within the portable information terminal as an image signal by the buffer TFT 911 and the selection TFT 912.

The reset TFT 910, the buffer TFT 911, and the selection TFT 912 may be either an n-channel TFT or a p-channel TFT in Embodiment 8. However, it is preferable that the reset TFT 910 and the buffer TFT 911 have opposite polarities.

First, the reset TFTs 910 of a first line of pixels connected to the reset gate signal line RG1 are placed in an ON state in accordance with a reset signal input to the reset gate signal line RG1. The standard electric potential of the sensor electric power source line VB is therefore applied to the gate electrode of the buffer TFT 911.

Further, the selection TFTs 912 of a first line of pixels connected to the sensor gate signal line SG1 are placed in an OFF state in accordance with a sensor signal input to the sensor gate signal line SG1. The source region of the buffer TFT 911 is therefore maintained at an electric potential in which an electric potential difference $V_{GS}$ between the source region and the gate electrode of the buffer TFT 911 is subtracted from the standard electric potential. Note that a period during which the reset TFT 910 is in an ON state is referred to as a reset period in this embodiment.

The electric potential of the reset signal input to the reset gate signal line RG1 is then changed, and all of the reset TFTs 910 of the first line of pixels are placed in an OFF state. The standard electric potential of the sensor electric power source line VB is therefore no longer applied to the gate electrodes of the buffer TFTs 911 of the first line of pixels. Note that a period during which the reset TFT 910 is in an OFF state is referred to as a sample period ST in this embodiment. In particular, a period during which the reset TFTs 910 of the first line of pixels is in an OFF state is referred to as a sample period ST1.

The electric potential of the sensor signal input to the sensor gate signal line SG1 changes in the sample period ST1, and the selection TFTs 912 of the first line of pixels are placed in an ON state. The source regions of the buffer TFTs 911 of the first line of pixels are therefore electrically connected to the sensor output wiring SS1, through the selection TFTs 912. The sensor output wiring SS1 is connected to the constant electric current power source 903_1, and therefore the buffer TFTs 911 function as source followers, and the electric potential difference $V_{GS}$ between the source region and the gate electrode is constant.

An electric current flows in the photodiode 913 in the sample period ST1 when light from the EL element 906 is reflected by a subject and is irradiated to the photodiode 913. The electric potential of the gate electrode of the buffer TFT 911, maintained at the standard electric potential during the reset period, therefore changes in correspondence with the amount of electric current which develops in the photodiode 913.

The electric current flowing in the photodiode 913 is proportional to the strength of the light irradiated to the photodiode 913, and therefore the image of the subject is converted as is in the photodiode 913 into an electrical signal. The electrical signal generated in the photodiode 913 is input to the gate electrode of the buffer TFT 911.

The electric potential difference $V_{GS}$ between the source region and the gate electrode of the buffer TFT 911 is always constant, and therefore the source region of the buffer TFT 911 maintains an electric potential in which $V_{GS}$ is subtracted from the electric potential of the gate electrode of the buffer TFT 911. Therefore, if the electric potential of the gate electrode of the buffer TFT 911 changes, the electric potential of the source region of the buffer TFT 911 also changes in accompaniment.

The electric potential of the source region of the buffer TFT 911 is input to the sensor output wiring SS1, through the selection TFT 912, as an image signal.

Next, the reset TFTs 910 of the first line of pixels connected to the reset gate signal line RG1 are placed in an ON state in accordance with the reset signal input to the reset gate signal line RG1, and the reset period again begins. The reset TFTs 910 of a second line of pixels connected to the reset gate signal line RG2 are also simultaneously placed in an ON state in accordance with the reset signal input to the reset gate signal line RG2, and a sampling period ST2 begins.

An electrical signal having image information is generated in the photodiode in the sampling period ST2, similar to what occurs in the sampling period ST1, and the image signal is input to the sensor output wiring SS2.

If the above operations are repeated, one image can be read in as an image signal when the sampling period STy is complete. Note that a period up through the appearance of all of the sampling periods ST1 to STy is referred to as a sensor frame period SF in this specification.

Further, it is necessary to always emit light from the EL elements of each pixel in each sampling period. For example, it is at least necessary for the EL elements of the first line of pixels to emit light during the sampling period ST1. Note that all of the pixels may always emit light during the sensor frame SF.

Note also that for a case of an area sensor into which a color image is written, the display portion has pixels corresponding to each of the colors R (red), G (green), and B (blue). The pixels corresponding to each of the colors RGB have three types of EL elements corresponding to RGB, or have white color light emitting EL elements and three types of color filters for RGB, or have blue color or blue-green color light emitting EL elements and a fluorescing body (fluorescing color conversion layer, CCM).

Each color of RGB light emitted from the pixels corresponding to each of the RGB colors is irradiated to the subject in order. Then each of the RGB colors of light reflected by the subject is irradiated to the photodiodes of the pixels, and image signals corresponding to each of the RGB colors are taken in to the area sensor.

It is possible for the display portion to function as an area sensor with the portable information terminal of Embodiment 8. It is therefore possible to display an image, read in by the display portion, in the display portion, to confirm the read in image on the spot, and it is possible to send the image to another person as data.

Note that it is possible to freely combine Embodiment 8 with any of Embodiments 1 to 7.

Figure 22:
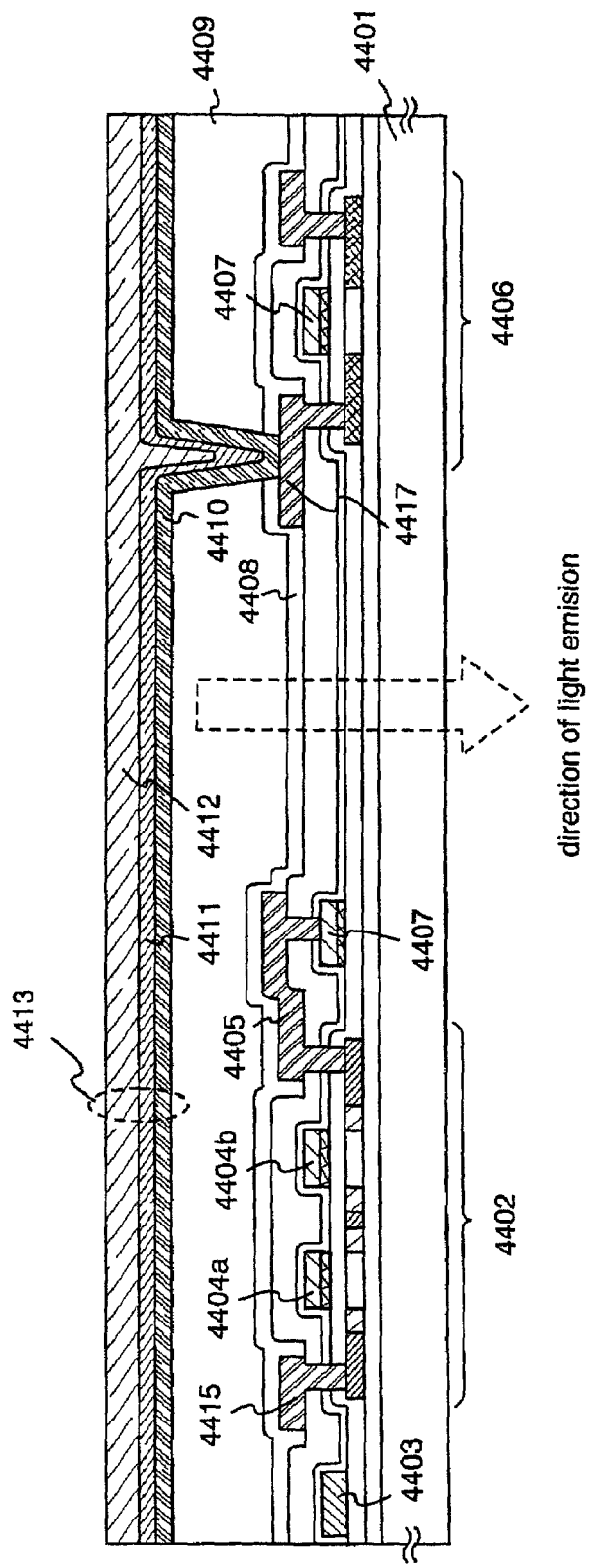
FIG. 22 is a cross sectional diagram of an EL display device used in a display portion of a portable information terminal of the present invention.
Figure 23A:
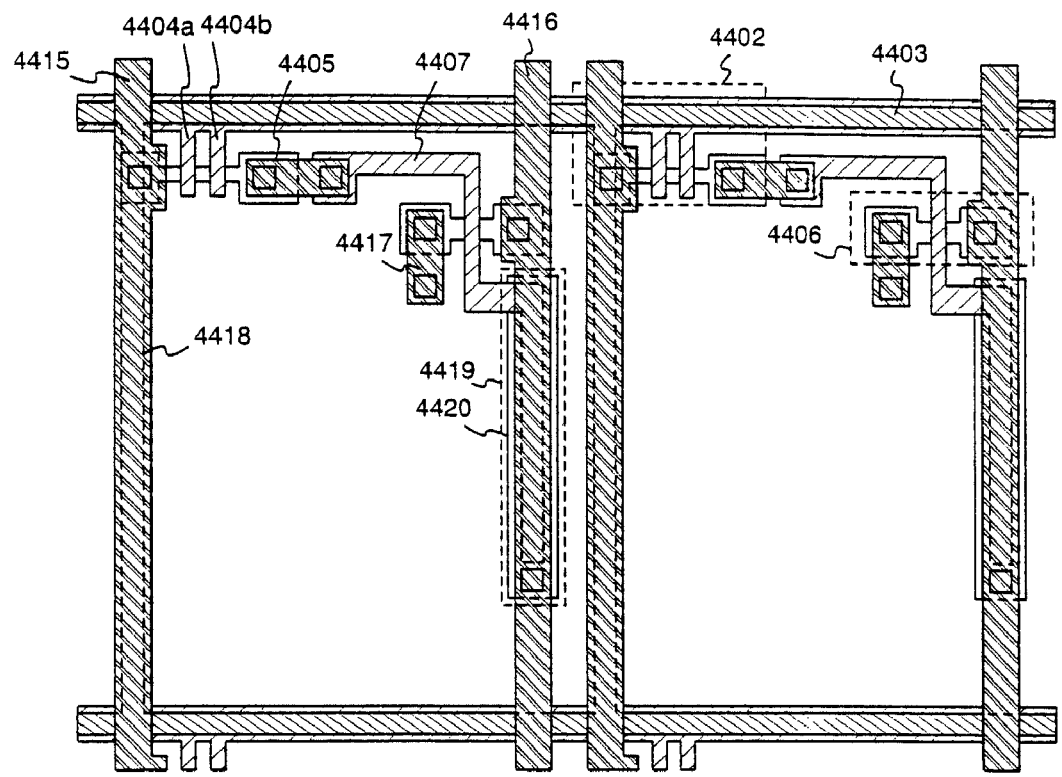
FIGS. 23A and 23B are a top surface view and a circuit diagram, respectively, of a pixel of an EL display device used in a display portion of a portable information terminal of the present invention.
Figure 23B:
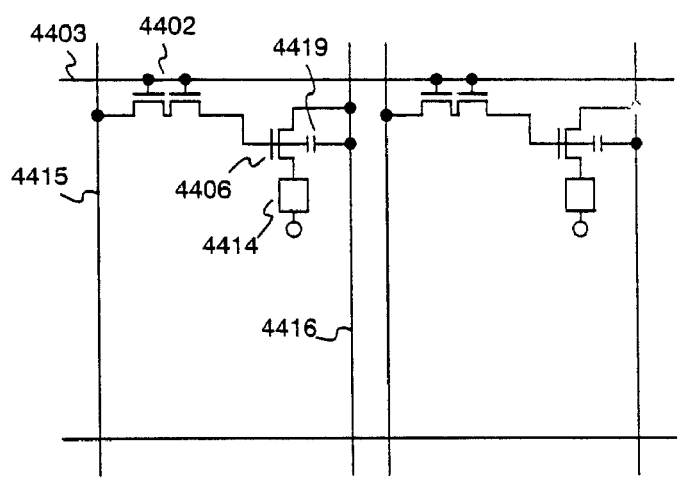

An additionally detailed cross sectional structure of the display portion is shown in FIG. 22 here, a top surface structure is shown in FIG. 23A and a circuit diagram is shown in FIG. 23B. FIGS. 22, 23A, and 23B use common reference symbols and therefore may be mutually referenced.

A switching TFT 4402 formed on a substrate 4401 in FIG. 22 is an n-channel TFT formed by using a known method. Further, a wiring denoted by reference numeral 4403 is a gate wiring electrically connected to gate electrodes 4404a and 4404b of the switching TFT 4402.

Note that, although a double gate structure in which two channel forming regions are formed is used in Embodiment 9, a single gate structure in which one channel forming region is formed, and a triple gate structure in which three channel forming regions are formed, may also be used.

Further, a drain wiring 4405 of the switching TFT 4402 is electrically connected to a gate electrode 4407 of an EL driver TFT 4406. Note that the EL driver TFT 4406 is a p-channel TFT formed by using a known method. Note also that, although a single gate structure is used in Embodiment 9, a double gate structure and a triple gate structure may also be used.

A first passivation film 4408 is formed on the switching TFT 4402 and on the EL driver TFT 4406, and a leveling film 4409 made from a resin is formed on the first passivation film. Leveling of steps due to the TFTs by using the leveling film 4409 is extremely important. An EL layer subsequently formed is extremely thin, and therefore light emission irregularities may be caused by the existence of a step. It is thus preferable to perform leveling before forming a pixel electrode so as to be able to form the EL layer with a surface that is as level as possible.

Furthermore, reference numeral 4410 denotes a pixel electrode (EL element anode) made from a transparent conducting film, and the pixel electrode is electrically connected to a drain wiring 4417 of the EL driver TFT 4406. A chemical compound of indium oxide and tin oxide, a chemical compound of indium oxide and zinc oxide, zinc oxide, tin oxide, and indium oxide can be used as the transparent conducting film. Further, a film in which gallium is added to the above films may also be used as a transparent conducting film.

An EL layer 4411 is formed on the pixel electrode 4410. Note that, although only one pixel is shown in FIG. 22, the EL layer is divided up and formed corresponding to the colors or R (red), G (green), and B (blue) in Embodiment 9. Further, a low molecular weight organic EL material may be formed by an evaporation method in Embodiment 9. Specifically, a lamination structure may be formed in which a 20 nm thick copper phthalocyanine (CuPc) film is formed as a hole injecting layer, and a 70 nm thick tris-8-aluminum quinolinolate complex ($Alq_3$) film may be formed on the CuPc film as a light emitting layer. The color of light emitted can be controlled by adding a fluorescing pigment such as quinacridon, perillin, and DCM1 to $Alq_3$.

Note that the above example is one example of organic EL materials capable of being used as the EL layer, and the EL layer need not be limited to these. An EL layer in which a light emitting layer, a charge transporting layer, and a charge injecting layer are freely combined (layers for emitting light and for performing transport of carriers for light emission) may also be used. For example, an example of using low molecular weight organic EL materials as the EL layer is shown in Embodiment 9, but high molecular weight EL materials may also be used. Further, it is also possible to use inorganic materials such as silicon carbide as charge transporting layers and charge injecting layers. Known materials can be used for these organic EL materials and inorganic materials.

A cathode 4412 made from a conducting film is formed next on the EL layer 4411. An alloy film of aluminum and lithium is used as the conducting film in the case of Embodiment 9. Of course, a known MgAg film (an alloy film of magnesium and silver) may also be used. A conducting film made from an element residing in group 1 or group 2 of the periodic table, or a conducting film to which one of the above elements is added, may be used as the cathode material.

An EL element 4413 is completed at the point where the cathode 4412 is formed. Note that the EL element 4413 indicates a capacitor formed by the pixel electrode (anode) 4410, the EL layer 4411, and the cathode 4412 here.

A top surface structure of the pixel in Embodiment 9 is explained using FIG. 23A. A source region of the switching TFT 4402 is connected to a source signal line 4415 containing a source wiring, and a drain region of the switching TFT 4402 is connected to the drain wiring 4405. Further, the drain wiring 4405 is electrically connected to the gate electrode 4407 of the EL driver TFT 4406. A source region of the EL driver TFT 4406 is electrically connected to an electric power source supply line 4416, and a drain region of the EL driver TFT 4406 is electrically connected to a drain wiring 4417. Furthermore, the drain wiring 4417 is electrically connected to a pixel electrode (anode) 4418 shown by a dotted line.

A storage capacitor is formed at this point in a region denoted by reference numeral 4419. The storage capacitor 4419 is formed in between a semiconductor film 4420 electrically connected to the electric power source supply line 4416, an insulating film (not shown in the figures) formed on the same layer as a gate insulating film, and the gate electrode 4407. Furthermore, it is also possible to use a capacitance formed by the gate electrode 4407, a layer (not shown in the figures) which is the same as a first interlayer insulating film, and the electric power source supply line 4416 as a storage capacitor.

Embodiment 9

An example of fabricating an EL display device using the present invention will be explained in embodiment 9. Note that FIG. 21A is a top view of an EL display device using the present invention, and FIG. 21B is a cross sectional view thereof.

Figure 21A:
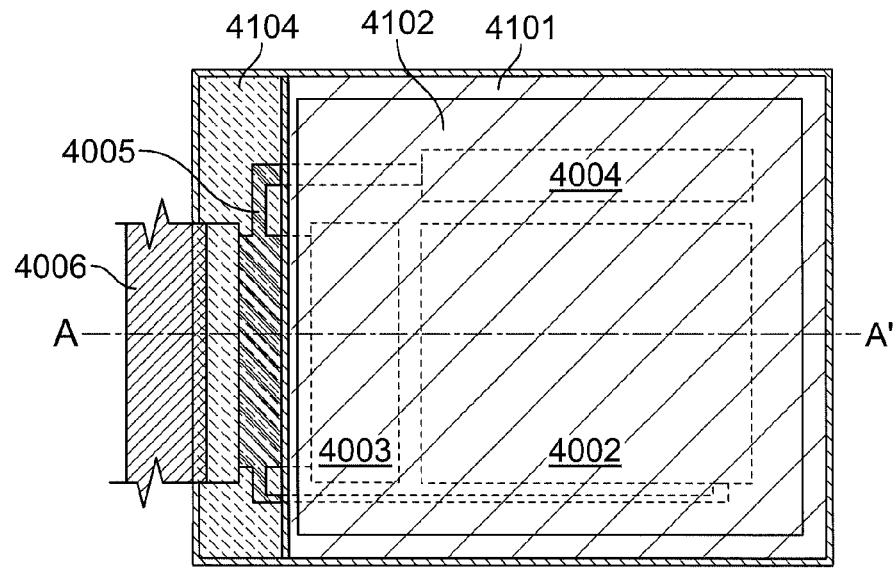
FIGS. 21A and 21B are external diagrams of an EL display device used in a display portion of a portable information terminal of the present invention.
Figure 21B:
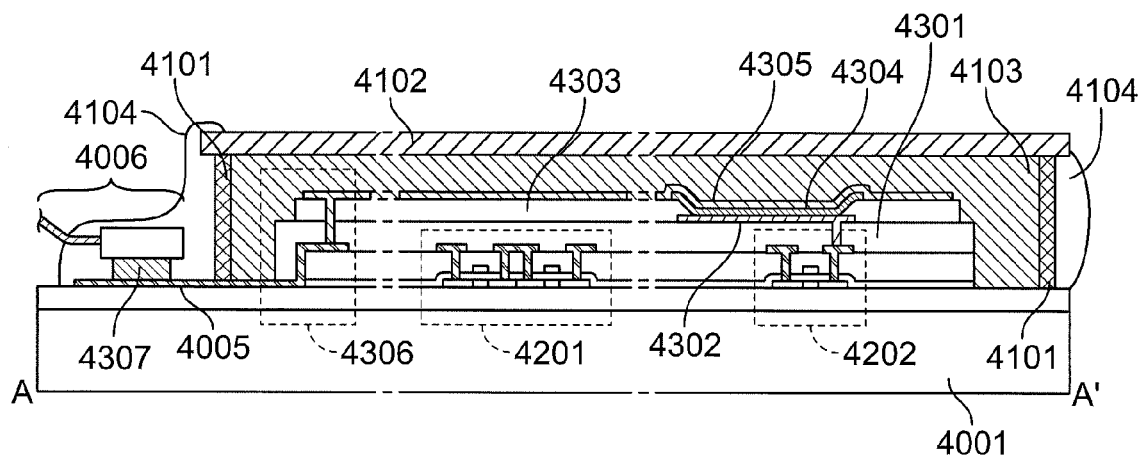

In FIG. 21A and FIG. 21B, reference numeral 4001 denotes a substrate, 4002 denotes a display portion, 4003 denotes a source side driving circuit, 4004 denotes a gate side driving circuit. The driving circuits are connected to external equipment, through an FPC (flexible printed circuit) 4006 via a wiring 4005.

At this time, a first sealing material 4101, a covering material 4102, a filler material 4103 and a second sealing material 4104 are provided so as to enclose the display portion 4002, source side driving circuit 4003, and gate side driving circuit 4004.

A cross sectional diagram of FIG. 21A cut along the line A-A' is shown in FIG. 21B. On the substrate 4001, a driver TFT 4201 included in the source side driving circuit 4003 (an n-channel TFT and a p-channel TFT are shown here) and an EL driving TFT 4202 included in the pixel portion 4002 (a TFT for controlling the current flowing to an EL element is shown here) are formed.

In this embodiment, a p-channel TFT and an n-channel TFT fabricated by a known method are used for the driving TFT 4201 and a p-channel TFT fabricated by a known method used for an EL driving TFT 4202. Further the display portion 4002 is provided the storage capacitor (not shown in figure) connected gate electrode of the EL driving TFT 4202.

An interlayer insulating film (leveling film) 4301 made from a resin material is formed on the driver TFT 4201 and the pixel TFT 4202, and a pixel electrode (anode) 4302 electrically connected to a drain of the pixel TFT 4202 thereon. The pixel electrode 4302 is formed from a transparent conductive film having large work function. As the transparent conductive film, an indium oxide and tin oxide compound or an indium oxide and zinc oxide compound can be utilized. The transparent conductive film doped with gallium also can be used.

Then, an insulating film 4303 is formed on the pixel electrode 4302, and an opening portion is formed on the pixel electrode 4302. At the opening portion, an EL (electro-luminescence) layer 4304 is formed on the pixel electrode 4302. A known organic EL material or inorganic EL material is used as the EL layer 4304. Both of low molecular type (monomer based) organic EL materials and high molecular type (polymer based) organic EL materials can be used as the organic materials.

A known evaporation of painting technique may be used to form the EL layer 4304. The EL layer may have a lamination structure by freely combining a hole injecting layer, a hole transporting layer, a light emitting layer, an electron transporting layer, and an electron injecting layer, or a single layer structure.

On the EL layer 4304, a cathode 4305 made of a conductive film having a light-shielding property (typically, a conductive film comprising aluminum, copper, or silver as a main component, or a lamination film of those and other conductive film) is formed. It is preferable to remove as much as possible any moisture or oxygen existing in the interface between the cathode 4305 and the EL layer 4304. It is therefore necessary to use a method of depositing continuously the cathode 4305 and the EL layer 4304 in vacuum or depositing the EL layer 4304 in an atmosphere of nitrogen or in a rare gas atmosphere, thereby a cathode 4305 is formed without exposing to oxygen and moisture. The above film deposition becomes possible in embodiment 9 by using a multi-chamber method (cluster tool method) film deposition apparatus.

Then, the cathode 4305 is electrically connected to the wiring 4005 in the region denoted by reference numeral 4306. The wiring 4005 for imparting a predetermined voltage to the cathode 4305 is connected to the FPC 4006 through an anisotropic conductive material 4307.

As mentioned above, an EL element is made from the pixel electrode (anode) 4302, the EL layer 4304 and the cathode 4305. The EL element is enclosed with a covering material 4102 which is laminated with the substrate 4001 through a first sealing material 4101 and a second sealing material 4104, and sealed with a filer material 4103.

Materials such as a glass plate, a metal plate (typically, a stainless steel plate), a ceramic plate and a plastic material (including a plastic film) can be used as the covering material 4102. As plastic material an FRP (fiberglass-reinforced plastic) plate, a PVF (polyvinyl fluoride) film, a Mylar film, a polyester film, and an acrylic film can be used. It is preferable to use a sheet structure in which aluminum foil is sandwiched by a PVF film or a Mylar film.

Note that, for a case in which the emission direction of light emitted from the EL element is directed to the covering material side, it is necessary for the covering material to possess transparency. In the case, a transparent material such as a glass plate, a plastic plate, a polyester film or an acrylic film can be used.

Additionally, a filler material 4103 is formed using ultraviolet curing resin or thermally curable resin. PVC (polyvinyl chloride), acrylic, polyimide, epoxy resin, silicone resin, PVB (polyvinyl butyral), and EVA (ethylene vinyl acetate) can be used as the filler material. If a drying agent (preferably, barium oxide) is formed on the inside of the filler material 4103 or materials which can absorb oxygen, then it can suppress the degradation of the EL element.

Further, spacer may be contained in the filler material 4103. At this time, the spacer is formed by using barium oxide, thereby the spacer itself has a hygroscopic property. Further, in the case of providing the spacer, it is effective that a resin film is provided on the cathode 4305 as a buffer layer for relaxation of pressure from the spacer.

Further, the wiring 4005 is electrically connected to the FPC 4006 via the anisotropic conductive film 4307. The wiring 4005 transmits signals forwarding the pixel portion 4002, source side driving circuit 4003 and gate side driving circuit 4004 to the FPC 4006 and are electrically connected to external equipment through the FPC 4006.

Also, in the present embodiment, a second sealing material 4104 is provided to cover an exposure portion of the first sealing material 4101 and portion of the FPC 4006 to obtain the structure in which the EL element is completely shut out from the outside. In this way, the EL display device has a cross sectional structure shown in FIG. 21B.

Embodiment 10

Figure 24:
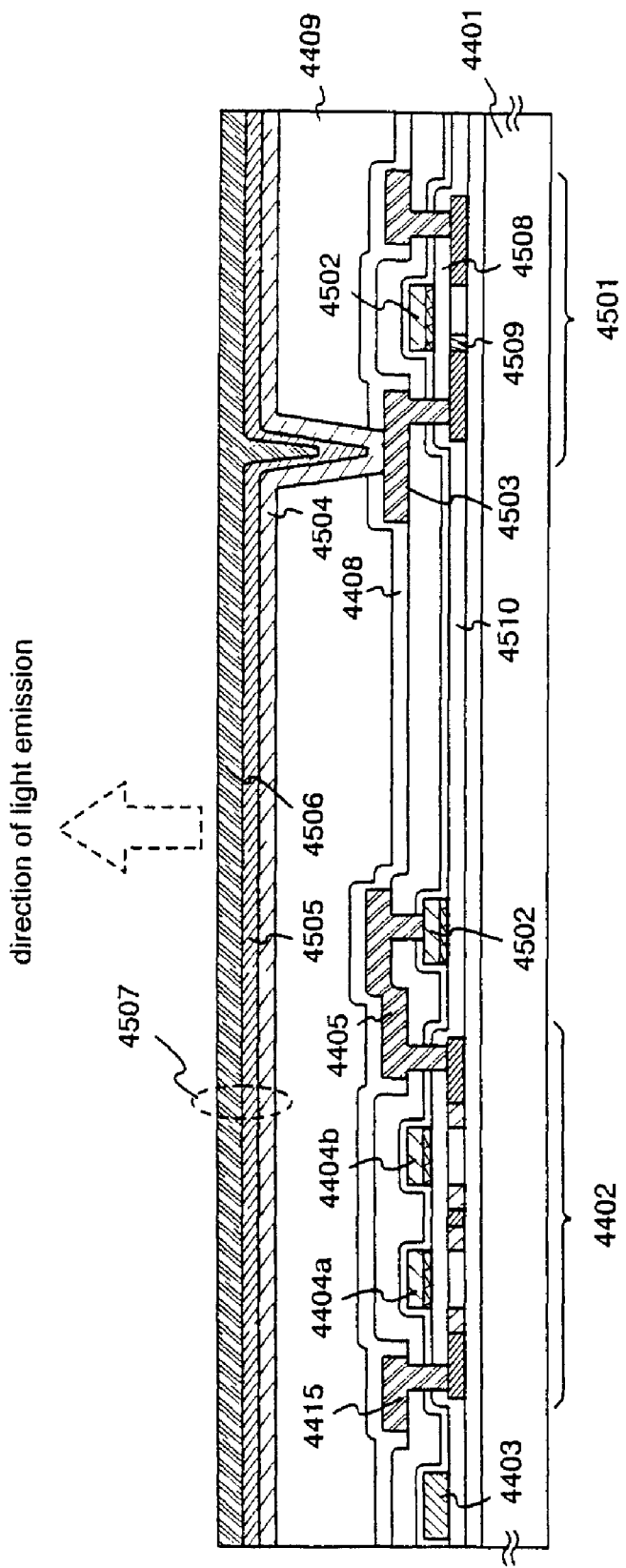
FIG. 24 is a cross sectional diagram of an EL display device used in a display portion of a portable information terminal of the present invention.
Figure 25:
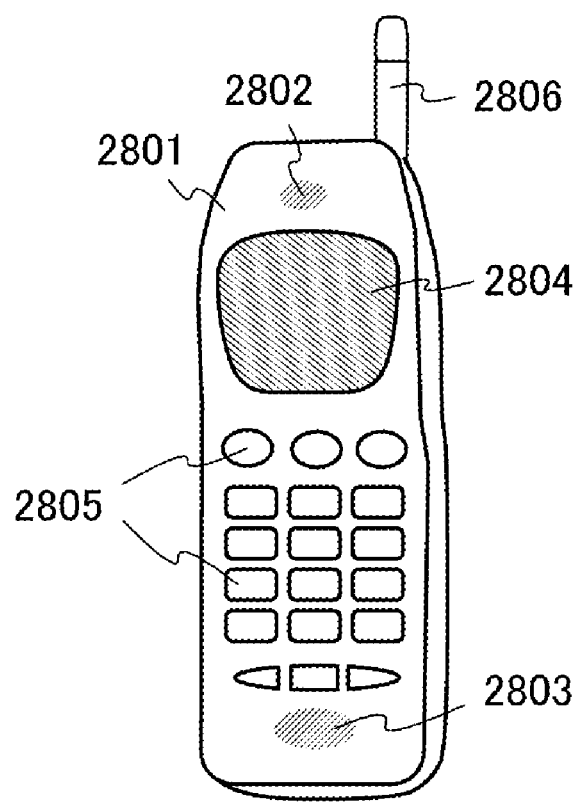
FIG. 25 is a diagram of a conventional portable telephone.

An EL display device having a pixel structure which differs from that of Embodiment 9 is explained in Embodiment 10. FIG. 24 is used in the explanation. Note that the explanation of Embodiment 9 may be referred to regarding portions to which reference symbols identical to those of FIG. 22 are attached.

An n-channel TFT is formed using a known method as an EL driver TFT 4501 in FIG. 24. A gate electrode 4502 of the EL driver TFT 4501 is of course electrically connected to the drain wiring 4405 of the switching TFT 4402. Further, a drain wiring 4503 of the EL driver TFT 4501 is electrically connected to a pixel electrode 4504.

The pixel electrode 4504, composed of a conducting film, functions as a cathode of an EL element in Embodiment 10. Specifically, an alloy film of aluminum and lithium is used. However, a conducting film made from an element residing in group 1 or group 2 of the periodic table, and a conducting film to which one of the above elements is added, may also be used.

An EL layer 4505 is formed on the pixel electrode 4504. Note that, although only one pixel is shown by FIG. 24, an EL layer corresponding to the color G (green) is formed in Embodiment 10 by an evaporation method or an application method (preferably spin coating). Specifically, a lamination structure is used, in which a 20 nm thick lithium fluoride (LiF) film is formed as an electron injecting layer, and a 70 nm thick PPV (polyparaphenylene vinylene) film is formed on the LiF film as a light emitting layer.

Next, an anode 4506 is formed on the EL layer 4505 from a transparent conducting film. A conducting film composed of a chemical compound of indium oxide and tin oxide, or a chemical compound of indium oxide and zinc oxide, is used as the transparent conducting film in the case of Embodiment 10.

An EL element 4507 is completed at the point where the anode 4506 is formed. Note that the EL element 4507 referred to here indicates a capacitor formed by the pixel electrode (cathode) 4504, the EL layer 4505, and the anode 4506.

For a case of a high voltage equal to or greater than 10 V applied to the EL element, degradation due to the hot carrier effect in the EL driver TFT 4501 appears. It is effective in this case to use an n-channel TFT, having a structure in which an LDD region 4509 of a drain region side overlaps with the gate electrode 4502 through the gate insulating film 4510, as the EL driver TFT 4501.

Further, the EL driver TFT 4501 of Embodiment 10 forms a parasitic capacitance between the gate electrode 4502 and the LDD region 4509 referred to as a gate capacitance. By regulating the gate capacitance, it can be made to possess a function similar to that of the storage capacitor 4418 shown in FIGS. 23A and 23B. In particular, the capacitance of the storage capacitor may be smaller for a case of operating the EL display device by a digital driving method than for a case of an analog driving method operation, and therefore the storage capacitor can be substituted by the gate capacitance.

Note that for cases in which the voltage applied to the EL element is 10 V or less, preferably equal to or less than 5 V, there is almost no problem of degradation due to the above hot carrier effect, and therefore an n-channel TFT having a structure in which the LDD region 4509 is omitted may also be used in FIG. 24.

Embodiment 11

An EL display device of a display portion of a portable information terminal of the present invention may also have a structure in which several TFTs are formed within a pixel. For example, 4 to 6 or more TFTs may be formed. It is possible to implement the present invention without placing any limitations on the pixel structure of the EL display device.

Embodiment 12

Figure 26:
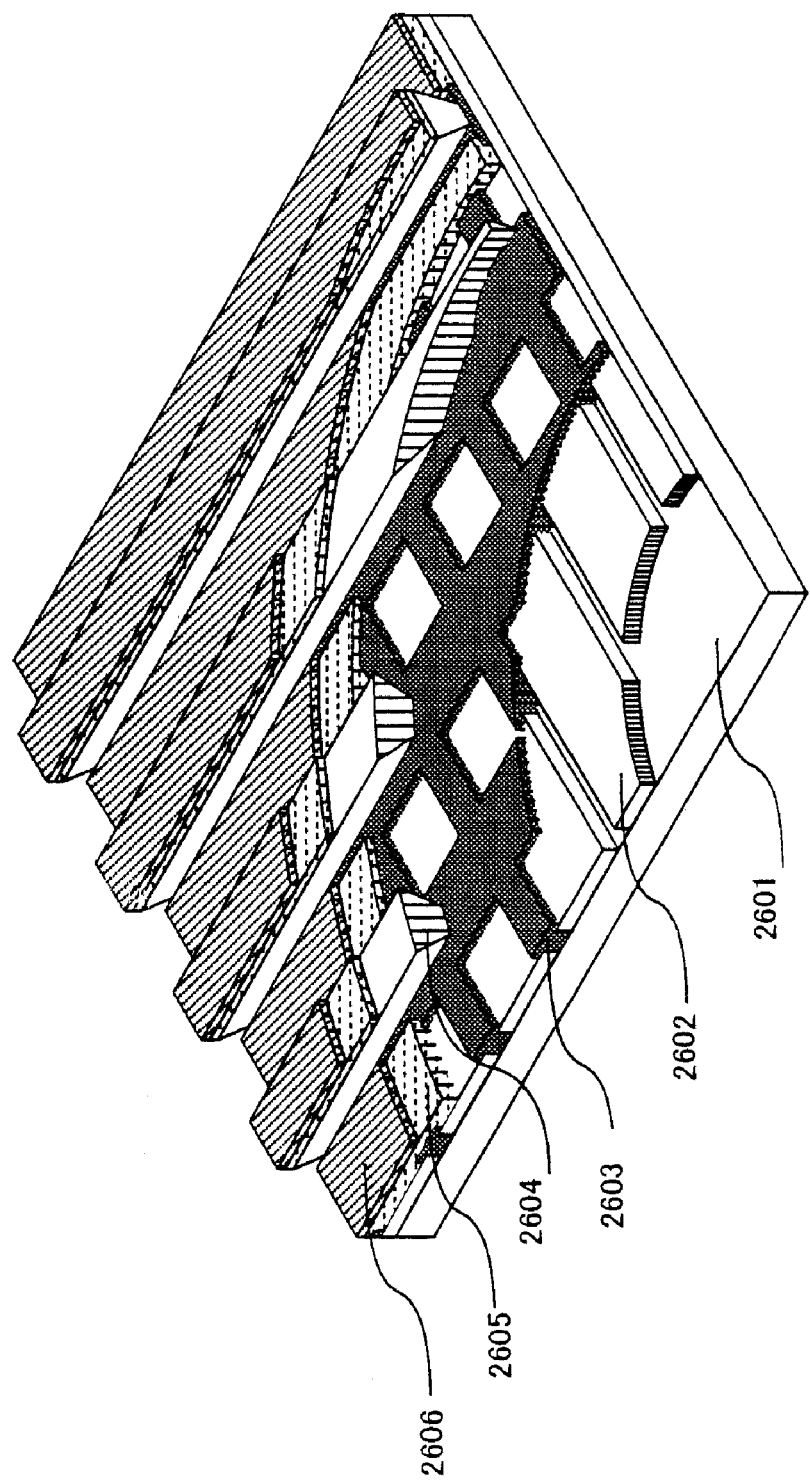
FIG. 26 is a cross sectional diagram of a passive type EL display device.

An EL display device used in a display portion of a portable information terminal of the present invention is not limited to an active matrix type, and a passive type may also be used. A cross sectional diagram of a display portion of an EL display device used in Embodiment 12 is shown in FIG. 26.

Anodes 2602 are formed having a rectangular strip shape in alignment on a substrate 2601. A matrix shape insulating film 2603 is formed on the substrate 2601 covering the anodes 2602. Banks 2604 are then formed on the insulating film 2603 in order to separate adjacent EL layers and cathodes.

It is preferable to use a material having insulating characteristics to form the bank 2604 in order to also electrically separate the adjacent EL layers and cathodes.

EL layers 2605 and cathodes 2607 are then formed and laminated in order on a passive substrate having the substrate 2601, the anodes 2602, the insulating film 2603, and the banks 2604. The EL layers 2605 and the cathodes 2606 which are adjacent, sandwiching the banks 2604, are separated by the banks 2604.

The passive type EL display device has an easier method of manufacture, and a lower cost, than the active matrix type EL display device. It is therefore possible to lower the cost of the portable information terminal itself by using the passive type EL display device in the display portion of the portable information terminal of the present invention.

Note that the passive type EL display device used in the display portion of the portable information terminal of the present invention is not limited to the structure shown by Embodiment 12. A passive type EL display device used in the display portion of the portable information terminal of the present invention may have any type of structure.

It is possible to implement Embodiment 12 by freely combining it with Embodiment 1 or Embodiment 7.

Embodiment 13

Figure 27:
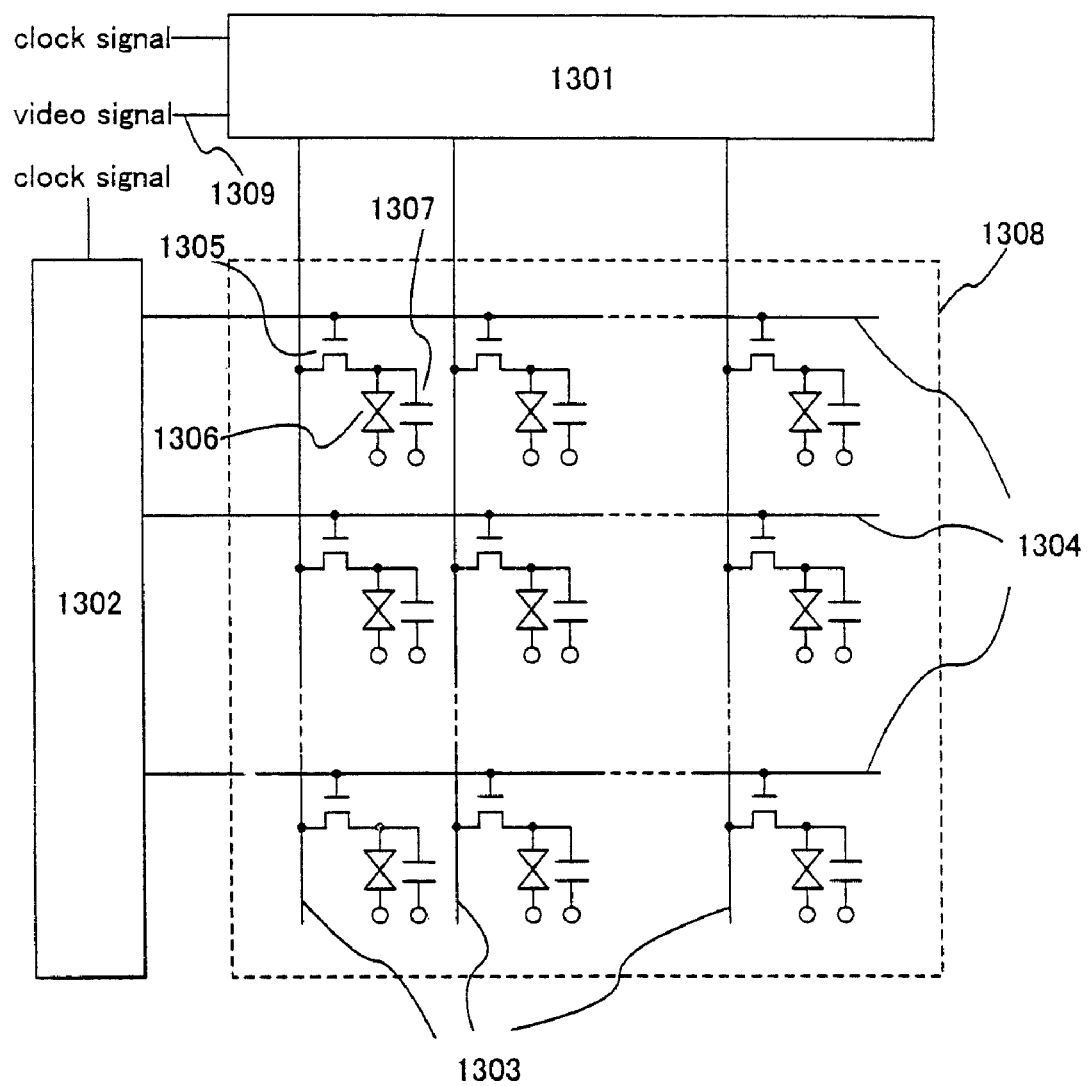
FIG. 27 is a circuit diagram of a liquid crystal display device.

A structure of a liquid crystal display device of a display portion of a portable information terminal of the present invention is explained in Embodiment 13. An example of a schematic diagram of the liquid crystal display device of Embodiment 13 is shown in FIG. 27.

A source signal line driver circuit 1301 and a gate signal line driver circuit 1302 are a portion of a driver circuit. Source signal lines 1303 connected to the source signal line driver circuit 1301, and gate signal lines 1304 connected to the gate signal line driver circuit 1302 intersect in a display portion 1308. A pixel thin film transistor (pixel TFT) 1305, a liquid crystal cell 1306 in which a liquid crystal is sandwiched between an opposing electrode and a pixel electrode, and a storage capacitor 1307 are formed in regions having the source signal lines 1303 and the gate signal lines 1304.

An analog video signal (analog signal having image information) input to the source signal lines 1303 is selected by the pixel TFTs 1305 and written into predetermined pixel electrodes.

The analog video signal, sampled by a timing signal output from the source signal line driver circuit 1301, is supplied to the source signal lines 1303.

Switching of corresponding pixel TFTs 1305 is performed in accordance with a gate signal output from the gate side driver circuit 1302, and the liquid crystal of the liquid crystal cells 1306 is driven in accordance with the analog signal having image information output form the source signal lines 1303. An image is thus displayed in the display portion.

Note that the liquid crystal display device used in the display portion of the portable information terminal of the present invention is not limited to the structure shown in Embodiment 13. The liquid crystal display device used in the display portion of the portable information terminal of the present invention may have any type of structure.

It is possible to implement Embodiment 13 by freely combining it with Embodiment 1 or Embodiment 7.

Embodiment 14

EL for formation of an EL layer of an EL element, in an EL display device of a display portion of a portable information terminal of the present invention, is explained.

It is possible to use all known materials for the EL used in the EL layer of the EL element in the EL display device of the display portion of the portable information terminal of the present invention. However, it becomes possible to suppress the electric power consumption of the portable information terminal itself by using in particular materials in which the light emission efficiency is very high from among all known EL materials.

By utilizing the emission of light when returning to a base state from a triplet excitation state (phosphorescence), in addition to the emission of light when returning to a base state from a singlet excitation state (fluorescence), the maximum external quantum efficiency can be increased. Specifically, it is possible to increase the external quantum efficiency, approximately 5% for a case of only utilizing fluorescence, to approximately 10% or greater, typically up to 20%, for a case of utilizing phosphorescence in addition to fluorescence. The maximum value of the strength of emitted light can then be made equal to or greater than 25 lm/W, typically approximately 40 lm/W by utilizing phosphorescence in addition to fluorescence, compared to approximately 20 lm/W for a case of only utilizing fluorescence.

Materials such as the following can be given as EL materials capable of utilizing phosphorescence in addition to fluorescence: PtOEP (2,3,7,8,12,13,17,18-octaethyl 21H, 23H-porphine platinum(II)); and Ir(ppy)$_3$ (tris(2-phenylpyridine) iridium).

An EL element having an EL material with which phosphorescence is also utilized, in addition to fluorescence, has a higher light emission efficiency when compared to an EL element having an EL material which only utilizes fluorescence, and the power consumption of the portable information terminal itself can thus be suppressed. The ease of use of the portable information terminal can therefore be made better by suppressing the power consumption because the portable information terminal is carried and used by an operator.

It is possible to implement Embodiment 14 by freely combining it with any of Embodiments 1 to 12.

Embodiment 15

A case of automatically switching the direction of images displayed in a display portion, or the direction of images such as characters, numerals, and symbols displayed in operation keys, in accordance with an angle θ between a display panel in a connection portion and an operation portion in a portable information terminal of the present invention, is explained in detail in Embodiment 15.

Figure 28A:
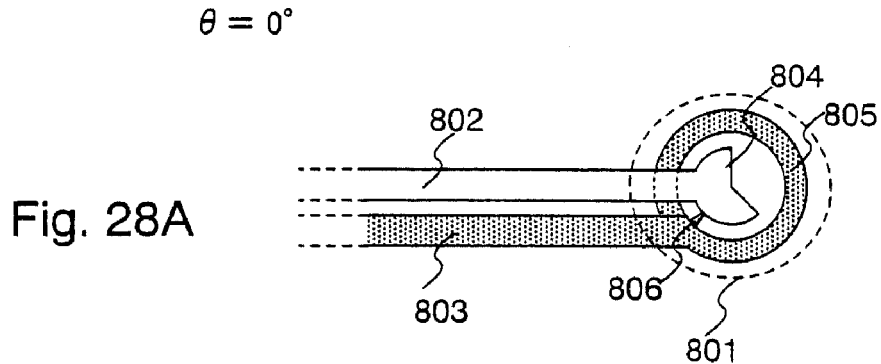
FIGS. 28A to 28C are cross sectional diagrams of a connection portion.
Figure 28B:
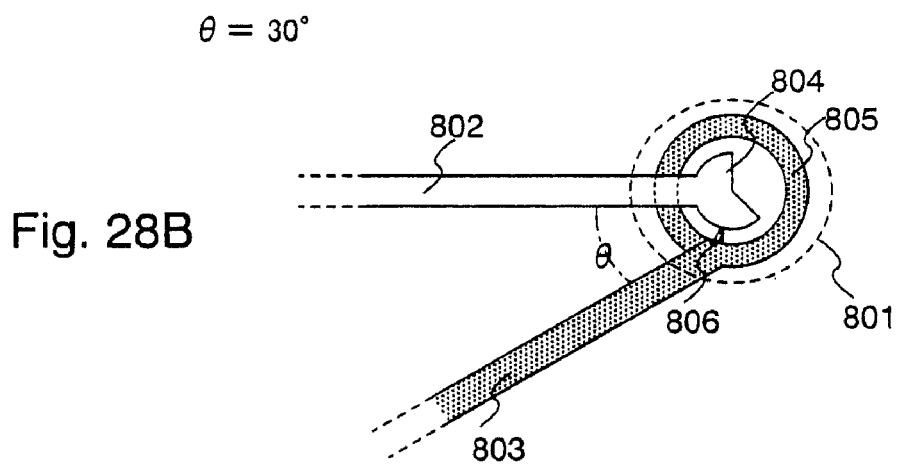
Figure 28C:
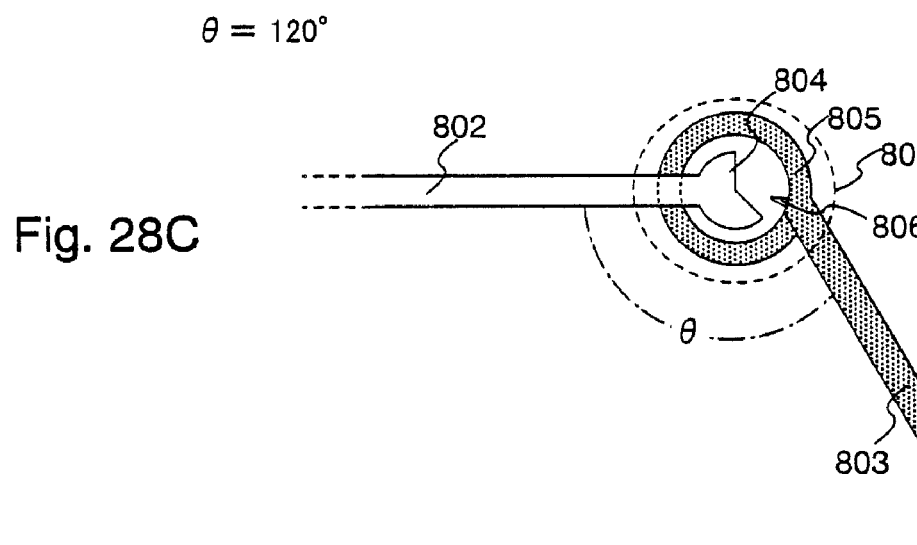

A cross sectional diagram of a connection portion 801 of a portable information terminal of Embodiment 15 is shown in FIGS. 28A to 28C. Reference numeral 802 denotes a display panel, reference numeral 803 denotes an operation panel, and both panels are connected in the connection portion 801. Note that, although an example is shown in Embodiment 15 in which reference numeral 802 denotes the display panel and reference numeral 803 denotes the operation panel, the present invention is not limited to this structure. Conversely, reference numeral 802 may also denote the operation panel and reference numeral 803 may also denote the display panel.

The display panel 802 is connected to a rotation shaft 804 in the connection portion 801. A cross section of the rotation shaft 804 has a shape in which a portion of a circle has been removed. This becomes an arc shape in Embodiment 15.

Further, the operation panel 803 is connected to a rotation portion 805 in the connection portion 801. It is possible to perform rotation in the rotation portion 805 with the rotation shaft 804 as a main axis, and the angle θ between the display panel 802 and the operation panel 803 is determined in accordance with the angle of rotation of the rotation portion 805.

A button 806 is formed in the rotation portion 805 in order to recognize the angle θ between the display panel 802 and the operation panel 803. It is possible to sense the angle θ by whether or not the button 806 contacts a portion of the arc or the rotation shaft 804.

Cross sectional diagrams of the connection portion 801 for cases in which θ=0°, θ=30°, and θ=120° are shown in FIGS. 28A, 28B, and 28C, respectively. For example, the rotation shaft 804 contacts the button 806 when θ=0° in FIG. 28A and when θ=30° in FIG. 28B. The rotation shaft 804 is separated from the button 806 for the case of θ=120° in FIG. 28C.

The direction of the image displayed in the display portion, and the direction of the images such as characters, numerals, and symbols displayed in the operation keys, switch depending upon whether or not the button 806 contacts the rotation shaft 804. It is possible to automatically switch the direction of the image displayed in the display portion, and the direction of the images such as characters, numerals, and symbols displayed in the operation keys, in accordance with the angle θ formed between the display panel and the operation panel in the connection portion in accordance with the above structure.

Note that it is possible for a designer to suitably determine the specific value of the angle θ at which the image direction is switched by changing the shape of the rotation shaft 804.

It is possible to implement Embodiment 15 by freely combining it with any of Embodiments 1 to 14.

A portable information terminal of the present invention has operation keys for inputting characters, symbols, numerals and the like, each with an LED (light emitting diode), an EL display device, or a liquid crystal display device and the like, and by displaying characters, symbols, and numerals in the operation keys in accordance with the LEDs (light emitting diodes), EL display devices, or liquid crystal display devices, an operator can differentiate between the operation keys. The operator can even discern the operation keys in a dark environment in accordance with the above structure.

The operator can appropriately change the direction of the display of the EL display device used in the display portion, and can appropriately change the direction of the images such as characters, symbols, and numerals displayed in the operation keys, in accordance with the portable information terminal usage. The ease of use of the portable information terminal can be increased with the above structure.

Further, the portable information terminal of the present invention may also use a structure having a CCD camera. By using the CCD camera, the operator can send image information, taken in as electronic data to the portable image terminal by the CCD camera, to other persons on the spot.

What is claimed is:

1. An electronic device comprising:
    a first plurality of pixels displaying an image; and
    a touch panel provided adjacent to the first plurality of pixels,
    wherein each of the first plurality of pixels comprises:
        a first thin film transistor comprising a first gate electrically connected to a first gate signal line, a first source and a first drain;
        a second thin film transistor comprising a second gate electrically connected to a second gate signal line, one of a second source and a second drain electrically connected to one of the first source and the first drain, and the other one of the second source and the second drain electrically connected to a third line;
        a third thin film transistor comprising a third gate electrically connected to one of the first source and the first drain and to the one of the second source and the second drain, a third source and a third drain; and a light emitting element electrically connected to one of the third source and the third drain, and
wherein a direction of the image is switchable between a first orientation and a second orientation.

2. An electronic device comprising:
a first plurality of pixels displaying an image;
a touch panel provided adjacent to the first plurality of pixels, and comprising:
a first plurality of strip shape films; and
a second plurality of strip shape films provided over and crossing the first plurality of strip shape films;
an audio input portion; and
an audio output portion;
wherein each of the first plurality of pixels comprises:
a first thin film transistor comprising a first gate electrically connected to a first gate signal line, a first source and a first drain;
a second thin film transistor comprising a second gate electrically connected to a second gate signal line, one of a second source and a second drain electrically connected to one of the first source and the first drain, and the other one of the second source and the second drain electrically connected to a third line;
a third thin film transistor comprising a third gate electrically connected to one of the first source and the first drain and to the one of the second source and the second drain, a third source and a third drain; and
a light emitting element electrically connected to one of the third source and the third drain, and
wherein a direction of the image is switchable between a first orientation and a second orientation.

3. An electronic device comprising:
a first plurality of pixels displaying an image; and
a touch panel provided adjacent to the first plurality of pixels, and comprising:
a first plurality of strip shape films; and
a second plurality of strip shape films provided over and crossing the first plurality of strip shape films;
a CCD light receiving portion,
wherein each of the first plurality of pixels comprises:
a first thin film transistor comprising a first gate electrically connected to a first gate signal line, a first source and a first drain;
a second thin film transistor comprising a second gate electrically connected to a second gate signal line, one of a second source and a second drain electrically connected to one of the first source and the first drain, and the other one of the second source and the second drain electrically connected to a third line;
a third thin film transistor comprising a third gate electrically connected to one of the first source and the first drain and to the one of the second source and the second drain, a third source and a third drain; and
a light emitting element electrically connected to one of the third source and the third drain, and
wherein a direction of the image is switchable between a first orientation and a second orientation.

4. An electronic device comprising:
a first plurality of pixels displaying an image;
a touch panel provided adjacent to the first plurality of pixels, and comprising:
a first plurality of strip shape films; and
a second plurality of strip shape films provided over and crossing the first plurality of strip shape films;
wherein each of the first plurality of pixels comprises:
a first thin film transistor comprising a first gate electrically connected to a first gate signal line, a first source and a first drain;
a second thin film transistor comprising a second gate electrically connected to a second gate signal line, one of a second source and a second drain electrically connected to one of the first source and the first drain, and the other one of the second source and the second drain electrically connected to a third line;
a third thin film transistor comprising a third gate electrically connected to the one of the first source and the first drain and to the one of the second source and the second drain, a third source and a third drain; and
a light emitting element electrically connected to one of the third source and the third drain, and
wherein a direction of the image is switchable between a first orientation and a second orientation.

5. An electronic device according to claim 1, wherein the image is displayed an EL element or liquid crystal.

6. An electronic device according to claim 2, wherein the image is displayed an EL element or liquid crystal.

7. An electronic device according to claim 3, wherein the image is displayed by an EL element or liquid crystal.

8. An electronic device according to claim 4, wherein the image is displayed an EL element or liquid crystal.

9. An electronic device according to claim 1, further comprising a second plurality of pixels displaying an operation key.

10. An electronic device according to claim 2, further comprising a second plurality of pixels displaying an operation key.

11. An electronic device according to claim 3, further comprising a second plurality of pixels displaying an operation key.

12. An electronic device according to claim 4, further comprising a second plurality of pixels displaying an operation key.

13. An electronic device according to claim 9, wherein the operation key is displayed by an EL element, liquid crystal or an LED.

14. An electronic device according to claim 10, wherein the operation key is displayed by an EL element, liquid crystal or an LED.

15. An electronic device according to claim 11, wherein the operation key is displayed by an EL element, liquid crystal or an LED.

16. An electronic device according to claim 12, wherein the operation key is displayed by an EL element, liquid crystal or an LED.

17. An electronic device according to claim 9, wherein the direction of the image and the direction of the operation key is a same.

18. An electronic device according to claim 10, wherein the direction of the image and the direction of the operation key is a same.

19. An electronic device according to claim 11, wherein the direction of the image and the direction of the operation key is a same.

20. An electronic device according to claim 12, wherein the direction of the image and the direction of the operation key is a same.

21. An electronic device according to claim 9, wherein the direction of the image and the direction of the operation key is different from each other.

22. An electronic device according to claim 10, wherein the direction of the image and the direction of the operation key is different from each other.

23. An electronic device according to claim 11, wherein the direction of the image and the direction of the operation key is different from each other.

24. An electronic device according to claim 12, wherein the direction of the image and the direction of the operation key is different from each other.

25. An electronic device according to claim 1, wherein the touch panel has light transmitting characteristics.

26. An electronic device according to claim 2, wherein the touch panel has light transmitting characteristics.

27. An electronic device according to claim 3, wherein the touch panel has light transmitting characteristics.

28. An electronic device according to claim 4, wherein the touch panel has light transmitting characteristics.

29. An electronic device according to claim 2, wherein each of the first plurality of strip shape films and the second plurality of strip shape films comprises ITO.

30. An electronic device according to claim 3, wherein each of the first plurality of strip shape films and the second plurality of strip shape films comprises ITO.

31. An electronic device according to claim 4, wherein each of the first plurality of strip shape films and the second plurality of strip shape films comprises ITO.

32. An electronic device according to claim 9, wherein the first plurality of pixels are provided in a display panel, and the second plurality of pixels are provided in an operation panel.

33. An electronic device according to claim 10, wherein the first plurality of pixels are provided in a display panel, and the second plurality of pixels are provided in an operation panel.

34. An electronic device according to claim 11, wherein the first plurality of pixels are provided in a display panel, and the second plurality of pixels are provided in an operation panel.

35. An electronic device according to claim 12, wherein the first plurality of pixels are provided in a display panel, and the second plurality of pixels are provided in an operation panel.

36. An electronic device according to claim 1, wherein the third line is a power source supply line.

37. An electronic device according to claim 2, wherein the third line is a power source supply line.

38. An electronic device according to claim 3, wherein the third line is a power source supply line.

39. An electronic device according to claim 4, wherein the third line is a power source supply line.

40. An electronic device according to claim 1, wherein the other one of the third source and the third drain is electrically connected to the third line.

41. An electronic device according to claim 2, wherein the other one of the third source and the third drain is electrically connected to the third line.

42. An electronic device according to claim 3, wherein the other one of the third source and the third drain is electrically connected to the third line.

43. An electronic device according to claim 4, wherein the other one of the third source and the third drain is electrically connected to the third line.

44. An electronic device according to claim 1, wherein each of the first plurality of pixels further comprises a capacitor electrically connected to one of the first source and the first drain.

45. An electronic device according to claim 2, wherein each of the first plurality of pixels further comprises a capacitor electrically connected to one of the first source and the first drain.

46. An electronic device according to claim 3, wherein each of the first plurality of pixels further comprises a capacitor electrically connected to one of the first source and the first drain.

47. An electronic device according to claim 4, wherein each of the first plurality of pixels further comprises a capacitor electrically connected to one of the first source and the first drain.

* * * * *